US006812971B2

(12) United States Patent
Terane

(10) Patent No.: US 6,812,971 B2
(45) Date of Patent: Nov. 2, 2004

(54) ELECTRONIC APPARATUS, STAND AND ELECTRONIC APPARATUS STAND SYSTEM

(75) Inventor: Akio Terane, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/238,387

(22) Filed: Sep. 9, 2002

(65) Prior Publication Data

US 2003/0076440 A1 Apr. 24, 2003

(30) Foreign Application Priority Data

| Sep. 11, 2001 | (JP) | 2001-275621 |
| Sep. 11, 2001 | (JP) | 2001-275623 |
| Sep. 26, 2001 | (JP) | 2001-293943 |
| Sep. 26, 2001 | (JP) | 2001-295122 |
| Oct. 1, 2001 | (JP) | 2001-305793 |
| Oct. 4, 2001 | (JP) | 2001-308927 |

(51) Int. Cl.[7] .................. H04N 5/225; H04N 5/222; H04M 1/00
(52) U.S. Cl. .................. 348/375; 348/333.06; 348/373; 455/556.2
(58) Field of Search .................. 348/207.1, 207.11, 348/211.8, 211.13, 211.14, 333.01, 333.02, 333.06, 333.07, 333.11, 333.13, 375, 376, 246, 247; 358/906; 455/556.1, 556.2, 557, 561, 572, 573

(56) References Cited

U.S. PATENT DOCUMENTS

| 5,859,628 | A | * | 1/1999 | Ross et al. ............ 345/173 |
| 6,108,568 | A | * | 8/2000 | Lebrun et al. ......... 455/573 |
| 6,262,769 | B1 | * | 7/2001 | Anderson et al. ...... 348/333.1 |
| 6,477,588 | B1 | * | 11/2002 | Yerazunis et al. ...... 710/13 |
| 2002/0101534 | A1 | * | 8/2002 | Liu .................... 348/375 |
| 2002/0132639 | A1 | * | 9/2002 | Sato ................... 455/556 |
| 2002/0145403 | A1 | * | 10/2002 | Wang et al. ........... 320/107 |
| 2002/0149695 | A1 | * | 10/2002 | Kayanuma ............. 348/375 |
| 2002/0186319 | A1 | * | 12/2002 | Whitby et al. ......... 348/375 |
| 2002/0194414 | A1 | * | 12/2002 | Bateman et al. ....... 710/303 |
| 2002/0196360 | A1 | * | 12/2002 | Miyadera .............. 348/373 |
| 2003/0011702 | A1 | * | 1/2003 | Ohmura et al. ........ 348/372 |
| 2003/0090572 | A1 | * | 5/2003 | Belz et al. ........... 348/207.1 |
| 2003/0117499 | A1 | * | 6/2003 | Bianchi et al. ........ 348/211.2 |
| 2003/0117521 | A1 | * | 6/2003 | Nagaoka .............. 348/373 |
| 2004/0004671 | A1 | * | 1/2004 | Takahashi ............. 348/375 |

FOREIGN PATENT DOCUMENTS

| JP | 11289679 A | * | 10/1999 | ............ H02J/7/00 |
| JP | 2000022791 A | * | 1/2000 | ............ H04M/1/03 |
| JP | 2000-333046 A | | 11/2000 | |
| JP | 2001-69388 A | | 3/2001 | |

* cited by examiner

Primary Examiner—Wendy R. Garber
Assistant Examiner—John M Villecco
(74) Attorney, Agent, or Firm—Frishauf, Holtz, Goodman & Chick, P.C.

(57) ABSTRACT

An electronic camera system of this invention is an electronic camera system comprising an electronic camera and a camera stand which is provided so as to enable the electronic camera to be mounted thereon and includes a power supplying section for supplying power to the electronic camera mounted. The electric camera system is mainly characterized in that the electronic camera is formed so as to have an exterior shape capable of being mounted on the camera stand, and the camera stand is formed so as to have an exterior shape which enables the electronic camera to be mounted either in a first direction in which the front of the camera faces to the front of the camera stand or in a second direction in which the back of the camera faces to the front of the camera stand.

50 Claims, 26 Drawing Sheets

|  | Charging mode | Reproducing mode | Printing mode | Photographing mode | PC communication mode |
|---|---|---|---|---|---|
| First direction | ○ | × | × | ○ | △ |
| Second direction | ○ | ○ | △ | × | △ |

FIG. 7

| | | Charging mode | Reproducing mode | Printing mode | Photographing mode | PC communication mode |
|---|---|---|---|---|---|---|
| First direction | Cover open (·) | ○ | × | × | ○ | △ |
| | Cover closed (·) | ○ | × | × | × | ○ |
| Second direction | Cover open (·) | ○ | ○ | △ | × | △ |
| | Cover closed (·) | ○ | × | △ | × | ○ |

FIG. 9

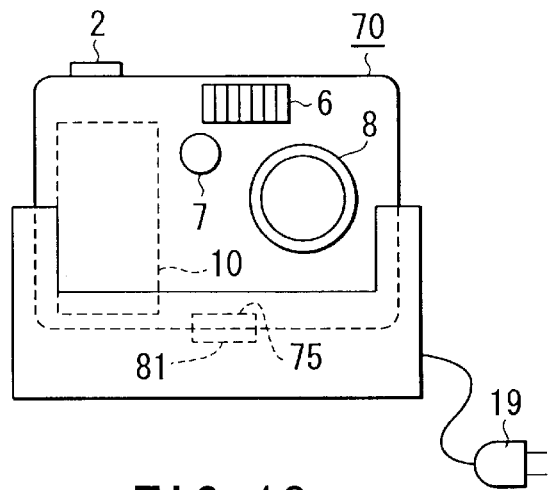
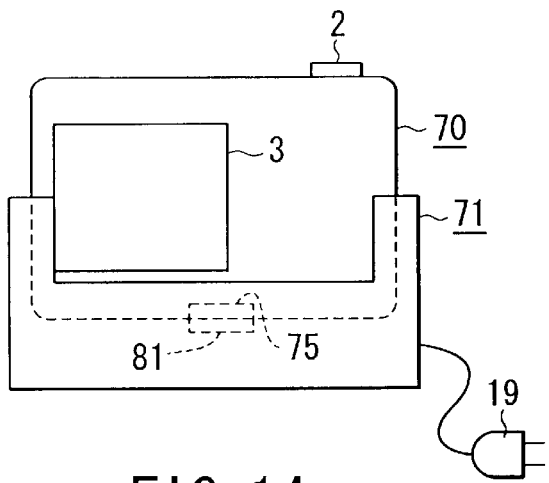
FIG. 13
FIG. 14
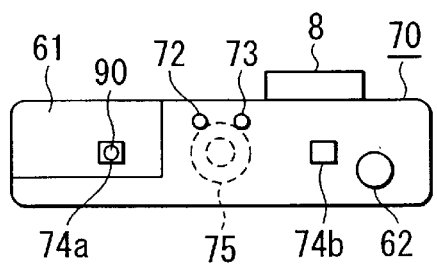
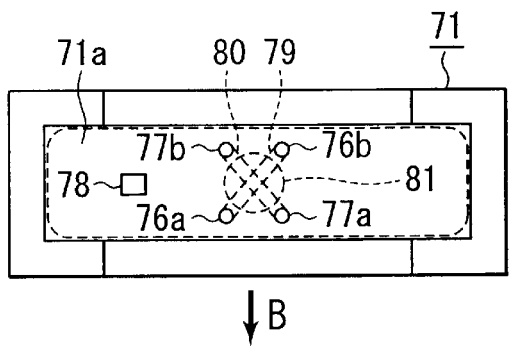
FIG. 15
FIG. 16
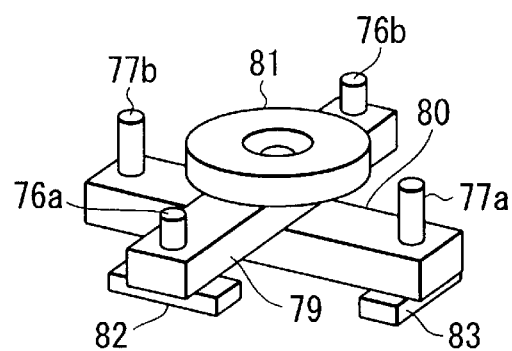
FIG. 17

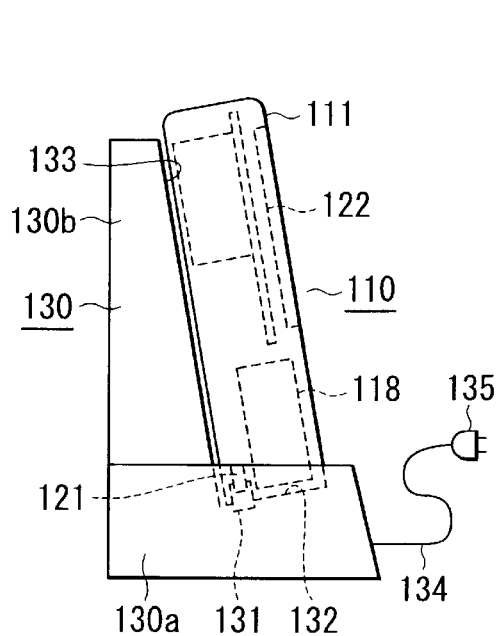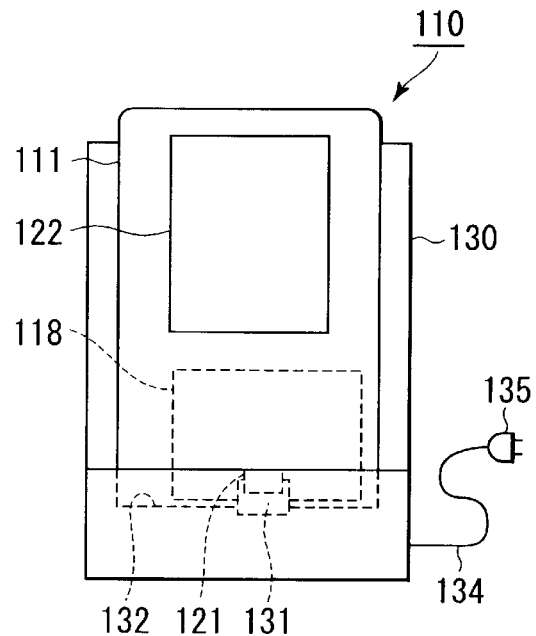
FIG. 21A          FIG. 21B
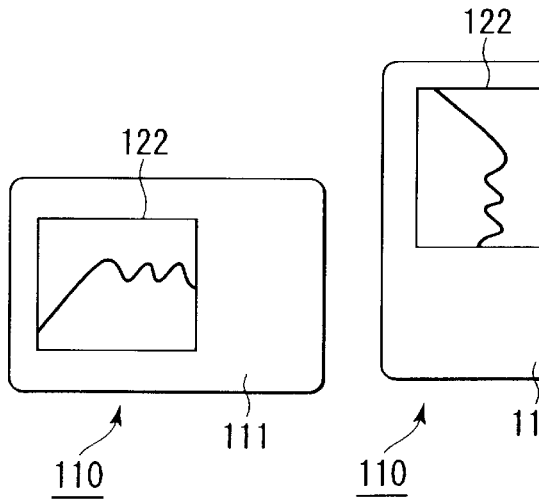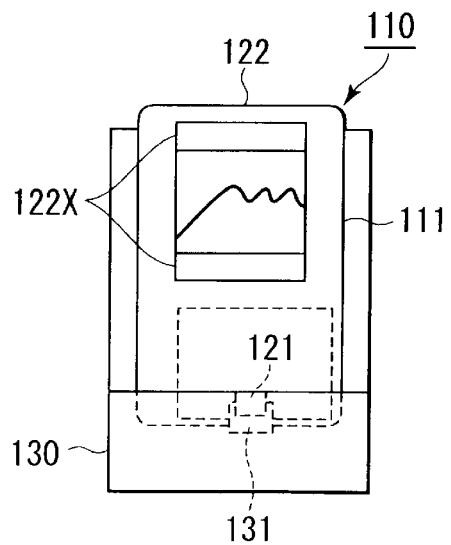
FIG. 22A      FIG. 22B      FIG. 22C

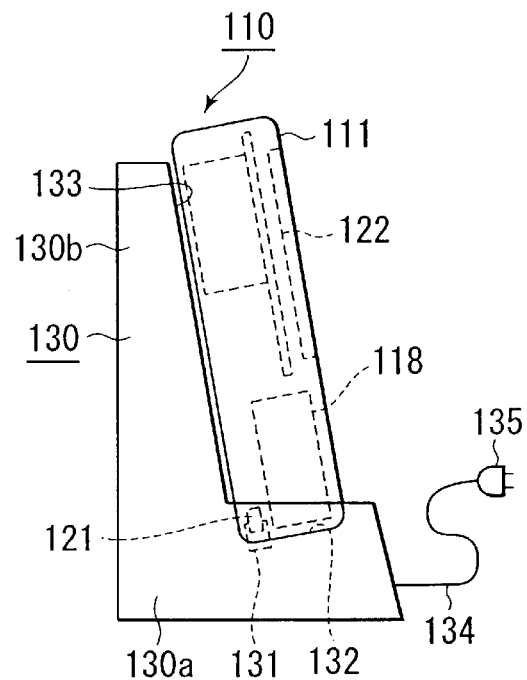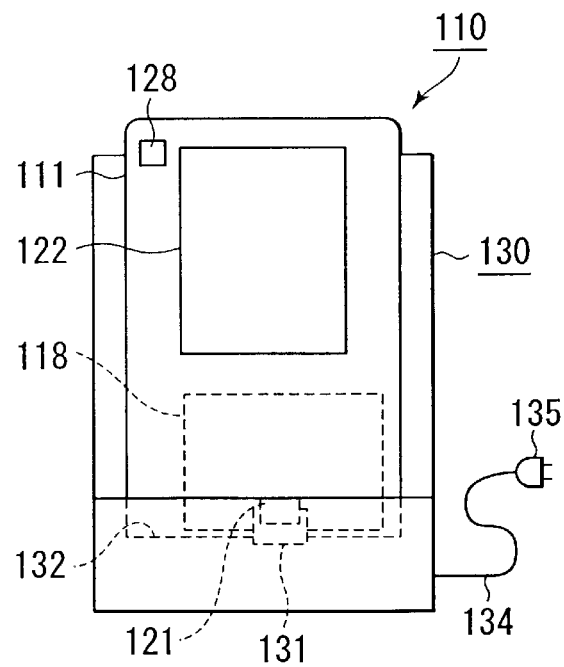
FIG. 36A  FIG. 36B
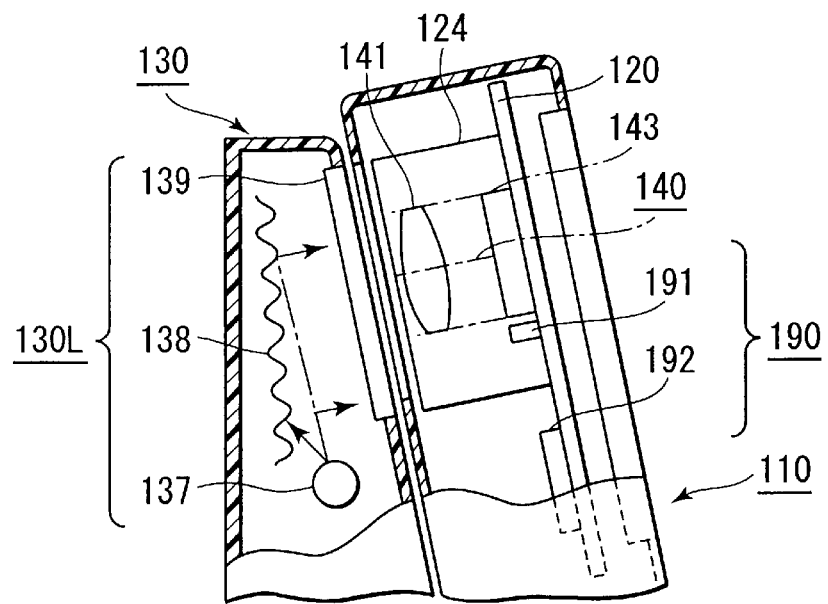
FIG. 37

ELECTRONIC APPARATUS, STAND AND ELECTRONIC APPARATUS STAND SYSTEM

CROSS-REFERENCE TO RELATED APPLICATIONS

This application is based upon and claims the benefit of priority from the prior Japanese Patent Applications No. 2001-275621, Sep. 11, 2001; No. 2001-275623, Sep. 11, 2001; No. 2001-293943, Sep. 26, 2001; No. 2001-295122, Sep. 26, 2001; No. 2001-305793, Oct. 1, 2001; and No. 2001-308927, Oct. 4, 2001, the entire contents of all of which are incorporated herein by reference.

BACKGROUND OF THE INVENTION

This invention relates to an electronic apparatus, such as an electronic camera, and an electronic apparatus stand on which the electronic apparatus can be mounted in a specific position, and to an electronic apparatus stand system including the electronic apparatus and electronic apparatus stand.

One known electronic apparatus stand system is configured so as to enable an electronic apparatus, such as an electronic camera, to be mounted on a stand in a specific position in order to display the electronic apparatus as, for example, an interior set, in a room.

For example, Jpn. Pat. Appln. KOKAI Publication No. 2001-69388 has disclosed an electronic camera system which enables an electronic camera to be mounted on a camera stand with a charger in such a manner that the front of the camera faces to the front of the stand. The electronic camera system is capable of charging the secondary battery of the electronic camera mounted, setting the correct date in the electronic camera, causing the strobe to emit light to enhance the wake-up function, turning on the backup light for indicating the charging time, and others.

Jpn. Pat. Appln. KOKAI Publication No. 2000-333046 has disclosed an electronic camera system which enables an electronic camera to be mounted on a camera stand with a charger in such a manner that the back of the camera faces to the front of the stand. The electronic camera system is capable of charging the secondary battery of the electronic camera mounted, causing the liquid-crystal display section at the back of the camera to display images (or make a slide show) during or after charging, and others.

As described in the above publications, in a conventional ordinary electronic camera system, the electronic camera is mounted on the camera stand in such a manner that the camera faces either forward or backward. Depending on the direction in which the electronic camera is mounted, a limitation is imposed on the functions the electronic camera can achieve.

For example, in a configuration with the front of the camera mounted so as to face to the front of the stand as in the electronic camera system disclosed in Jpn. Pat. Appln. KOKAI Publication No. 2001-69388, no consideration has been given to the way of, for example, viewing images while displaying the images on the liquid-crystal monitor at the back of the camera, with the electronic camera mounted on the stand.

Furthermore, in a configuration with the back of the camera mounted so as to face to the front of the stand as in the electronic camera disclosed in Jpn. Pat. Appln. KOKAI Publication No. 2000-333046, no consideration has been given to the way of, for example, taking pictures with the electronic camera mounted on the stand.

That is, in the prior art, making good use of various functions the electronic camera intrinsically has, including photographing, reproducing, image transferring, and printing functions, has been considered to be impossible in a state where the electronic camera is mounted on the camera stand.

In addition, with the electronic camera mounted on the camera stand, this imposes restrictions on the operation of selecting and setting the operation mode (such as photograph mode or reproduce mode) to carry out the functions. That is, depending on the direction in which the electronic camera is mounted on the camera stand, controls (including buttons) provided on the electronic camera are arranged in a place difficult to operate, or the liquid-crystal monitor for displaying the selected or set operation mode is covered by the wall of the stand. This caused the following problems: the operation mode was liable to be selected or set erroneously, and the operation mode displayed on the liquid-crystal monitor was difficult to check visually.

BRIEF SUMMARY OF THE INVENTION

It is, accordingly, an object of the present invention to overcome the above problems by providing an electronic apparatus, such as an electronic camera, a stand, and an electronic apparatus stand system which have the advantages described below:

a. The direction in which an electronic apparatus, such as an electronic camera, is mounted on a stand can be changed and therefore it is possible to make good use of the electronic apparatus.

b. A suitable operation mode is selected and set according to the direction in which an electronic apparatus, such as an electronic camera, is mounted on a stand.

c. Even when an electronic apparatus, such as an electronic camera, is mounted on a stand either in a first direction in which the front of the electronic apparatus faces to the front of the stand or in a second direction in which the back of the electronic apparatus faces to the front of the stand, electric power is supplied to the electronic apparatus properly.

d. Even when an electronic apparatus, such as an electronic camera, is mounted in a lengthwise position on a stand, the image is displayed in an upright position by display means and therefore is easy to see.

e. Even when an electronic apparatus, such as an electronic camera, is mounted on a stand in an upward- or downward-inclined manner, the image displayed by the liquid-crystal display is easy to see.

f. There is no photographing limit due to the consumption of the battery and therefore photography can be continued stably for a long time.

g. The monitoring function can be achieved with the photographing operation unnoticed.

h. The camera can be examined automatically without any problem while the camera is in use.

i. Defective pixels can be sensed accurately without being affected by the temperature.

To achieve the above object, an electronic apparatus, a stand, and an electronic apparatus stand system according to the present invention have characteristic configurations as described below. Characteristic configurations other than those described below will be referred to in the embodiments.

(1) An electronic camera system according to the present invention is an electronic camera system comprising an electronic camera and a camera stand which is provided so as to enable the electronic camera to be mounted thereon and includes a power supplying section for supplying power to the electronic camera mounted, the electronic camera system characterized in that the electronic camera is formed so as to have an exterior shape capable of being mounted on the camera stand, and the camera stand is formed so as to have an exterior shape which enables the electronic camera to be mounted either in a first direction in which the front of the camera faces to the front of the camera stand or in a second direction in which the back of the camera faces to the front of the camera stand.

(2) An electronic camera according to the invention is an electronic camera system which is capable of being mounted on a camera stand and which receives power from a power supplying section provided on the camera stand, with the camera mounted on the camera stand, the electronic camera characterized by having an exterior shape capable of being mounted on the camera stand either in a first direction in which the front of the camera faces to the front of the camera stand or in a second direction in which the back of the camera faces to the front of the camera stand.

(3) A camera stand according to the present invention is a camera stand which is capable of mounting an electronic camera thereon and includes a power supplying section for supplying power to the mounted electronic camera, the camera stand characterized by being formed so as to have an exterior shape which enables the electronic camera to be mounted either in a first direction in which the front of the camera faces to the front of the camera stand or in a second direction in which the back of the camera faces to the front of the camera stand.

(4) A system according to the invention is a system comprising an apparatus with a specific function and a stand with a power supplying section which supplies power to the apparatus mounted, the system characterized in that the apparatus is formed so as to have an exterior shape capable of being mounted on the stand, and the stand is formed so as to have an exterior shape which enables the apparatus to be mounted thereon either in a first direction in which the front of the apparatus faces to the front of the stand or in a second direction in which the back of the apparatus faces to the front of the stand.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A is a top view, FIG. 1B is a back view, FIG. 1C is a left side view, and FIG. 1D is a front view;

FIG. 4A is a left side view, FIG. 4B is a front view, and FIG. 4C is a sectional view taken along line C—C of FIG. 4B;

FIG. 7 is a diagram to help explain the operation of the electronic camera system according to the first embodiment of the present invention and describe an example of the relationship between the "mounting direction" of the electronic camera, "operation mode to be selected and set," and "operation mode to be inhibited from being set";

FIG. 9 is a diagram to help explain the operation of the electronic camera system according to the second embodiment of the present invention and describe an example of the relationship between the "mounting direction" of the electronic camera with a lens cover, "operation mode to be selected and set," and "operation mode to be inhibited from being set";

FIG. 11A is a left side view and FIG. 11B is a front view;

FIG. 13 is a front view showing a state where an electronic camera according to a fourth embodiment of the present invention is mounted on a stand in such a manner that the front of the camera faces to the front of the stand;

FIG. 14 is a front view showing a state where the electronic camera according to the fourth embodiment of the present invention is mounted on a stand in such a manner that the back of the camera faces to the front of the stand;

FIG. 15 is a bottom view of the electronic camera according to the fourth embodiment of the present invention;

FIG. 16 is a top view of the stand according to the fourth embodiment of the present invention;

FIG. 17 is a perspective view showing the configuration of a main part of power-supplying coil and its vicinity related to the fourth embodiment of the present invention;

FIG. 20A is a top view, FIG. 20B is a back view, FIG. 20C is a side view, FIG. 20D is a front view, and FIG. 20E is a bottom view;

FIG. 21A and FIG. 21B are drawings showing a state where the electronic camera according to the sixth embodiment of the present invention is mounted on a stand in such a manner that the back of the camera faces to the front of the stand, where FIG. 21A is a side view and FIG. 21B is a front view;

FIG. 22A to FIG. 22C are drawings showing how the direction of the image displayed on the LCD changes when the electronic camera related to the sixth embodiment of the present invention changes from a normally used position to a stand mounting position;

FIG. 27A is a side view showing a state where the electronic camera is mounted on a stand in such a manner that the back of the camera faces to the front of the stand and FIG. 27B is its front view;

FIG. 28A shows an LCD display screen in normal use and FIG. 28B shows an LCD display screen when the camera is mounted on the stand;

FIG. 30A shows a field angle at the LCD in normal use and FIG. 30B shows a field angle at the LCD when the camera is mounted on the stand;

FIG. 31A is a side view showing a state where the electronic camera is mounted on a stand in such a manner that the front of the camera faces to the front of the stand and FIG. 31B is its front view;

FIG. 36A and FIG. 36B show a schematic configuration of an electronic camera system according to a tenth embodiment of the present invention, where FIG. 36A is a side view showing a state where the electronic camera is mounted on a stand in such a manner that the back of the camera faces to the front of the stand and FIG. 36B is its front view;

FIG. 37 is an enlarged sectional view, with a portion broken away, of a primary part of FIG. 36A;

Figure 1A:
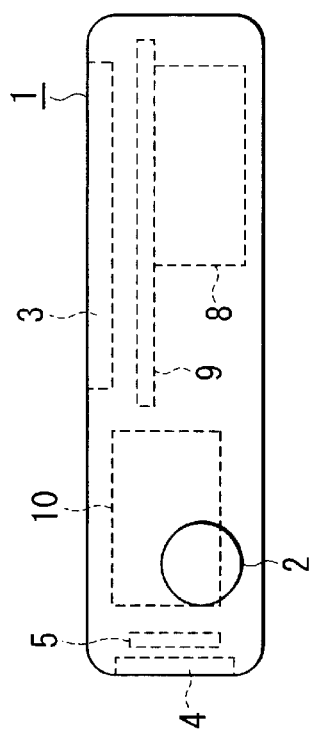
FIG. 1A to FIG. 1D show a schematic configuration of an electronic camera according to a first embodiment of the present invention, where
Figure 1D:
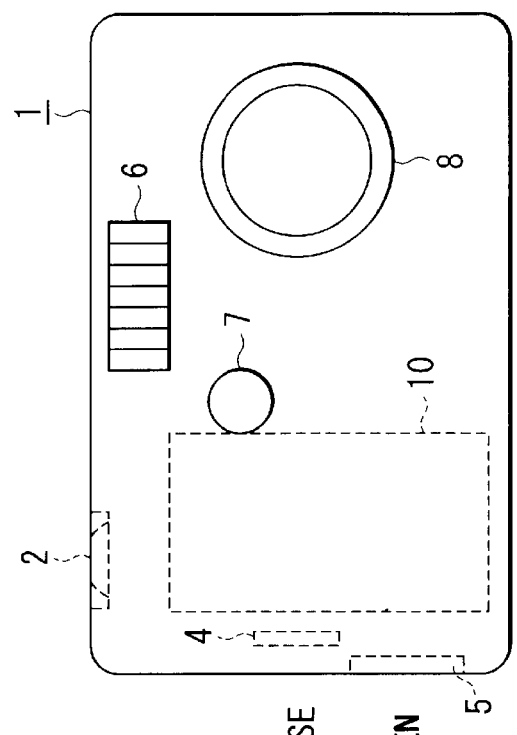

DETAILED DESCRIPTION OF THE INVENTION (First Embodiment)

An electronic camera system according to a first embodiment of the present invention comprises at least an electronic camera 1, and a camera stand (hereinafter, just referred to as a stand) 18 on which the electronic camera is mounted, as shown in FIG. 1A to FIG. 1D, FIG. 2, FIG. 3, FIG. 4A to FIG. 4C, and FIG. 5. The electronic camera 1 and stand 18 are such that the stand 18 supplies power to the electronic camera 1 and exchanges data with the electronic camera 1 via a connection 4 and a connection 20 each of which has electric contacts.

The electronic camera 1 is designed not only to enable a suitable operation mode to be selected and set according to the direction in which the electronic camera 1 is mounted on the stand 18 but also to inhibit an unsuitable operation mode from being set. That is, the electronic camera of the first embodiment is capable of carrying out operations at least in a charging mode in which a built-in secondary battery is charged, a photographing mode in which photographing is done, a reproducing mode in which reproducing is done, a printing mode in which printing is done, or an external communication mode in which communication with an external personal computer (PC) or the like is performed. Hereinafter, a more concrete configuration will be explained.

FIG. 1A to FIG. 1D show a schematic configuration of an electronic camera according to the first embodiment of the present invention. As shown in FIG. 1A to FIG. 1D, a release button 2 for giving a photograph instruction and others are provided on the top of the electronic camera 1. The release button 2 and others are formed so as not to project from the surface of the camera case. At the back of the electronic camera 1, a liquid-crystal display (LCD) 3 for displaying photographic images or various menus and others are provided. In the center position of the left side face of the electronic camera 1, there is provided a connection 4 for supplying power from the stand 18 and exchanging data with the stand, which will be explained later. The connection 4 is designed to be covered by a sliding lid 5. On the front of the electronic camera 1, there are provided a strobe light-emitting window 6 for emitting strobe light when the amount of light of the subject is insufficient, a remote control signal light-receiving window 7 for receiving a remote control signal (or an optical signal using infrared rays or the like) sent from a remote controller (not shown), a lens barrel unit 8 with a photographing lens section, and others. In the electronic camera 1, there are provided a wiring board 9, a battery compartment 10, and others.

Figure 1C:
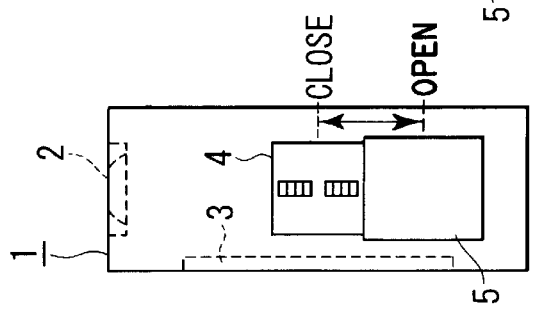
Figure 1B:
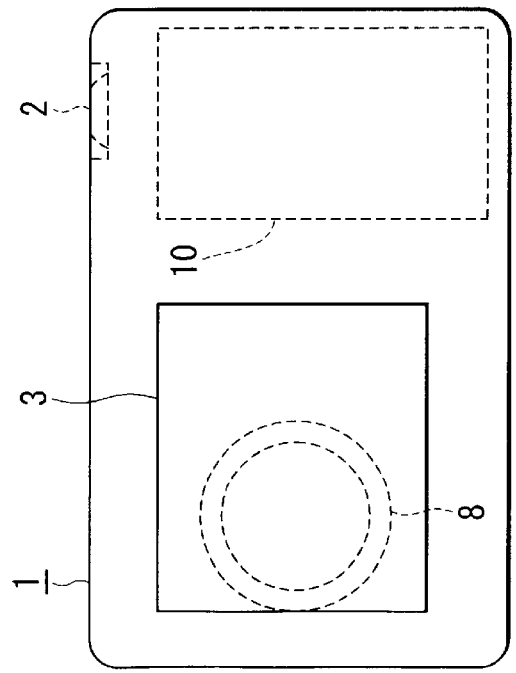
Figure 2:
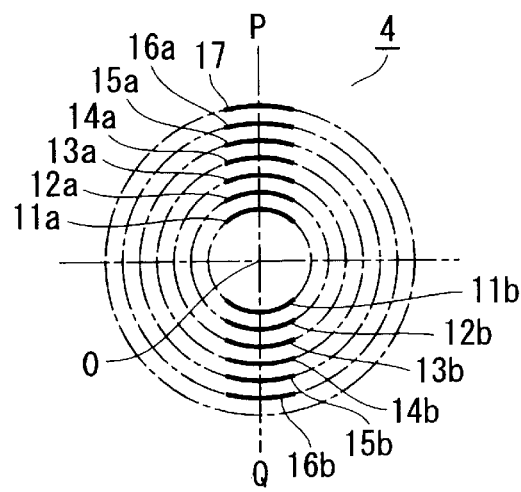
FIG. 2 is an enlarged plan view showing the configuration of a connection provided on the left side face of the electronic camera shown in FIG. 1C.

FIG. 2 is an enlarged plan view of the connection on the electronic camera side shown in FIG. 1C. As shown in FIG. 2, the connection 4 includes a plurality of electric contacts 11 (11a, 11b), 12 (12a, 12b), 13 (13a, 13b), 14 (14a, 14b), 15 (15a, 15b), 16 (16a, 16b), and 17. These electric contacts 11 to 17 are formed as shown in the figure in such a manner that they enable power to be supplied from the stand 18 and data transmission and reception to and from the stand 18 to be carried out whether the camera 1 is mounted with the front of the camera 1 facing the front or back of the stand. That is, the individual electric contacts 11 to 17 are divided into an a-contact group and a b-contact group and arranged in such a manner that these groups are provided so as to face each other with a 180° difference in position between them on a straight line P-Q crossing radially a plurality of concentric circles (dotted lines in FIG. 2) arranged at regular intervals with point O in the center. As shown in the figure, each of the electric contacts 11 to 17 has a specific length and is shaped like an arc. There is a continuity between the electric contacts 11a and 11b inside the electronic camera 1. The same holds true for the electric contacts 12a and 12b, . . . , the electric contact 16a and 16b. The electric contact 17 provided on the outermost side of the contact group a is a contact used to determine the direction in which the electronic camera is mounted on the stand 18. The electric contact 17 is provided only on the a-contact group side, not on the b-contact group side.

Figure 3:
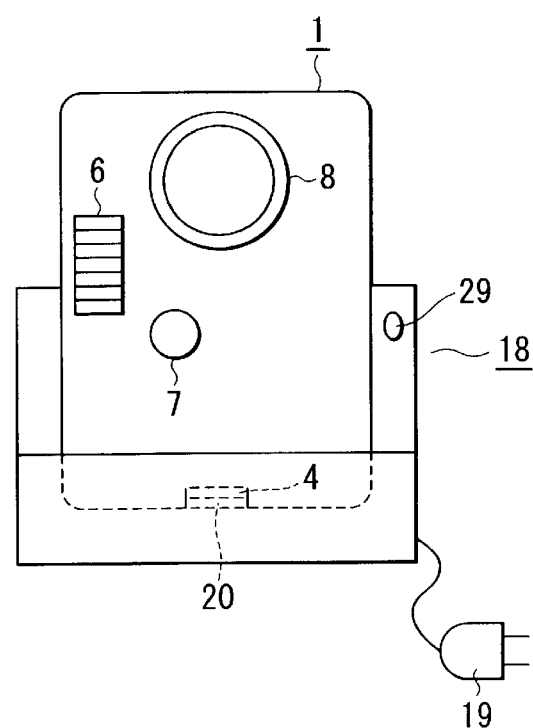
FIG. 3 is a front view showing a state where the electronic camera according to the first embodiment of the invention is mounted on a stand in such a manner that the front of the camera faces to the front of the stand.
Figure 4C:
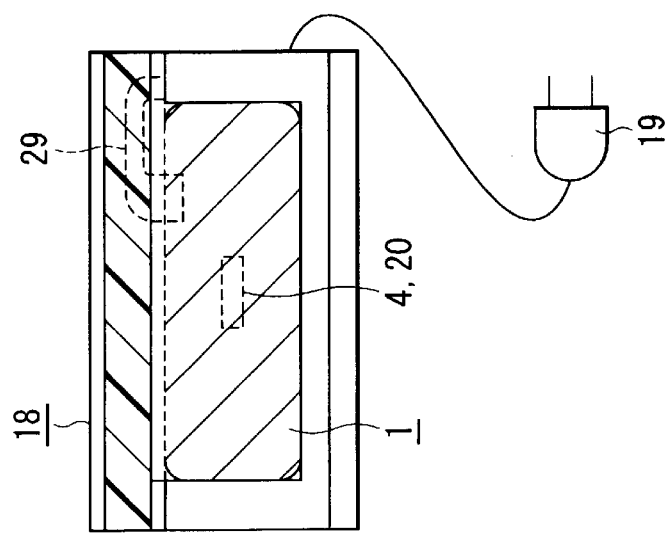
FIG. 4A to FIG. 4C are drawings showing a state where the electronic camera according to the first embodiment of the invention is mounted on the stand in such a manner that the back of the camera faces to the front of the stand, where
Figure 4B:
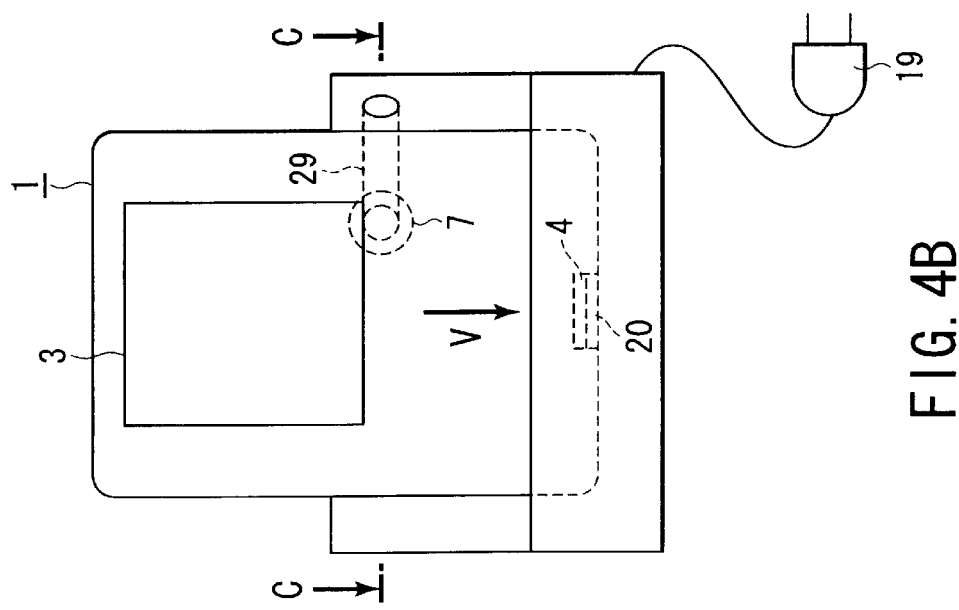
Figure 4A:
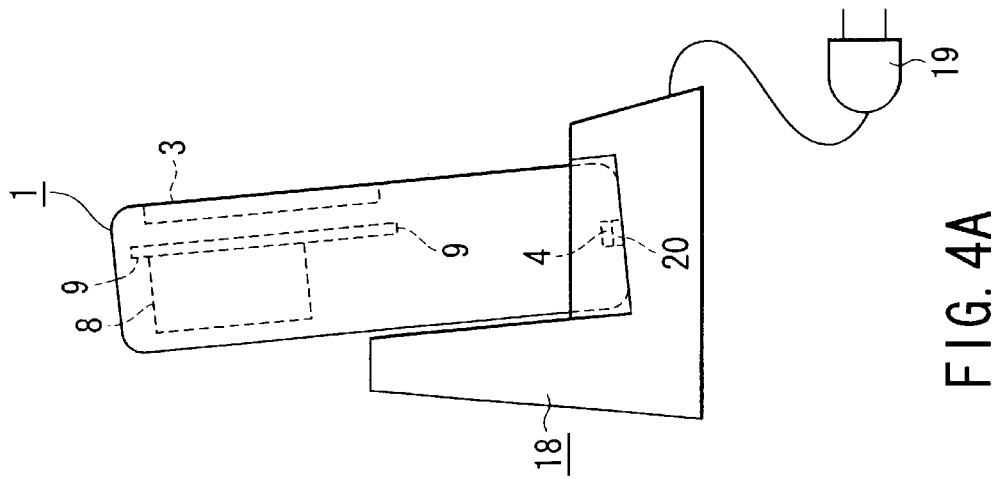

FIG. 3 is a front view showing a state where the electronic camera according to the first embodiment of the invention is mounted on the stand in such a manner that the front of the camera faces to the front of the stand. FIG. 4A to FIG. 4C show a state where the electronic camera according to the first embodiment of the invention is mounted on the stand in such a manner that the back of the camera faces to the front of the stand. FIG. 4A is a left side view. FIG, 4B is a front view. FIG. 4C is a sectional view taken along line C—C of FIG. 4B.

As shown in FIG. 3, the electronic camera 1 has such an exterior as can be mounted on the stand 18 with the left side face of the camera 1 down in a state where the sliding lid 5 is open. As shown in FIG. 3, the stand 18 has such an exterior as enables the electronic camera 1 to be mounted either in a first direction in which the front of the camera faces to the front of the stand or in a second direction in which the back of the camera faces to the front of the stand as shown in FIG. 4A and FIG. 4B. The stand 18 has an AC power supply plug 19 outside of it. The stand 18 has power supplying means (not shown) for supplying power to the mounted electronic camera 1 in it.

In the center of the camera mounting section of the stand 18, a connection 20 for supplying power to the electronic camera 1 and performing data transmission and reception to and from the electronic camera 1 is provided in such a manner that the connection faces the connection 4 of the electronic camera 1.

As described above, the connection is so formed that, even when the camera is mounted on the stand 18 in such a manner that the front of the camera faces to either the front or the back of the stand, the relative positions of the connection 4 of the electronic camera 1 and the connection 20 of the stand remain unchanged.

Figure 5:
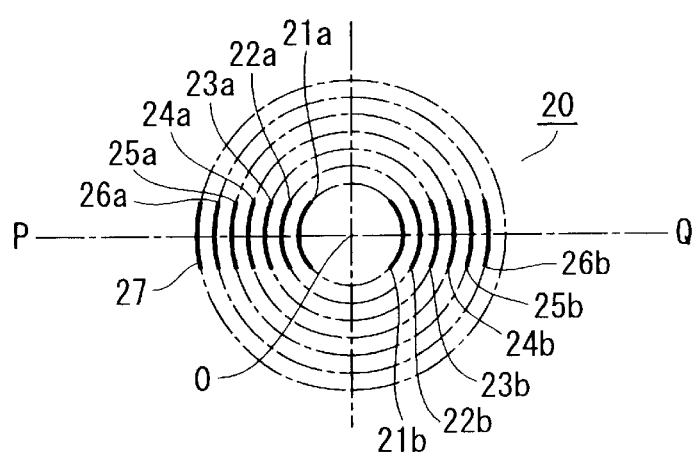
FIG. 5 is an enlarged plan view showing the configuration of a connection provided on the camera mounting section of the stand shown in FIG. 3 and FIG. 4A to FIG. 4C.

FIG. 5 is an enlarged plan view showing a configuration of the connection on the stand side shown in FIG. 3 and FIG. 4A to FIG. 4C. FIG. 5 shows the connection viewed from the mounting direction (inserting direction or installing direction) of the electronic camera as shown by the arrow V in FIG. 4B.

As shown in FIG. 5, the connection 20 has electric contacts 21 (21a, 21b), 22 (22a, 22b), 23 (23a, 23b), 24 (24a, 24b), 25 (25a, 25b), 26 (26a, 26b), and 27 corresponding to the electric contacts 11, 12, 13, 14, 15, 16, and 17 of the connection 4 of the electronic camera 1. These electric contacts 21 to 27 are formed in the same manner as the electric contacts 11 to 17 of the connection 4.

Specifically, the individual electric contacts 21 to 27 are divided into an a-contact group and a b-contact group and arranged in such a manner that these groups are provided so as to face each other with a 180° difference in position between them on a straight line P-Q crossing radially a plurality of concentric circles (dotted lines in FIG. 5) arranged at regular intervals with point O in the center. As shown in the figure, each of the electric contacts 21 to 27 has a specific length and is shaped like an arc. There is a continuity between the electric contacts 21a and 21b inside the electronic camera 1. The same holds true for the electric contacts 22a and 22b, . . . , the electric contact 26a and 26b. The electric contact 27 provided on the outermost side of the contact group a is a contact used to determine the direction in which the electronic camera 1 is mounted on the stand 18. The electric contact 27 is provided only on the a-contact group side, not on the b-contact group side.

The a-contact group and b-contact group of the connection 4 in the electronic camera 1 and the a-contact group and b-contact group of the connection 20 in the stand 18 are so formed that, when the connection 4 and the connection 20 are rotated relatively through 180° with point O in the center, the corresponding contact groups overlap with one another.

Accordingly, when the electronic camera 1 is mounted on the stand 18 in the first direction so that the front of the camera may face to the front of the stand, one a-contact group comes into contact with the other a-contact group and establishes a continuity between them, that is, the electric contacts 11a, 12a, 13a, 14a, 15a, 16a, 17 of the connection 4 make contact with the electric contacts 21a, 22a, 23a, 24a, 25a, 26a, 27 of the connection 20 and establish a continuity between them. At the same time, one b-contact group comes into contact with the other b-contact group and establishes a continuity between them, that is, the electric contacts 11b, 12b, 13b, 14b, 15b, 16b of the connection 4 make contact with the electric contacts 21b, 22b, 23b, 24b, 25b, 26b of the connection 20 and establish a continuity between them.

When the electronic camera 1 is mounted on the stand 18 in the second direction so that the back of the camera may face to the front of the stand, the a-contact group of the connection 4, or the electric contacts 11a, 12a, 13a, 14a, 15a, 16a, comes into contact with the b-contact group of the connection 20, or the electric contacts 21b, 22b, 23b, 24b, 25b, 26b, and establishes a continuity between them. At the same time, the b-contact group of the connection 4, or the electric contacts 11b, 12b, 13b, 14b, 15b, 16b, comes into contact with the a-contact group of the connection 20, or the electric contacts 21a, 22a, 23a, 24a, 25a, 26a, and establishes a continuity between them.

In the latter case, the electric contact 17 of the connection 4 in the electronic camera 1 does not make contact with the electric contact 27 of the connection 20 in the stand 18. Thus, by sensing the contact/uncontact (or continuity/discontinuity) between the electric contact 17 and the electric contact 27, the camera 1 can determine automatically whether the front of the camera faces to either the front of the stand or the back of the stand.

The stand 18 has a light guide 29 as shown in FIG. 3, FIG. 4B, and FIG. 4C. When the camera is mounted in the second direction so that the back of the camera may face to the front of the stand, the light guide 29 directs a remote control signal sent from the stand front side (or camera back side) to the remote control signal light-receiving window 7. Therefore, regardless of whether the front of the camera faces the front of the stand or the back of the stand, the remote control signal can still be received.

In addition to the parts described above, the stand 18 also includes a video signal output terminal and a USB terminal.

Figure 6:
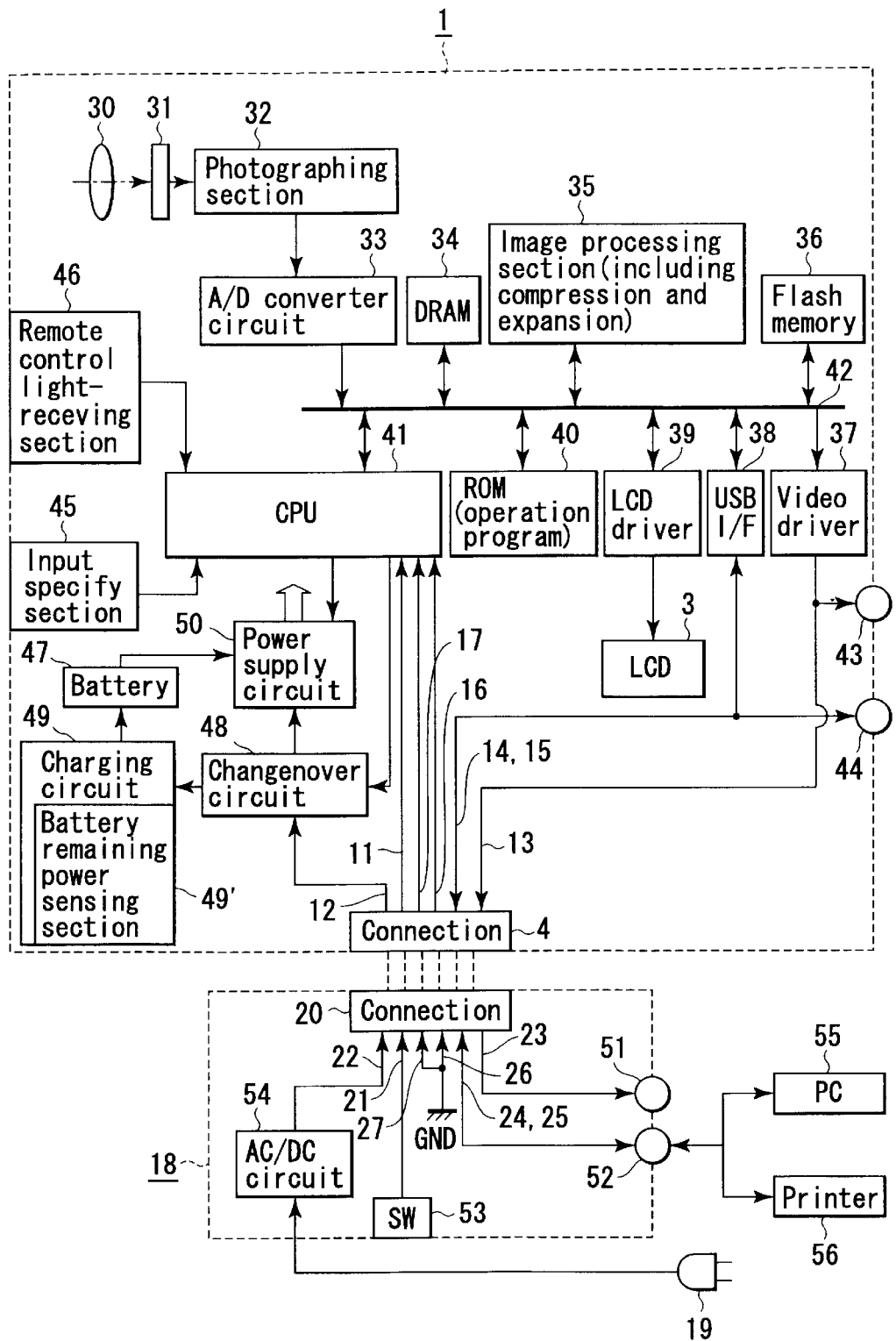
FIG. 6 is a block diagram showing a primary configuration of the electronic camera system according to the first embodiment of the present invention.

FIG. 6 is a block diagram showing a primary configuration of an electronic camera system including the electronic camera 1 and stand 18. In the upper part of FIG. 6, a system configuration of the electronic camera 1 is shown. In the lower part of FIG. 6, a system configuration of the stand 18 is shown.

First, the system configuration of the electronic camera 1 will be explained. A photographing lens section 30 is a photographing optical system which forms an image of a subject on a photographing element 31.

The photographing element 31 converts the formed subject image photoelectrically and outputs an electric signal (analog signal) representing the image.

A photographing section 32 is configured so as to enable CDS (Correlated Double Sampling) and AGC (Automatic Gain Control). The photographing section 32 removes reset noise from the electric signal (analog signal) outputted from the photographing element 31 or adjusts its signal level.

An A/D converter circuit 33 converts the output signal (analog signal) from the photographing section 32 into a digital signal (digital data).

Not only the A/D converter circuit 33 but also a DRAM 34, an image processing section 35, a flash memory 36, a video driver 37, a USB (Universal Serial Bus) I/F 38, an LCD driver 39, a ROM 40, a CPU 41 and others are all connected to a bus line 42. Through the bus line 42, they exchange data with each other.

The DRAM 34 is used as a buffer memory that temporarily stores the image data output from the A/D converter circuit 33, the image data processed by the CPU 41, and the like. The DRAM 34 is also used as a work memory for various processes.

The image processing section 35 carries out a γ correction process (γ for recording), a color process (white balance), and other processes on the image data to correct the brightness, saturation, and hue of an image and the like. The image processing section 35 further carries out an image data compression process and an image data expansion process or the like. The compression process and expansion process are performed by, for example, JPEG (Joint Photographic Experts Group).

The flash memory 36 is a rewritable memory in which image data is recorded (stored).

The video driver 37 is a circuit that converts image data into a video signal for a display unit, such as a TV (television) connected to the video signal output terminal 43.

The USB-I/F 38 is an interface for exchanging data with an external unit connected to the USB terminal 44, such as a PC (personal computer) or a printer.

The LCD driver 39 drives and controls the LCD (liquid-crystal display) 3 to cause the LCD 3 to display image information or the like on the basis of the image data.

The ROM 40 is a memory in which an operation program for controlling the electronic camera 1 is stored.

The CPU (central processing unit) 41 control the operation of the entire camera according to the camera program stored in the ROM 40, using the DRAM 34 as a work area. For example, the CPU 41 carries out a process according to the user's instruction accepted via an input section 45, a process according to the remote control signal inputted via a remote control signal light-receiving section 46, or the like.

Furthermore, the CPU determines the direction in which the electronic camera 1 is mounted, from the coupling relationship of the connection 20 with the connection 4. On the basis of the determination, the CPU not only selects and sets a suitable operation mode according to the mounting direction but also carries out the process of inhibiting an unsuitable operation mode from being set.

The input section 45 includes the release button 2 and various other buttons, including a power switch (not shown). The input section accepts various instructions from the user via the various buttons and switches and informs the CPU 41 of the accepted instructions.

The remote control signal light-receiving section 46 receives a remote control signal sent from a remote control unit (not shown) and supplies its output signal to the CPU 41.

The connection 4, as described above, is for supplying power from the stand 18 and transmitting and receiving data to and from the stand 18. The electric contact 13 in the connection 4 is connected to the output terminal of the video driver 37 and outputs a video drive signal. The electric contacts 14, 15 are connected to the USB-I/F 38 and transmit and receive USB signals. The electric contact 16 is connected to the CPU 41 and transmits information on whether the electronic camera 1 is mounted on the stand 18. The electric contact 17 is also connected to the CPU 41 and transmits information on the direction in which the electronic camera 1 is mounted on the stand 18. The electric contact 11 is also connected to the CPU 41 and transmits an instruction signal to provide ON/OFF of the power supply of the electronic camera 1. The electric contact 12 is connected to a changeover circuit 48 and supplies power from the stand 18.

Although not shown, the electric contacts 16 and 17 are Biased toward a specific voltage. Thus, according to whether the electric contact 16 is connected to GND, it is sensed whether the electronic camera 1 is mounted on the stand 18.

In the first embodiment, when the electric contact 16 is connected to GND, it is determined that the electronic camera 1 is mounted on the stand 18. When the electric contact 17 is connected to GND, it is determined that the front of the camera faces to the front of the stand.

A battery 47, which is either a primary battery or a secondary battery, supplies electric power to the electronic camera 1.

The changeover circuit 48 switches the supply destination of the power supply obtained via the connection 4 to either a charging circuit 49 or a power supply circuit 50 under the control of the CPU 41. For example, when the battery 47 is a primary battery, the changeover circuit 48 switches the supply destination of the power supply to the power supply circuit 50.

The charging circuit 49 includes a battery remaining power sensing section 49' for sensing the amount of remaining power of the battery 47 (or the amount of remaining power of the power supply). When the battery remaining power sensing section 49' senses that the amount of remaining power of the secondary battery 47 is insufficient, the charging circuit 49 charges the battery 47.

The power supply circuit 50 controls the power supply supplied from the battery 47 or the changeover circuit 48 under the control of the CPU 41, thereby supplying electric power to each section of the electronic camera 1.

In the electronic camera 1 with the above configuration, if the stand 18 has the ability to provide a sufficient power supply, the changeover circuit 48 may be omitted and the stand 18 may supply power to both the secondary battery 47 and the power supply circuit 50.

Next, the system configuration of the stand 18 will be explained. The connection 20 is for supplying power to the electronic camera 1 and transmitting and receiving data to and from the electronic camera 1. The electric contact 23 in the connection 20, which is connected to a video signal output terminal 51, is capable of outputting a video signal. The electric contacts 24, 25, which are connected to a USB terminal, are capable of transmitting and receiving USB signals. The electric contact 26, which is connected to GND, provides information on whether the electronic camera 1 is mounted on the stand 18, by supplying the ground potential to the electronic camera 1 side via the connection 4. The electric contact 27, which is also connected to GND, provides information on the direction in which the electronic camera 1 is mounted on the stand 18, by supplying the ground potential to the electronic camera 1 side via the connection 4.

The electric contact 21 is connected to a stand switch (Power SW) 53. The stand switch 53 is for giving an instruction to provide ON/OFF of the power supply of the mounted electronic camera 1. Thus, an instruction to provide ON/OFF of the power supply by the ON/OFF operation on the stand switch 53 is transmitted via the electric contact 21 to the electronic camera side. The electric contact 22 is connected to the output terminal of an AC/DC converter circuit 54. The AC/DC converter circuit 54 is a circuit that converts, for example, a 100V AC power supply input by an AC power supply plug 19 into, for example, a 6V DC power supply. Therefore, the DC power supply converted by the AC/DC converter circuit 54 is supplied to the electronic camera side via the electric contact 22.

The vide signal output terminal 51 is for outputting a video signal to a display unit connected to the terminal, such as a TV. The USB terminal 52 is for exchanging a USB signal with an external unit connected to the terminal 52, such as a PC 55 or a printer 56.

Next, the operation modes selected and set according to the mounting direction of the electronic camera 1 and the operation modes inhibited from being set in the first embodiment will be explained.

FIG. 7 shows an example of the relationship between the mounting directions of the electronic camera 1 and the operation modes selected and set and the operation modes inhibited from being set. In the figure, the mark ○ indicates an operation mode to be selected and set according to the mounting direction of the electronic camera 1. The mark × indicates an operation mode to be inhibited from being set according to the mounting direction of the electronic camera 1. The mark Δ indicates a mode to be selected and set according to an instruction from the user via the PC 55. As for the charging mode, it is set only when the power supply of the electronic camera 1 is off, regardless of the direction in which the electronic camera 1 is mounted.

As shown in FIG. 7, when it is determined that the electronic camera 1 is mounted on the stand 8 in the first direction so that the front of the camera may face to the front of the stand, not only the charging mode (when the power supply is off) or the photographing mode (when the power supply is on) is selected and set, but also control is performed so that the reproducing mode and the printing mode are inhibited from being set. The reason is that there is no sense in displaying the reproduced image or the printing image instruction behind the back of the stand, as the user cannot see it.

If the electronic camera 1 is mounted on the stand 18 in the first direction and the power supply of the electronic camera 1 is on, when the PC 55 is connected to the USB terminal 52 of the stand 18 and the user operates the input section (such as a keyboard) of the PC 55 to give a specific instruction to the electronic camera 1, the operation mode is changed from the photographing mode to the PC communication mode and the processes corresponding to the instruction are carried out.

For example, the photographing process corresponding to a photograph instruction or the process corresponding to the instruction to transfer image data (or image file) recorded in the flash memory 36 of the electronic camera 1 is carried out. In this case, however, when the user's instruction specifies a process (such as a reproduction process or printing process) related to the operation mode marked with the symbol ×, the process related to the operation mode is not carried out, because the operation mode is inhibited from being set.

As shown in FIG. 7, when the electronic camera 1 is mounted on the stand 18 in the second direction so that the back of the camera may face to the front of the stand, not only is the charging mode (when the power supply is off) or the reproducing mode (when the power supply is on) selected and set according to the ON-OFF state of the power supply, but also control is performed so that the photographing mode is inhibited from being set. The reason why the photographing mode is inhibited is that, if photographing were effected with the photographing lens section 30 and the like facing the back of the stand, only a disappointing result would be obtained.

If the electronic camera 1 is mounted on the stand 18 in the second direction and the power supply of the electronic camera 1 is on, when the PC 55 is connected to the USB terminal 52 of the stand 18 and the user operates the input section of the PC 55 to give a specific instruction to the electronic camera 1, the operation mode is changed from the reproduction mode to the PC communication mode and the process corresponding to the instruction is carried out.

For example, the reproducing process corresponding to a reproduce instruction or the process corresponding to an instruction to transfer the image data recorded in the flash memory 36 of the electronic camera 1 is carried out. When the instruction is a print instruction, the operation mode is changed to the printing mode and the processes corresponding to the instruction are carried out. In this case, too, when the user's instruction specifies a process (in this case, the photographing process) related to the operation mode marked with the symbol ×, the process related to the operation mode is not carried out, because the operation mode is inhibited from being set.

Next, an example of the operation of the first embodiment will be explained. With both the power supply switch of the electronic camera 1 and the stand switch 53 being off, when the electronic camera 1 is mounted on the stand 18 so that the front of the camera faces either the front or the back of the stand, the electric contacts 11 to 16 of the electronic camera 1 come into contact with the electric contacts 21 to 26 of the stand 18, respectively. As a result of the electric contact 16 making contact with the electric contact 26 (GND), it is sensed that the electronic camera 1 has been mounted on the stand 18. At this time, the direction in which the electronic camera 1 is mounted is determined, depending on whether the electric contact 17 has made contact with the electric contact 27. Then, according to the determined direction in which the electronic camera 1 has been mounted, not only is a suitable operation mode selected and set, but also the improper operation modes are inhibited from being set. At this point in time, however, because the power supply of the electronic camera 1 is off, the operation mode to be selected and set is the charging mode, regardless of the mounting direction of the electronic camera 1.

When it is determined that the electric contacts 17 and 27 are in contact with each other and the electronic camera is mounted in such a manner that the front of the camera faces the front of the stand, the reproducing mode and the printing mode are inhibited from being set. When it is determined that the electric contacts 17 and 27 are not in contact with each other and the electronic camera is mounted so that the back of the camera faces the front of the stand, the photographing mode is inhibited from being set. Determination of the mounting direction of the electronic camera 1 is performed each time the electronic camera 1 is mounted on the stand 18.

It is now assumed that the electronic camera 1 is mounted on the stand 18. Now, the stand 18 supplies power to the electronic camera 1 via the electric contacts 22, 12. At this time, the operation mode set in the electronic camera 1 is the charging mode. Therefore, the changeover circuit 48 switches the power supply destination to the charging circuit 49, which starts to charge the battery 47, a secondary battery. When the amount of the remaining power of the battery 47, a secondary battery, indicates Full, or when the battery 47 is a primary battery, the charging operation is not performed.

Here, when the stand switch 53 is turned on to turn on the power supply of the electronic camera 1, the CPU 41 is informed via the electric contacts 21, 11 of an instruction to turn on the power supply. Then, the changeover circuit 48 switches the power supply destination to the power supply circuit 50. Thus, electric power is supplied to each section of the electronic camera 1 via the power supply circuit 50. As described above, when the power supply of the electronic camera 1 is turned on, the operation mode is changed from the charging mode to a specific operation mode according to the determined mounting direction of the electronic camera 1.

For example, when it is determined that the camera is mounted so that the front of the camera faces the front of the stand, the operation mode is changed from the charging mode to the photographing mode. In a state where the operation mode has been changed to the photographing mode, when a photograph instruction is received from, for example, a remote control unit (not shown), the photographing process corresponding to the instruction is carried out.

Furthermore, in a state where the PC 55 is connected to the USB terminal 52 of the stand 18, when the user operates the input section of the PC 55 to give a specific instruction to the electronic camera 1, the operation mode is changed from the photographing mode to the PC communication mode and the process corresponding to the instruction is carried out. For example, the photographing process corresponding to the photograph instruction, the process corresponding to the image data transfer instruction, or the like is carried out. At this time, however, since the reproduction mode and the printing mode are inhibited from being set, neither the reproducing process nor the printing process are carried out, even if the user gives a reproduce instruction or a print instruction. Here, to execute the reproducing process or printing process with the electronic camera 1 mounted on the stand 18, the user has only to change the mounting direction of the electronic camera 1.

If the power supply of the electronic camera 1 is turned on, when it is determined that the back of the camera faces the front of the stand, the operation mode is changed from the charging mode to the reproducing mode. In a state where the operation mode has been changed to the reproducing mode, a reproduce instruction is received from, for example, the remote control unit (not shown), the reproducing process is carried out according to the instruction. In this case, however, the optical signal from the remote control unit is inputted via the light guide 29 of the stand 18.

Furthermore, in a state where the PC 55 is connected to the USB terminal 52 of the stand 18, when the user operates the input section of the PC 55 to give a specific instruction to the electronic camera 1, the operation mode is changed from the reproducing mode to the PC communication mode and the process corresponding to the instruction is carried out. For example, the reproducing process corresponding to a reproduce instruction, the process corresponding to an image data transfer instruction, or the like is carried out. When the instruction is a print instruction, the operation mode is changed to the printing mode and the printing process corresponding to the print instruction is carried out. At this time, however, since the photographing mode is inhibited from being set, the photographing process is not carried out, even if the user gives a photograph instruction. Here, to execute a photographing process with the electronic camera 1 mounted on the stand 18, the user has only to change the mounting direction of the electronic camera 1.

As described above, with the first embodiment, even when the electronic camera 1 is mounted on the stand 18 in such a manner that the front of the camera faces to the front or the back of the stand, it is possible to supply power from the stand 18 to the electronic camera 1 and achieve data transmission and reception between the electronic camera 1 and the stand 18. Therefore, the user can make good use of the electronic camera 1 mounted on the stand 18.

Furthermore, according to the mounting direction of the electronic camera 1, a suitable operation mode for the mounting direction is selected and set automatically. Thus, there is no need for the user to operate the input specify section 45 of the electronic camera 1 manually and select and set the operation mode as in the prior art. There is no possibility that limited operations will cause the operation mode to be selected or set erroneously. Since the setting of the operation modes unsuitable for the mounting direction is automatically inhibited according to the mounting direction of the electronic camera 1, neither a meaningless process nor an unwanted process is carried out.

In addition, the following modification of the first embodiment can be considered. For example, the way the electronic camera 1 is connected to the stand 18 is not limited to the use of the connection 4 shown in FIG. 2 and the connection 20 shown in FIG. 5. Any connection form may be used, provided that the connection between the front of the camera and the front of the stand is possible even when the electronic camera 1 is mounted on the stand 18 so that the front of the camera faces to either the front or the back of the stand. For instance, in the connection 4 shown in FIG. 2, the electric contacts 11b, 12b, 13b, 14b, 15b, 16b may be eliminated from the configuration. Moreover, in the connection 20 shown in FIG. 5, the electric contacts 21b, 22b, 23b, 24b, 25b, 26b may be eliminated from the configuration.

While in the first embodiment, means for sensing the direction in which the electronic camera 1 is mounted is configured so as to use the contact/noncontact (or continuity/discontinuity) between the electric contacts 17 and 27, the present invention is not limited to this. For instance, a mounting direction sensing switch may be provided on the electronic camera 1 and further a projecting part corresponding to the mounting direction sensing switch may be provided on the stand 18. With this configuration, only when the camera is mounted in such a manner that the front of the camera faces the front or the back of the stand, the projecting part pushes back the mounting direction sensing switch to turn on the switch. Alternatively, an optical sensor may be provided on the electronic camera 1, and further, a light cutting-off projecting part or the like may be disposed on the stand 18. With this configuration, only when the camera is mounted in such a manner that the front of the camera faces the front or the back of the stand, the projecting part or the like cuts off the light to turn on the mounting direction sensing switch. Furthermore, if an AE (Automatic Exposure) sensor and a WB (White Balance) sensor or the like are provided at the front of the camera, when the camera is mounted so that the front of the camera faces the back of the stand, those sensors are covered with the back of the stand and therefore the outputs of the sensors become low.

(Second Embodiment)

Figure 8:
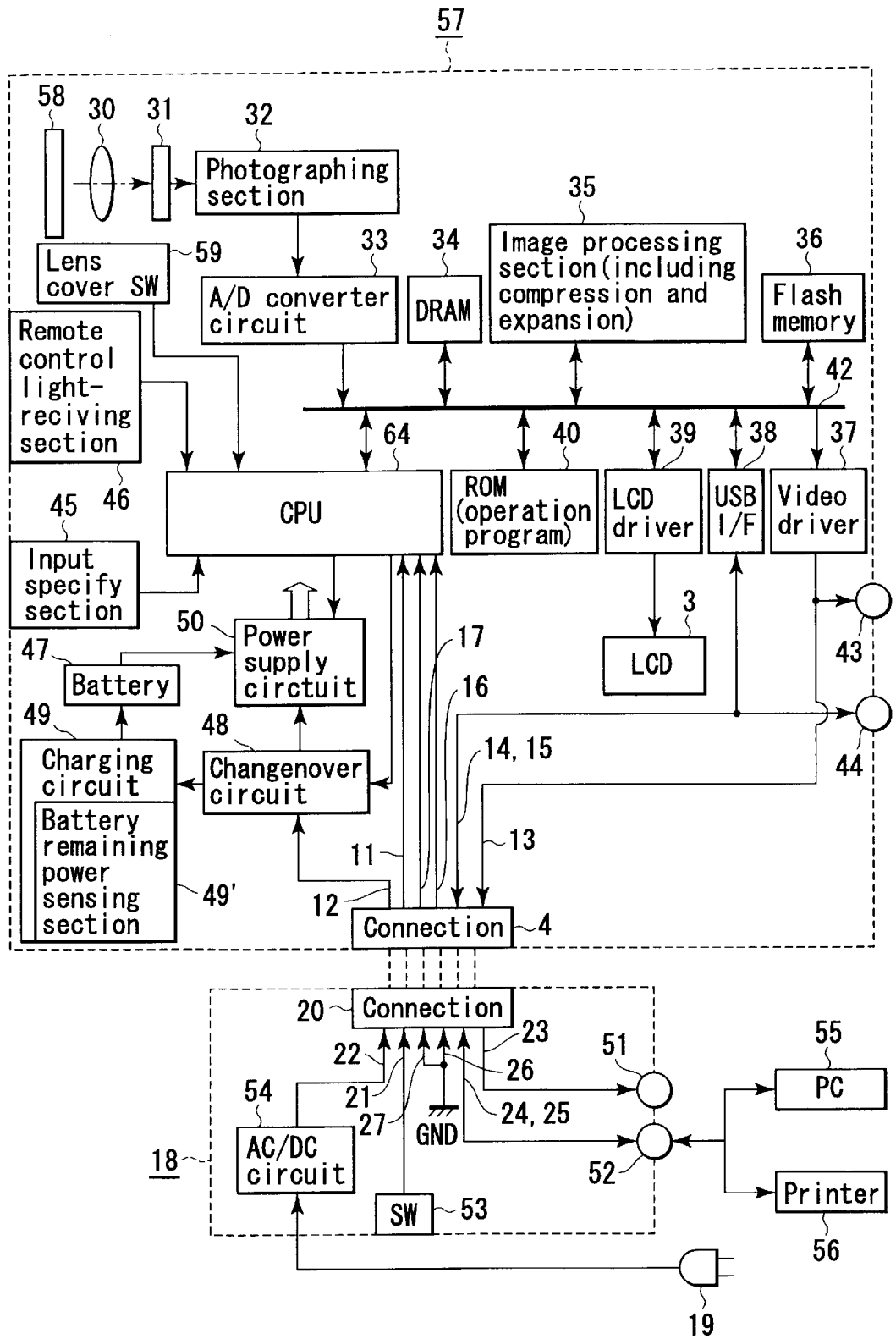
FIG. 8 is a block diagram showing a primary configuration of an electronic camera system according to a second embodiment of the present invention.

FIG. 8 is a block diagram showing a primary configuration of an electronic camera system including an electronic camera 1 and a stand 18 according to a second embodiment of the present invention. To simplify an explanation, the same parts as those in FIG. 6 are indicated by the same reference numerals and an explanation of the parts is omitted.

As shown in FIG. 8, an electronic camera 57 according to the second embodiment further comprises a lens cover (or a lens barrier) 58 for protecting the photographing lens section 30 and the like and a lens cover switch (SW) 59. The lens cover 58 of the second embodiment, which is a manually-operated cover, can be opened and closed freely by the user. The lens cover switch 59 is a switch that performs on/off operations in such a manner that it interlocks with the opening and closing of the lens cover 58.

The CPU 64 carries out almost the same processes as those carried out by the CPU 41 shown in FIG. 6. The CPU 64 differs from the CPU 41 in that the former carries out the processes taking into account the open or closed state of the lens cover 58 when a suitable operation mode is selected and set according to the mounting direction of the electronic camera 57, and unsuitable operation modes are inhibited from being set.

FIG. 9 shows an example of the relationship between the mounting direction of the electronic camera 1, the open or closed state of the lens cover 58, the operation modes to be selected and set, and the operation modes to be inhibited from being set. The marks ○, ×, Δ shown in the figure have the same meanings as those in FIG. 7.

In FIG. 9, when the lens cover 58 is in the open state (I), (III), the operation modes to be selected and set are the same as the operation modes shown in FIG. 6. With the lens cover in the closed state (II), (IV), when the power supply of the mounted electronic camera 57 is off, the charging mode is selected and set, regardless of the mounting direction of the electronic camera 57.

If the electronic camera 57 is mounted on the stand 18 in the first direction so that the front of the camera faces the front of the stand and the lens over 58 is in the closed state (II), when the power supply of the electronic camera 57 is turned on, not only is the PC communication mode selected and set, but also the reproduction mode, printing mode, and photographing mode are inhibited from being set. The reason why the photographing mode is inhibited from being set is that the photographing process cannot be carried out with the lens cover 58 in the closed state.

If the electronic camera 57 is mounted on the stand 18 in the second direction so that the back of the camera faces the front of the stand and the lens over 58 is in the closed state (IV), when the power supply of the electronic camera 57 is turned on, not only is the PC communication mode selected and set, but also the reproduction mode and photographing mode are inhibited from being set. In this case, however, when the user gives a print instruction via the PC 55, the operation mode is changed to the printing mode and the printing process corresponding to the print instruction is carried out.

Even if a manually operated lens cover 58 is provided, as in the electronic camera 57 of the second embodiment, a suitable operation mode according to the mounting direction of the electronic camera 57 can be selected and set automatically and the setting of the unsuitable operation modes can be inhibited automatically.

In the second embodiment, the opening/closing of the lens cover 58 in the electronic camera 1 may be linked with the turning on and off of the power supply.

(Third Embodiment)

Figure 10:
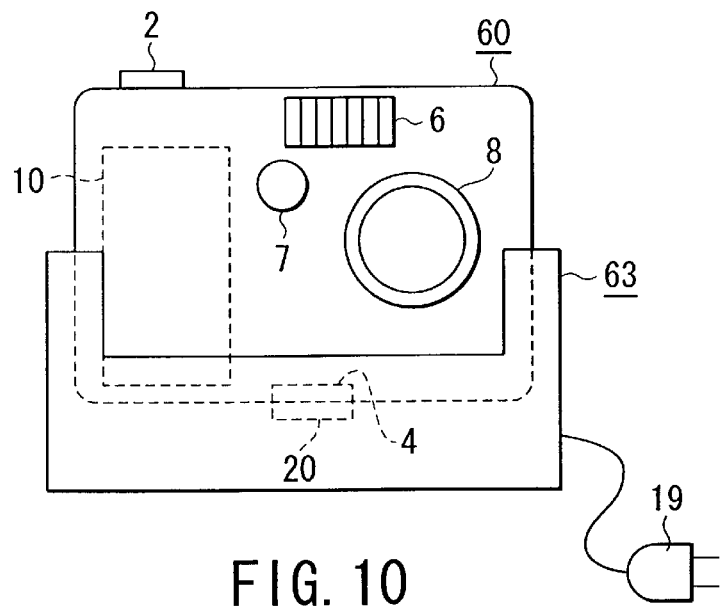
FIG. 10 is a front view showing a state where an electronic camera according to a third embodiment of the present invention is mounted on a stand in such a manner that the front of the camera faces to the front of the stand.
Figure 11A:
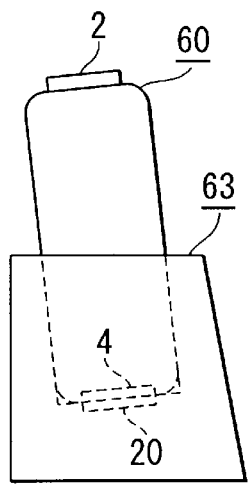
FIG. 11A and FIG. 11B are drawings showing a state where the electronic camera according to the third embodiment of the invention is mounted on the stand in such a manner that the back of the camera faces to the front of the stand, where
Figure 11B:
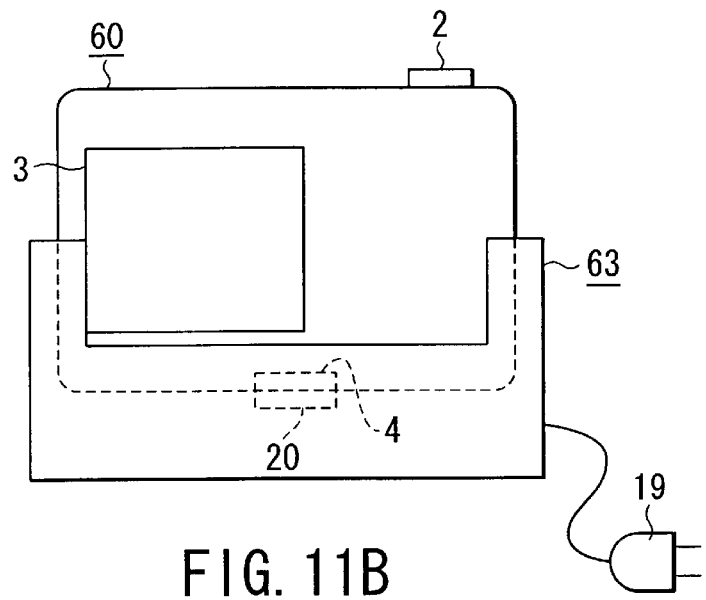
Figure 12:
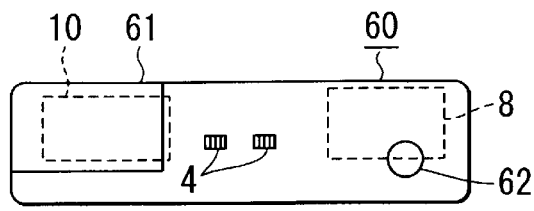
FIG. 12 is a bottom view of the electronic camera according to the third embodiment of the present invention.

FIG. 10 is a front view showing a state where an electronic camera according to a third embodiment of the present invention is mounted on a stand so that the front of the camera faces to the front of the stand. FIG. 11A and FIG. 11B are drawings showing a state where the electronic camera is mounted on the stand so that the back of the camera faces to the front of the stand, where FIG. 11A is a left side view and FIG. 11B is a front view. FIG. 12 is a bottom view of the electronic camera of the third embodiment. To simplify an explanation, the same parts in FIG. 10 to FIG. 12 as those in the first embodiment (FIG. 1A to FIG. 7) are indicated by the same reference numerals and an explanation of the parts is omitted.

In the third embodiment, the connection 4 is provided at the base of the camera and the stand is provided so as to correspond to the connection. As shown in FIG. 10, FIG. 11A, and FIG. 11B, and FIG. 12, an electronic camera 60 of the third embodiment has a connection 4 in the center of the base. The connection 4 has the same configuration as that of the connection 4 shown in FIG. 2. In part of the base of the camera, a battery lid 61, a tripod screw 62, and others are provided. The battery lid 61 is opened and closed when the battery housed in a battery compartment 10 is replaced. A stand 63 of the third embodiment has a connection 20 in the center of the camera mounting section so that the connection 20 faces the connection 4 of the mounted electronic camera 60. The connection 20 of the stand has the same configuration as that of the connection 20 shown in FIG. 5.

As described above, even when the camera is mounted on the stand 18 so that the front of the camera faces either the front or the back of the stand, the relative position of the connection 4 of the electronic camera 60 and the connection 20 of the stand 63 remains unchanged.

Although not shown, a light guide 29 as shown in FIG. 3, FIG. 4B, and FIG. 4C may be provided on the stand 63. With this configuration, as shown in FIG. 11C, when the camera is mounted on the stand so that the back of the camera faces the front of the stand, a remote control signal sent from the stand front side may be directed to the remote control signal light-receiving window 7.

As described above, the third embodiment configured as described above produces the same effect as that of the first embodiment.

(Fourth Embodiment)

FIG. 13 is a front view showing a state where an electronic camera according to a fourth embodiment of the present invention is mounted on a stand in such a manner that the front of the camera faces the front of the stand. FIG. 14 is a front view showing a state where the electronic camera according to the fourth embodiment is mounted on the stand in such a manner that the back of the camera faces the front of the stand. FIG. 15 is a bottom view of the electronic camera according to the fourth embodiment. FIG. 16 is a top view of the stand according to the fourth embodiment. FIG. 17 is a perspective view showing a principal configuration of the power supply coil of the stand of the fourth embodiment and its vicinity.

FIG. 15 shows a state where a mirror frame unit 8 is stuck forward out of the camera. FIG. 16 shows a state where the front of the stand faces in the direction of the arrow B. To simplify an explanation, the same component parts in FIG. 13 to FIG. 17 as those in the first embodiment (FIG. 1A to FIG. 7) are indicated by the same reference numerals and an explanation of the parts is omitted.

In the fourth embodiment, the supply of power from the stand to the electronic camera and data transmission and reception between the electronic camera and the stand are carried out by a non-contact transmission system and that the direction of the electronic camera mounted on the stand is sensed by a mounting direction sensing switch.

As shown in FIG. 13 and FIG. 14, a power-receiving coil 75 for receiving power from the stand 71 in a noncontacting manner is embedded in the center of the base of the electronic camera 70 as shown by dotted lines. In addition, a power-supplying coil 81 for supplying power to the electronic camera 70 in a non-contact manner is embedded as shown by dotted lines.

The power-receiving coil 75 of the electronic camera 70 and the power-supplying coil 81 of the stand 71 are arranged so that they face each other, whether the front or back of the camera faces the front of the stand as shown in FIG. 13.

As shown in FIG. 15, in the vicinity of the power-receiving coil 75 at the base of the camera, there are provided a light-emitting window 72 for sending the optical signal emitted from a light-emitting element, explained later, to the stand 71 side and a light-receiving window 73 for receiving the optical signal sent from the stand 71 and letting the signal enter a light-receiving element, explained later. In two positions symmetrical with each other at the base of the camera, a pair of engaging holes 74a and 74b are made. In the inner part of one engaging hole 74a, there is provided a mounting direction sensing switch 90 that turns on when a projecting part provided on the stand 71 side is inserted into the hole 74. In the inner part of the other engaging hole 74b, such a mounting direction sensing switch is not provided. At the base of the camera, there are provided the same battery compartment 61, tripod screw 62, and others as those of FIG. 12.

In the fourth embodiment, whether the camera is mounted with the front of the camera facing the front or the back of the stand is determined according to the output of the mounting direction switch 90. Specifically, with the electronic camera 70 mounted on the stand 71, when the mounting direction sensing switch 90 is on, it is determined that the front of the camera faces to the front of the stand. When the mounting direction sensing switch 90 is off, it is determined that the back of the camera faces to the front of the stand.

As shown in FIG. 16, in the vicinity of the part where the power-supplying coil 81 embedded in the camera mounting section (in the figure, the two-dots-dash line part corresponding to an imaginary line representing the base of the camera) 71a formed in the upper part of the stand 71, there are provided light-receiving windows 76a and 76b for receiving the optical signal sent from the electronic camera 70 and letting the signal enter a light-receiving element, explained later; light-emitting windows 77a and 77b for sending the optical signal emitted from a light-emitting element, explained later, to the camera side; a projecting part 78 inserted into either the engaging hole 74a or 74b of the electronic camera 70 when the electronic camera 70 is mounted on the stand 71, and others.

The light-receiving windows 76a and 76b are connected to a light guide 79 shown by a dotted line. The light-emitting windows 77a and 77b are connected to a light guide 80 shown similarly by a dotted line.

As shown in FIG. 17, the light guide 79 is for directing an optical signal inputted through the light-receiving windows 76a, 76b to a light-receiving element 82. The light guide 80 is for directing the optical signal emitted from the light-emitting element 83 to the light-emitting windows 77a, 77b. In this way, the optical signals received by the light-receiving windows 76a, 76b are directed to a light-receiving element 82, which then receives the signals. In addition, the optical signal emitted from a light-emitting element 83 is directed by the light guide 80 to the light-emitting windows 77a, 77b, which emit light.

Thus, when the electronic camera 70 is mounted on the stand so that the front of the camera faces the front of the stand, the power-receiving coil 75 of the electronic camera 70 comes close to and faces the power-supplying coil 81 of the stand 71. Moreover, the light-emitting window 72 and light-receiving window 73 of the electronic camera 70 face the light-receiving window 76a and light-emitting window 77a of the stand 71, respectively. At this time, the projecting part 78 of the stand 71 is inserted into the engaging hole 74a of the electronic camera 1.

Furthermore, when the electronic camera 70 is mounted on the stand so that the back of the camera faces the front of the stand, the power-receiving coil 75 of the electronic camera 70 comes close to and faces the power-supplying coil 81 of the stand 71. Moreover, the light-emitting window 72 and light-receiving window 73 of the electronic camera 70 face the light-receiving window 76a and light-emitting window 77b of the stand 71, respectively. At this time, the projecting part 78 of the stand 71 is inserted into the engaging hole 74b of the electronic camera 1.

With this configuration, when the electronic camera 70 is mounted on the stand 71 so that the front of the camera faces either the front or the back of the stand, the mounting direction is determined from the output of the mounting direction sensing switch 90. It is therefore possible to supply power from the stand 71 to the electronic camera 70 and perform data transmission and reception between the electronic camera 70 and stand 71. Whether the front of the camera faces the front or back of the stand.

In the fourth embodiment, a light guide may be provided for directing the remote control signal transmitted from the stand front side to the remote control signal light-receiving window 7 when the electronic camera 70 is mounted on the stand 71 with the back of the camera facing the front side of the stand.

Figure 18:
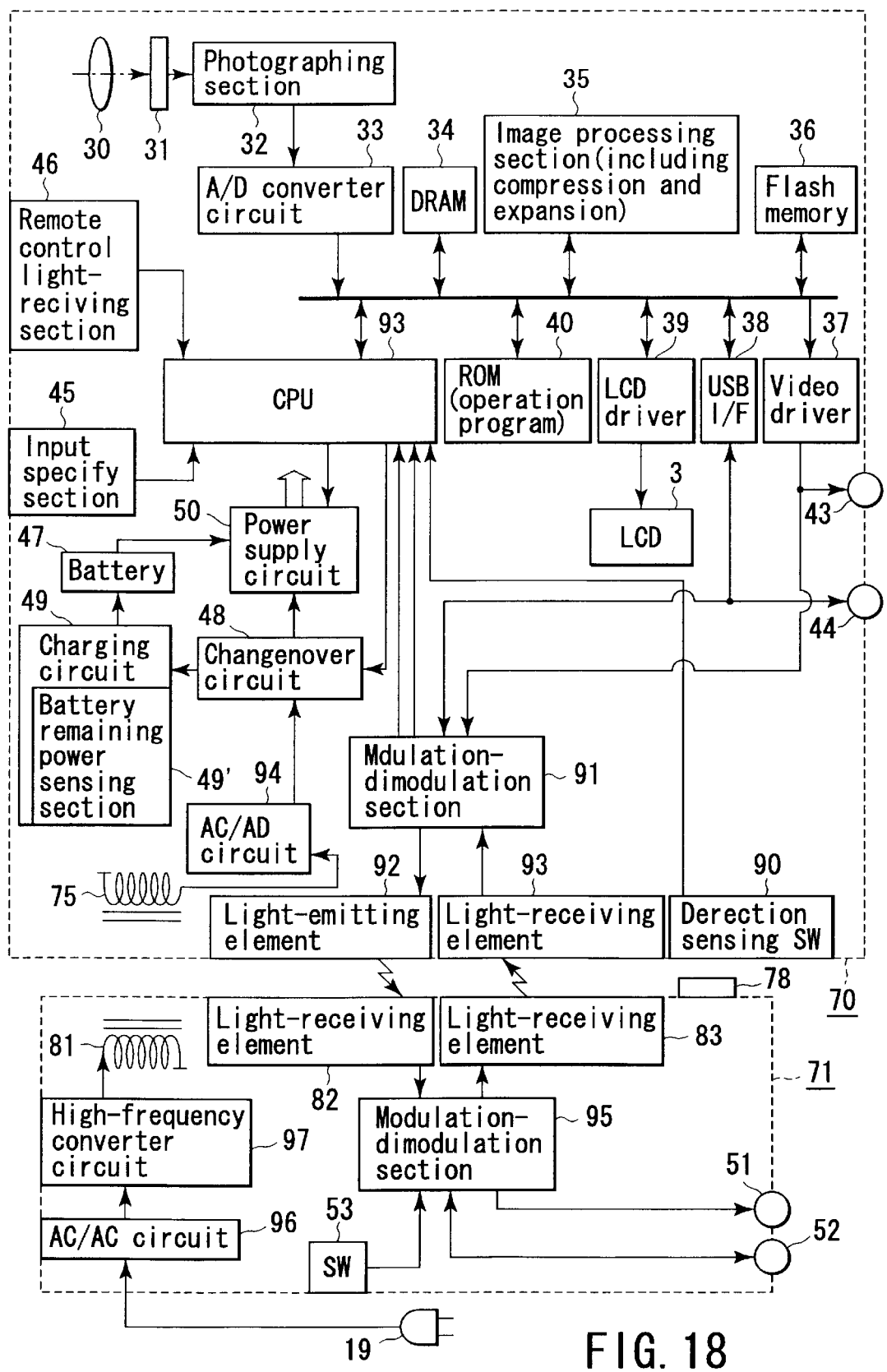
FIG. 18 is a block diagram showing a primary configuration of the electronic camera system related to the fourth embodiment of the present invention.

FIG. 18 is a block diagram showing a principal configuration of an electronic camera system including the electronic camera 70 and stand 71 according to the fourth embodiment. In FIG. 18, the same parts as those of FIG. 6 are indicated by the same reference numerals and a detailed explanation of them is omitted.

The electronic camera 70 shown in FIG. 18 comprises the mounting direction sensing switch 90, the modulation-demodulation section 91, a light-emitting element 92, a light-receiving element 93, the power-receiving coil 75, and an AC/DC converter circuit 94.

The mounting direction sensing switch 90, when turned on by a projecting part 78 provided on a stand, outputs the ON signal to a CPU 93.

To cause the light-emitting element 92 to emit an optical signal corresponding to the data sent to the stand 71, the modulation-demodulation section 91 modulates the transmission data and outputs the resulting data to the light-emitting element 92. In addition, to send the output corresponding to the optical signal received by the light-receiving element 93 to a CPU 94 or the like, the modulation-demodulation section 91 demodulates the output into the data that can be processed by the CPU 94 or the like.

The light-emitting element 92 is an element that emits an optical signal corresponding to the modulated data inputted from the modulation-demodulation section 91 to the stand 71 side. For instance, the light-emitting element 92 outputs an optical signal corresponding to a USB data or video signal.

The light-receiving element 93 receives an optical signal (e.g., an optical signal corresponding to USB data, a mounting sense signal, and a stand switch signal) from the stand 71 side, and supplies the output corresponding to the optical signal to the modulation-demodulation section 91.

The power-receiving coil 75 receives an AC power supply (e.g., 10V AC, 100 kHz) supplied from the power-supplying coil 81 of the stand 71, through electromagnetic induction, and outputs the power to the AC/DC converter circuit 94.

The AC/DC converter circuit 95 converts the inputted AC power supply into a DC power supply (e.g., 6V DC) and outputs the converted DC power supply to the changeover circuit 48.

The CPU (central processing unit) 93 basically carries out almost the same processes as those carried out by the CPU 41 shown in FIG. 6. However, the CPU 93 carries out the following processes because of the difference in configuration. According to the mounting sense signal or stand switch (SW) signal sensed via the light-receiving element 93 and modulation-demodulation section 91, the CPU carries out the process of determining whether the electronic camera 70 is mounted on the stand 71, the process of turning on the power supply of the electronic camera 70, and others. The CPU further carries out not only the process of determining the mounting direction of the electronic camera 70 according to the output of the mounting direction sensing switch 90 and selects and sets a suitable operation mode according to the mounting direction but also the process of inhibiting an unsuitable operation mode from being set. The relationship between the mounting direction, the operation mode selected and set according to the mounting direction, and the operation mode inhibited from being set is the same as shown in FIG. 3.

The stand 71 shown in FIG. 18 comprises a projecting part 78, a light-receiving element 82, a light-emitting element 83, a modulation-demodulation section 95, an AC/AC converter circuit 96, a high-frequency converter circuit 97, and a power-supplying coil 81.

The projecting part 78 is for turning on the mounting direction sensing switch 90 when inserted in the engaging hole 74a in the electronic camera 70.

The light-receiving element 82 is an element that outputs to the modulation-demodulation section 95 an output corresponding to the received optical signal (e.g., the optical signal corresponding to a video signal or USB data).

The light-emitting element 83 is an element that emits an optical signal corresponding to the modulated data supplied from the modulation-demodulation section 95 (e.g., the optical signal corresponding to USB data, stand switch (SW) signal, or the mounting sense signal). The light-emitting element outputs the optical signal corresponding to the mounting sense signal at, for example, specific time intervals.

The modulation-demodulation section 95 demodulates the output corresponding to the optical signal from the electronic camera 70 received by the light-receiving element 82 into a data (signal) that can be processed by a display unit connected to the video terminal 51 or an external unit connected to the USB terminal 52. Furthermore, to cause the light-emitting element 83 to emit an optical signal corresponding to the data sent to the electronic camera 70, the modulation-demodulation section modulates the transmission data and outputs the modulated data to the light-emitting element 83.

The AC/AC converter circuit 96 converts the commercial AC power supply (e.g., 100V AC) inputted via the AC plug 18 into an AC power supply (e.g., 10V AC) of a specific voltage level suited in supplying power to the electronic camera 70.

The high-frequency converter circuit 97 converts the frequency (e.g., 50 Hz) of the AC power supply supplied from the AC/AC converter circuit 96 into a specific frequency (e.g., 100 kHz) suitable for supplying power to the electronic camera 70 through electromagnetic induction.

The power-supplying coil 81 is a coil that supplies AC power (e.g., 10V AC, 100 kHz) converted to be a suitable AC voltage and frequency for the power-receiving coil 75 of the electronic camera 70.

Next, an example of the operation of the fourth embodiment will be explained. It is assumed that, with both the power switch of the electronic camera 70 and the stand switch 53 being off, the electronic camera 70 is mounted on the stand 71 with the front of the camera facing the front or the back of the stand. Then, the optical signal corresponding to the mounting sense signal outputted from the light-emitting element 83 of the stand 71 at specific intervals of time is sensed by the light-receiving element 93 of the electronic camera 70. As a result, it is determined that the electronic camera 70 is mounted on the stand 71. At this time, the mounting direction sensing switch 90 of the electronic camera 70 is turned on or off according to the mounting direction of the electronic camera 70, thereby outputting a specific sense signal. On the basis of the output, the mounting direction of the electronic camera 70 is determined. In the CPU 93, not only is a suitable operation mode selected and set according to the determined mounting direction, but also the unsuitable operation modes are inhibited from being set. At this point in time, since the power supply of the electronic camera 70 is off, the operation mode to be selected and set is the charging mode, regardless of the mounting direction.

When the mounting direction sensing switch 90 is turned on and it is determined that the camera has been mounted in the first direction, with the camera facing the front of the stand, the reproducing mode and the printing mode are inhibited from being set. In addition, when the mounting direction sensing switch 90 is turned off and it is determined that the camera has been mounted in the second direction with the back of the camera facing the front of the stand, the photographing mode is inhibited from being set. The mounting direction of the electronic camera 70 is determined each time the electronic camera 70 is mounted on the stand 71.

On the other hand, when the electronic camera 70 is mounted on the stand 71, the stand 71 supplies power to the electronic camera 70 through electromagnetic induction between the power-supplying coil 81 and the power-receiving coil 75. At this time, the operation mode set in the electronic camera 70 is the charging mode. Thus, the changeover circuit 48 switches the power supply destination to the charging circuit 49, thereby starting to charge the battery 47, a secondary battery. When the amount of remaining power of the battery 47, a second battery, is Full, or when the battery 47 is a primary battery, charging is not performed.

Here, when the stand switch 53 is turned on to turn on the power supply of the electronic camera 70, the signal passes through the light-emitting element 83 and the light-receiving element 93 and is notified to the CPU 93. Then, the changeover circuit 48 switches the power supply destination to the power supply circuit 50. This allows the power supply circuit 50 to supply power to each section of the electronic camera 70.

The operation after the power supply of the electronic camera 70 is turned on is the same as in the first embodiment. Specifically, according to the determined mounting direction of the electronic camera 70, the operation mode is changed from the charging mode to the photographing mode or the reproducing mode. In addition, with the PC being connected to the USB terminal of the stand 71, when the user operates the input section of the PC to give a specific instruction to the electronic camera 70, the operation mode is changed to the PC communication mode and the operation corresponding to the instruction is carried out. For example, the process corresponding to an image data transfer instruction or the like is carried out. Moreover, with the camera being mounted so that the back of the camera faces the front of the stand, when the user gives a print instruction via the PC, the operation mode is changed to the printing mode and the printing operation corresponding to the instruction is carried out. Depending on the mounting direction, the processes related to the operation modes prevented from being set are not carried out.

As described above, the fourth embodiment has the advantages as explained in the first embodiment, and performs the supply of power from the stand 71 to the electronic camera 70 and data transmission and reception between the electronic camera 70 and the stand 71 in a noncontact manner.

While in the fourth embodiment, the mounting direction sensing switch 90 has been used to sense the mounting direction of the electronic camera 70 mounted on the stand 71, the mounting direction may be sensed by using, for example, the aforementioned optical sensor, AE sensor, WB sensor, or the like. Furthermore, like the electronic camera 57 of FIG. 8, the electronic camera 70 of the fourth embodiment may be provided with a manually-operated lens cover. In this case, for example, on the basis of the relationship shown in FIG. 9, not only is a suitable operation mode selected and set, but also the unsuitable operation modes are inhibited from being set.

(Fifth Embodiment)

Figure 19:
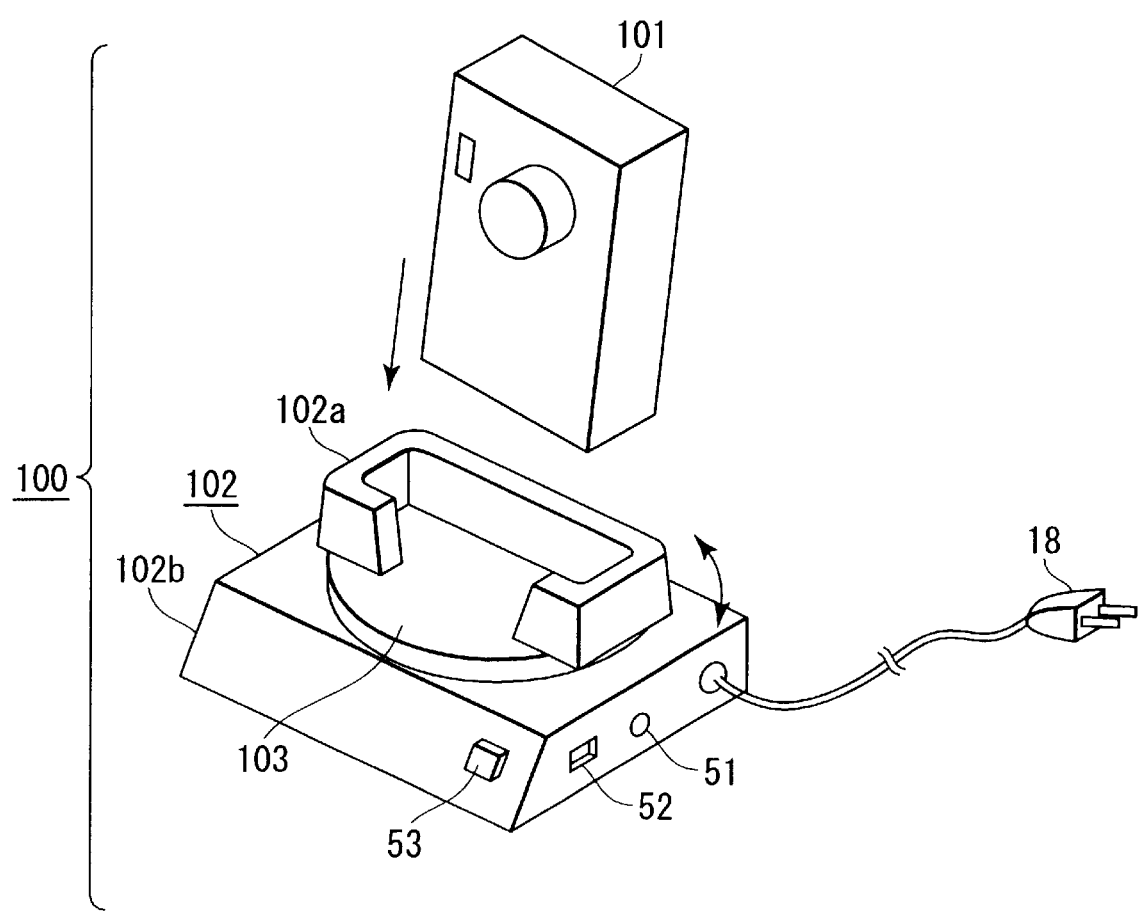
FIG. 19 is a perspective view showing an outward appearance of an electronic camera system according to a fifth embodiment of the present invention.

FIG. 19 is a perspective view showing the external appearance of the electronic camera system 100 according to a fifth embodiment of the present invention. In FIG. 19, the same parts as those in the first embodiment (FIG. 1A to FIG. 7) are indicated by the same reference numerals and a detailed explanation of them is omitted. Although not shown, it is assumed that the electronic camera 101 and stand 102 are connected to each other via a connection with the electric contacts shown in the first embodiment or via the noncontacting transmission system shown in the fourth embodiment.

In the fifth embodiment, the stand is composed of two parts, an upper unit and a lower unit. The upper unit on which the electronic camera is mounted is so constructed that it can rotate with respect to the lower unit. As shown in FIG. 19, the stand 102 on which the electronic camera 101 is mounted is composed of two parts, an upper unit 102a and a lower unit 102b. The upper unit 102a is provided so as to be capable of rotating via a rotating table 103 with respect to the lower unit 102b so that either the front or the back of the upper unit 102 may face the front of the lower unit 102b.

In the fifth embodiment, the mounting direction signal of the camera with respect to the upper unit 102a and the signal representing the direction of the upper unit 102a with respect to the lower unit 102b are sent from the stand 102 to the electronic camera 101. On the basis of the two signals, the direction of the electronic camera 101 with respect to the lower unit 102b can be sensed.

According to the mounting direction of the electronic camera 101 with respect to the lower unit 102b, for example, a suitable operation mode can be selected and set and unsuitable operation modes, as shown in FIG. 7 and FIG. 9, can be prevented from being set.

As described above, with the fifth embodiment, the user can change the mounting direction of the electronic camera 101 without removing the electronic camera 101 from the stand 102 by just rotating the upper unit 102a on which the electronic camera 101 has been mounted, with respect to the lower unit 102b. Even this configuration enables not only a suitable operation mode to be selected and set automatically but also the unsuitable operation modes to be automatically prevented from being set.

In the fifth embodiment, the mounting direction of the electronic camera 101 with respect to the upper unit 102a may be fixed in such a manner that, for example, the front of the camera always faces the front or the back of the upper unit 102a. This makes it possible to determine the mounting direction of the electronic camera 101 with respect to the lower unit 102b by sensing only the direction of the upper unit 102a with respect to the lower unit 102b.

(Characteristics of the First to Fifth Embodiments)

[1] The electronic camera system described in the embodiments comprises an electronic camera 1 having a plurality of operation modes, and a camera stand 18 which is provided so as to enable the electronic camera 1 to be mounted thereon and which has power-supplying means for supplying power to the mounted electronic camera 1. The system is characterized in that the electronic camera 1 is mountable on the camera stand 18 either in a first direction in which the front of the camera faces the front of the camera stand 18 or in a second direction in which the back of the camera faces the front of the camera stand 18. The stand 18 includes sensing means (17, 27, and the like) for sensing the direction the camera is mounted on the camera stand 18, and control means for selecting a specific operation mode from a plurality of operation modes, according to the mounting direction sensed by the direction sensing means, and setting the selected mode.

In the electronic camera system, when the electronic camera 1 is mounted on the camera stand 18 in either the first or second direction, a specific operation mode is selected and set automatically according to the mounting direction.

[2] The electronic camera system described in the embodiments and item [1] is characterized in that the power supplying means of the camera stand 18 is capable of supplying power to the electronic camera 1 mounted in either the first direction or the second direction.

In the electronic camera system, power is supplied whether the electronic camera 1 is mounted on the camera stand 18 in the first direction or the second direction.

[3] The electronic camera system described in the embodiments and item [1], characterized in that the control means selects and sets a photographing mode when the mounting direction of the electronic camera 1 sensed by the direction sensing means is the first direction.

[4] The electronic camera system described in the embodiments and item [3] is characterized in that the control means includes means for selecting and setting the photographing mode on the condition that the lens cover 58 of the electronic camera 1 is open.

In the electronic camera system, only when the electronic camera 1 is mounted in the first direction and the lens cover 58 is open is it possible to select and set the photographing mode.

[5] The electronic camera system described in the embodiments and item [3] is characterized in that the control means includes means for inhibiting further setting to a reproducing mode, when the mounting direction of the electronic camera 1 sensed by the direction sensing means is the first direction.

In the electronic camera system, when the electronic camera 1 is mounted in the first direction, setting to the reproduction mode is inhibited.

[6] The electronic camera system described in the embodiments and item [5] is characterized in that the control means includes means for, according to an instruction, further changing the photographing mode to an external communication mode in which communication is performed with an external unit, when the mounting direction of the electronic camera 1 sensed by the direction sensing means is the first direction.

In the electronic camera system, with the electronic camera 1 being mounted in the first direction, for example, when an instruction is externally given, the photographing mode is changed to the external communication mode. The external communication mode includes, for example, a PC communication mode in which communication is performed with a personal computer (PC).

[7] The electronic camera system described in the embodiments and items [1] to [6] is characterized in that the control means selects and sets the reproducing mode, when the mounting direction of the electronic camera 1 sensed by the direction sensing means is the second direction.

In the electronic camera system, when the electronic camera 1 is mounted in the second direction, the reproducing mode is selected and set.

[8] The electronic camera system described in the embodiments and item [7] is characterized in that the control means includes means for inhibiting further setting to the photographing mode, when the mounting direction of the electronic camera 1 sensed by the direction sensing means is the second direction.

In the electronic camera system, when the electronic camera 1 is mounted in the second direction, setting to the photographing mode is inhibited.

[9] The electronic camera system described in the embodiments and item [8] is characterized in that the control means includes means for, according to an instruction, further changing the reproducing mode to the external communication mode or a print mode, when the mounting direction of the electronic camera 1 sensed by the direction sensing means is the second direction.

In the electronic camera system, when the electronic camera 1 is mounted in the second direction, for example, when an instruction is externally given, the photographing mode is changed to the external communication mode or print mode (or printing mode) according to the instruction.

[10] The electronic camera 1 described in the embodiments has a plurality of operation modes and, when being mounted on a camera stand 18, receives power from power-supplying means provided in the camera stand 18, and is characterized by being provided so as to be capable of being mounted on the camera stand 18 either in a first direction in which the front of the camera faces to the front of the camera stand or in a second direction in which the back of the camera faces, to the front of the camera stand 18, and by comprising sensing means for sensing whether the direction in which the camera is mounted on the camera stand 18 is either the first direction or the second direction and control means for selecting a specific operation mode from the plurality of operation modes according to the mounting direction sensed by the direction sensing means and setting the selected mode.

In the electronic camera 1, when the electronic camera 1 is mounted on the camera stand 18 in either the first or the second direction, a specific operation mode is selected and set automatically according to the mounting direction.

[11] The camera stand 18 described in the embodiments is characterized by including power-supplying means for supplying power to an electronic camera 1 which is provided so as to be capable of being mounted on the camera stand 18 either in a first direction in which the front of the camera faces to the front of the camera stand or in a second direction in which the back of the camera faces to the front of the camera stand and which has the function of selecting a specific operation mode from a plurality of operation modes according to the mounting direction and setting the selected mode.

In the camera stand 18, power is supplied to the electronic camera 1 mounted on the camera stand 18, regardless of the mounting direction.

[12] The system described in the embodiments comprises an apparatus having a plurality of operation modes (including PDA (Personal Digital Assistant) serving as a mobile information terminal, a cellular phone, and an electronic apparatus, such as a cellular phone with a camera function, in addition to an electronic camera 1) and a stand (18) which is provided so as to enable the apparatus (1) to be mounted thereon and includes power-supplying means for supplying power to the mounted apparatus (1), and is characterized in that the apparatus (1) is provided so as to be capable of being mounted on the stand (18) either in a first direction in which the front of the apparatus faces to the front of the stand (18) or in a second direction in which the back of the apparatus faces to the front of the stand (18) and includes direction sensing means (17, 27, and the like) for sensing whether the direction in which the camera is mounted on the stand (18) is either the first direction or the second direction and control means for selecting a specific operation mode from the plurality of operation modes according to the mounting direction sensed by the direction sensing means and setting the selected mode.

In the system, a specific operation mode is selected and set automatically according to whether the apparatus (1) is mounted on the stand (18) in the first direction or the second direction.

[13] The electronic camera system described in the embodiments and item [2] is characterized in that the second direction is a direction rotated through about 180° with respect to the first direction.

[14] The electronic camera system described in the embodiments and item [13] is characterized in that the electronic camera 1 has power-receiving means corresponding to the power-supply means on the exterior or in the vicinity of the exterior, and that the power-supplying means is provided so as to be capable of being coupled with either the power-receiving means of the electronic camera 1 mounted in the first direction or the power-receiving means of the electronic camera 1 mounted in the second direction.

In the electronic camera system, even when the electronic camera 1 is mounted on the camera stand 18 in either the first or the second direction, the power-receiving means provided on the exterior of the electronic camera or in the vicinity of the exterior is coupled with the power-supplying means of the camera stand 18 in such a manner that they always face each other properly.

[15] The electronic camera system described in the embodiments and item [14] is characterized in that the electronic camera 1 has the power-receiving means on the side face of the camera or in the vicinity of the side face of the camera.

[16] The electronic camera system described in the embodiments and item [14] is characterized in that the electronic camera 1 has the power-receiving means on the base of the camera or in the vicinity of the base of the camera.

[17] The electronic camera system described in the embodiments and items [14] to [16] is characterized in that the power-supplying means supplies power to the power-receiving means is carried out through a noncontacting transmission system (75, 81).

In the electronic camera system, there is no possibility that a problem will occur due to bad electrical contacts.

[18] The electronic camera system described in the embodiments and items [15] to [17] is characterized in that the electronic camera (70 and the like) and the camera stand (71 and the like) further have data transmitting and receiving means (72, 73 and 76, 77) between them for enabling data transmission and reception, when the electronic camera (70 and the like) is mounted on the camera stand (71 and the like) in either the first direction or the second direction.

In the electronic camera system, each of the data transmitting and receiving means performs data transmission and reception between the electronic camera and the camera stand.

[19] The electronic camera system described in the embodiments and item [18] is characterized in that the data transmitting and receiving means (72, 73) of the electronic camera is provided on almost the same face as the face on which the power-receiving means (75) is provided.

In the electronic camera system, the data transmitting and receiving means and the power-receiving means are provided on almost the same face, which help simplify the configuration.

[20] The electronic camera system described in the embodiments and item [18] is characterized in that the data transmitting and receiving means (76, 77) of the camera stand includes a first optical conducting section (76a, 77a) provided so as to correspond to the first direction, a second optical conducting section (76b, 77b) provided so as to correspond to the second direction, a pair of optical coupling means (light guides 79, 80, and the like) for coupling the first optical conducting section and the second optical conducting section, and a light-receiving element and a light-emitting element which emit and receive an optical signal via the pair of optical coupling means.

In the electronic camera system, data transmission and reception between the electronic camera and the camera stand is carried out by receiving and emitting optical signals (e.g., infrared rays). Thus, it is possible to avoid the intervention of noise due to radio waves. The light (the optical signal, such as infrared rays) coming from the electronic camera 70 is directed to the light-receiving element 82 via the optical coupling means (light guide 79). The light (optical signal, such as infrared rays, emitted from the light-emitting element 83 is emitted via the optical coupling means (light guide 80) to the electronic camera 70 side.

[21] The electronic camera system described in the embodiments and item [2] is characterized in that the camera stand further includes a light guide 29 which directs the optical signal (remote control signal, infrared rays, or the like) transmitted from a remote control transmitter to a remote control signal light-receiving section 7 provided on the mounted electronic camera 1.

In the electronic camera system, the light guide 29 enables the optical signal sent from the remote control transmitter to be directed to the remote control signal light-receiving section of the electronic camera, regardless of the mounting direction of the electronic camera 1.

[22] The electronic camera 1 described in the embodiments is characterized by being provided so as to receive power from power-supplying means (19, 54, 20) provided for a camera stand 18, even when the electronic camera 1 is mounted on the camera stand 18 either in a first direction in which the front of the camera faces the front of the camera stand 18 or in a second direction in which the back of the camera faces the front of the camera stand 18.

In the electronic camera system, even when the electronic camera 1 is mounted on the camera stand 18 in either the first or second direction, it can receive power from the camera stand 18.

[23] The camera stand 18 described in the embodiments is characterized by including power-supplying means (19,

54, 20) capable of supplying power to the electronic camera 1 mounted on the camera mounting section of the camera stand 18 either in a first direction in which the front of the camera faces the front of the camera stand or in a second direction in which back of the camera faces the front of the camera stand.

In the camera stand, power can be supplied reliably to the electronic camera mounted in either the first or second direction.

[24] The system described in the embodiments comprises an apparatus having a specific function (including an electronic apparatus, such as a PDA, a mobile phone, or a mobile phone with a camera function, in addition to an electronic camera) and a stand (18) which is provided so as to enable the apparatus to be mounted thereon and includes power-supplying means for supplying power to the mounted apparatus and is characterized in that the apparatus (1) is provided so as to be capable of being mounted on the stand (18) either in a first direction in which the front of the apparatus faces the front of the stand or in a second direction in which the back of the apparatus faces the front of the stand, and the power-supplying means (19, 54, 20) of the stand (18) is provided so as to supply power to the apparatus (1) mounted in either the first or second direction.

In the system, power is reliably supplied to the apparatus (1) whether it is mounted on the stand (18) in the first or second direction.

(Sixth Embodiment)

Figure 20A:
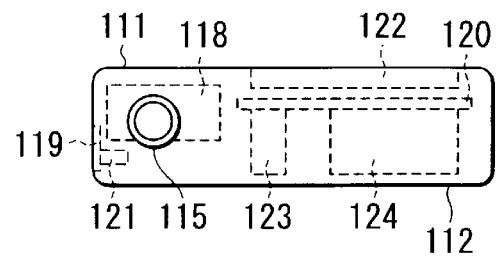
FIG. 20A to FIG. 20E show a schematic configuration of an electronic camera according to a sixth embodiment of the present invention, where
Figure 20B:
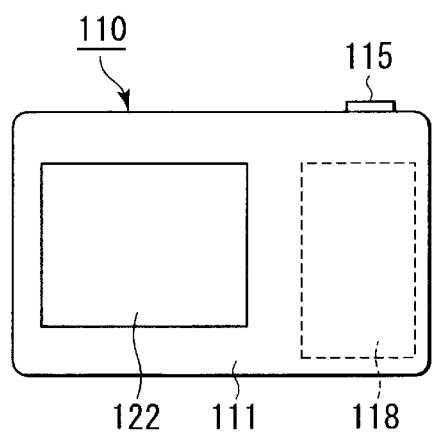
Figure 20C:
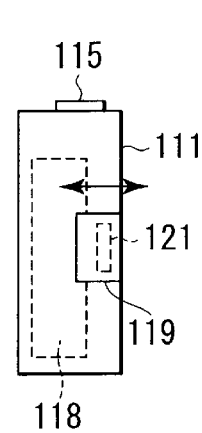
Figure 20D:
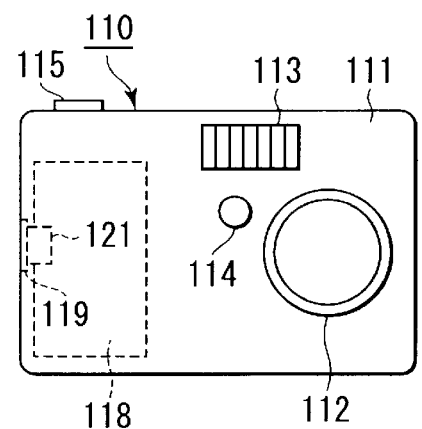
Figure 20E:
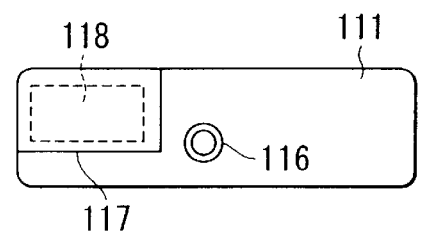

FIG. 20A to FIG. 20E show a schematic configuration of an electronic camera according to a sixth embodiment of the present invention. FIG. 20A is a top view, FIG. 20B is a back view, FIG. 20C is a side view, FIG. 20D is a front view, and FIG. 20E is a bottom view.

As shown in FIG. 20A to FIG. 20E, the electronic camera 110 has a photographing lens window 112, a strobe light-emitting window 113, a remote-control light-receiving window 114, and others at the front of a camera body 111. At the top of the camera body 111, a release button 115 is provided. In the base, a tripod mounting hole 116, a battery-loading opening 117, and others are made. Through the battery-loading opening 117, a secondary battery 118 is loaded into the battery compartment in the camera body 111.

At the left side face of the camera body 111 when viewed from the front, a connector cover 119 is provided in such a manner that it can slide as shown by the arrow. Behind the connector cover 119, a connector 121 is provided. The connector 121 is connected to the secondary battery 118 via a charging circuit 123 explained later and further can be coupled with a connector 131 of a camera stand 130, explained later.

At the back of the camera body 11, an LCD (liquid-crystal display) 122 is provided as display means for reproducing and displaying the images or the like recorded on a recording medium or the like. In the camera body 111, a circuit board 120 is provided. On the circuit board 120, a charging circuit 123 and a lens barrel 124 having the photographing lens window 112 at its tip, etc. are provided.

FIG. 21A and FIG. 21B show a state where the electronic camera 110 of the sixth embodiment is mounted on a stand 130 so that the back of the camera faces the front of the stand. FIG. 21A is a side view and FIG. 21B is a front view. As shown in FIG. 21A and FIG. 21B, the electronic camera 110 is placed in a camera mounting concave section 132 of the stand 130 with its left side facing down in a position differing from the position in use, that is, a vertical position. In such a mounting state, the connector 121 mounted on the left side face of the camera body 111 (located in the lower half of the figure because the camera body 111 is in a vertical position) is coupled with a connector 31 provided on the base of the camera mounting concave section 132 on the stand side.

The stand 130 is integrally formed into a legless-chair-like shape made of, for example, hard resin. On the top of its base 130a, the camera mounting concave section 132 is provided. One side face of an upright screen section has a slightly inclined back 133 for supporting one side face of the camera body 111. To the stand 130, a plug 135 is connected via a cable 134. When the plug 135 is inserted into a power supply outlet (not shown), the stand 130 functions as a charger, etc.

FIGS. 22A to 22C show the change in orientation of the displayed image on the LCD 122 when the electronic camera 110 is changed from the normal-use position to the stand-mounted position. As shown in FIG. 22A, it is assumed that, with the camera body 111 held in the normal-use position, a specific image is displayed in an upright position on the LCD 122. To mount the electronic camera 110 on the stand 130, the camera body 11 is turned through 90° into a vertical position, as shown in FIG. 22B. Then, the displayed imaged on the LCD 22 is in a 90° turn state at a result of the change of the position of the camera body 111. As shown in FIG. 22C, however, mounting the camera body 111 on the stand 131 causes the connector 121 on the electronic camera side to connect to the connector 131 on the stand side. In this state, the displayed image on the LCD 122 is displayed in an upright position as shown in the figure, regardless of the fact that the camera body 111 is changed from the horizontal position to the vertical position. However, in the upper and lower parts of the vertically-positioned display screen, band-like undisplayed areas 122X, called black back or blue back, appear.

Figure 23:
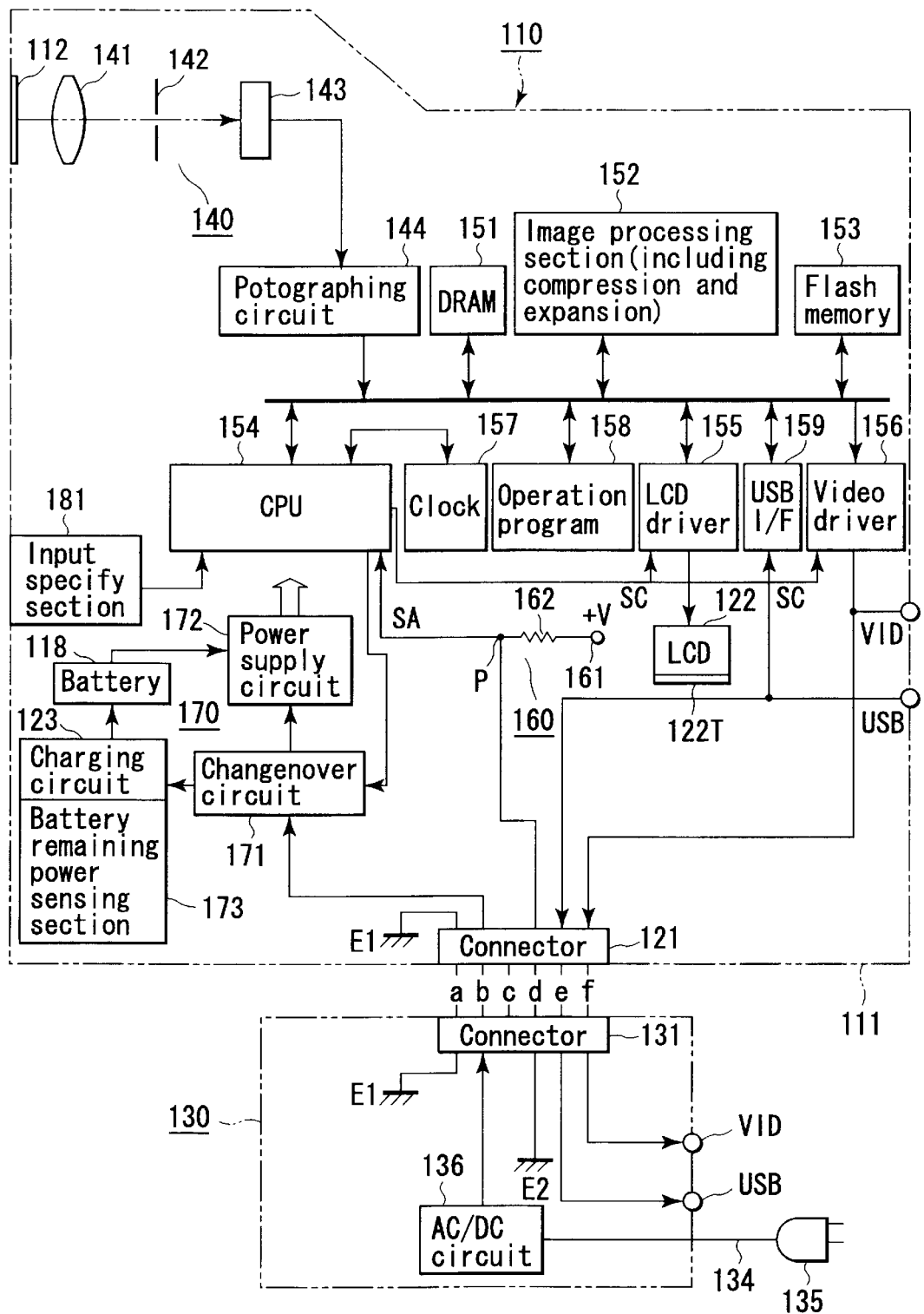
FIG. 23 is a block diagram showing a configuration of the control system of the electronic camera system according to the sixth embodiment of the present invention.

FIG. 23 is a block diagram showing a configuration of the control system of the electronic camera system including the electronic camera 110 with the displayed=image direction=changing function and the stand 130. The part enclosed by a dashed line in the upper part of the figure indicates the electronic camera 110 and the part enclosed by a dashed line in the lower part of the figure indicates the stand 130.

First, the stand 10 will be explained. The stand 130 incorporates an AC/DC converter for converting a commercial AC power supply (e.g., 100V AC) into a lower voltage rectified power supply. The stand includes a video output terminal (jack) VID and a serial bus connection terminal (jack) USB as a signal communication terminal. Then, the AC/DC converter 136, video output terminal (jack) VID, and serial bus connection terminal (jack) USB are electrically connected to each section of the camera body 111 via the connector 131 on the stand side and the connector 121 on the electronic camera side.

One of the connector 121 on the electronic camera 110 side and the connector 131 on the stand 130 side is a plug and the other is a jack. They are capable of being connected detachably. With the connector 121 and connector 31 connected to each other, each section of the electronic camera 110 is connected to each section of the stand 130 via the corresponding connecter terminal.

Specifically, a ground section E1 on the stand side is connected to a ground section E1 on the electronic camera side via a connector terminal a. The AC/DC converter 36 on the stand side is connected to the changeover circuit 171 in the power supply section 170 on the electronic camera side via a connector terminal b. A ground section E2 on the stand side is connected to a potential control terminal P in the stand mount sensing circuit 160 on the electronic camera side via a connector terminal d. The serial bus connection terminal (jack) USB on the stand side is connected to the serial bus connection terminal (jack) USB on the electronic camera side via a connector terminal e. Similarly, the video output terminal (jack) VID is connected to the video output terminal (jack) VID on the electronic camera side via a connector terminal f.

Next, the electronic camera 110 will be explained. The electronic camera 110 has a photographing optical system 140 including a photographing lens 141, a mechanical shutter 142, a photographing element (e.g., CCD photographing element) 143 in the camera body 111. The electric signal corresponding to the subject image picked up by the photographing optical system 140 is converted into image data at a photographing circuit 144. The image data is supplied via a data bus 150 to a temporary storage memory 151 composed of DRAM or the like, which stores the image data temporarily. The temporarily stored image data is subjected to a compression process at an image processing unit 152 and then is stored in an image recording medium 153 composed of a flash memory or the like. Information SB about the direction of each image is attached to the image data stored in the image recording medium 153.

The image data stored in the image recording medium 153 is read from the recording medium in reproduction. After the image data is subjected to an expansion process at the image processing unit 152, the resulting data is stored temporarily in the temporary storage memory 151. Then, the temporarily stored reproduced data is supplied via an LCD driver 155 to the LCD 22, which displays images. The reproduced image data can also be output via a video driver 56 at the video output terminal VID, to an external display unit (not shown). This makes it possible to display the data on an external monitor at any time.

When the display image data is supplied via the LCD driver 155 to the LCD 122, which displays the image, or outputted via the video drover 156 at the video output terminal VID, from which the data is supplied to the external display unit (not shown) for displaying the image, the direction of the displayed image is changed suitably by image direction changing means, explained later, with the result that the image is displayed in an upright position.

The LCD 122 includes a clock display section 122T for displaying the clock data supplied from a clock section 157. the direction of a clock representation displayed on the clock display section 122T can also be changed by clock display changing means included in the image direction changing means.

In FIG. 23, reference numeral 158 indicates an operation program section for causing the CPU 154 to carry out a specific operation. Reference numeral 159 indicates an interface for exchanging signals via the serial bus connection terminal (jack) USB.

The electronic camera 110 includes a stand mount sensing circuit 160 as sensing means for sensing whether the camera body 111 is mounted on the stand 130. The stand mount sensing circuit 160 applies a positive potential to a terminal 161 to one port of the CPU 154 via a resistance element 162. With the camera body 111 being mounted on the stand 130, when the connectors 121 and 131 are connected to each other, one end of the resistance element 161, or the potential control end P connected to the CPU 54, is dropped to the ground potential. By doing this, stand mounting information SA indicating that the camera body 111 is mounted on the stand 130 is supplied to the CPU 154.

The power supply section 170 is composed of the changeover circuit 171, a power supply circuit 172, the charging circuit 123 including a battery remaining power sensing circuit 173, and the secondary battery 118. When the AC/DC converter 136 of the stand 130 inputs a rectified power supply of a specific level, the power supply section 170 supplies the rectified power to each section of the camera body 111 by way of the changeover circuit 171 and power supply circuit 172. When the stand 130 does not input the rectified power supply, the direct-current power supply from the secondary battery 118 is supplied to each section of the camera body via the power supply circuit 172. Furthermore, when the battery remaining power sensing circuit 173 senses that the amount of remaining power of the secondary battery 118 has dropped below a certain level, the charging circuit 123 charges the secondary battery 118.

An input specify section 181 as the camera control section includes various setting switches, including a switch that responds to the release button 115.

Figures 24, 25:
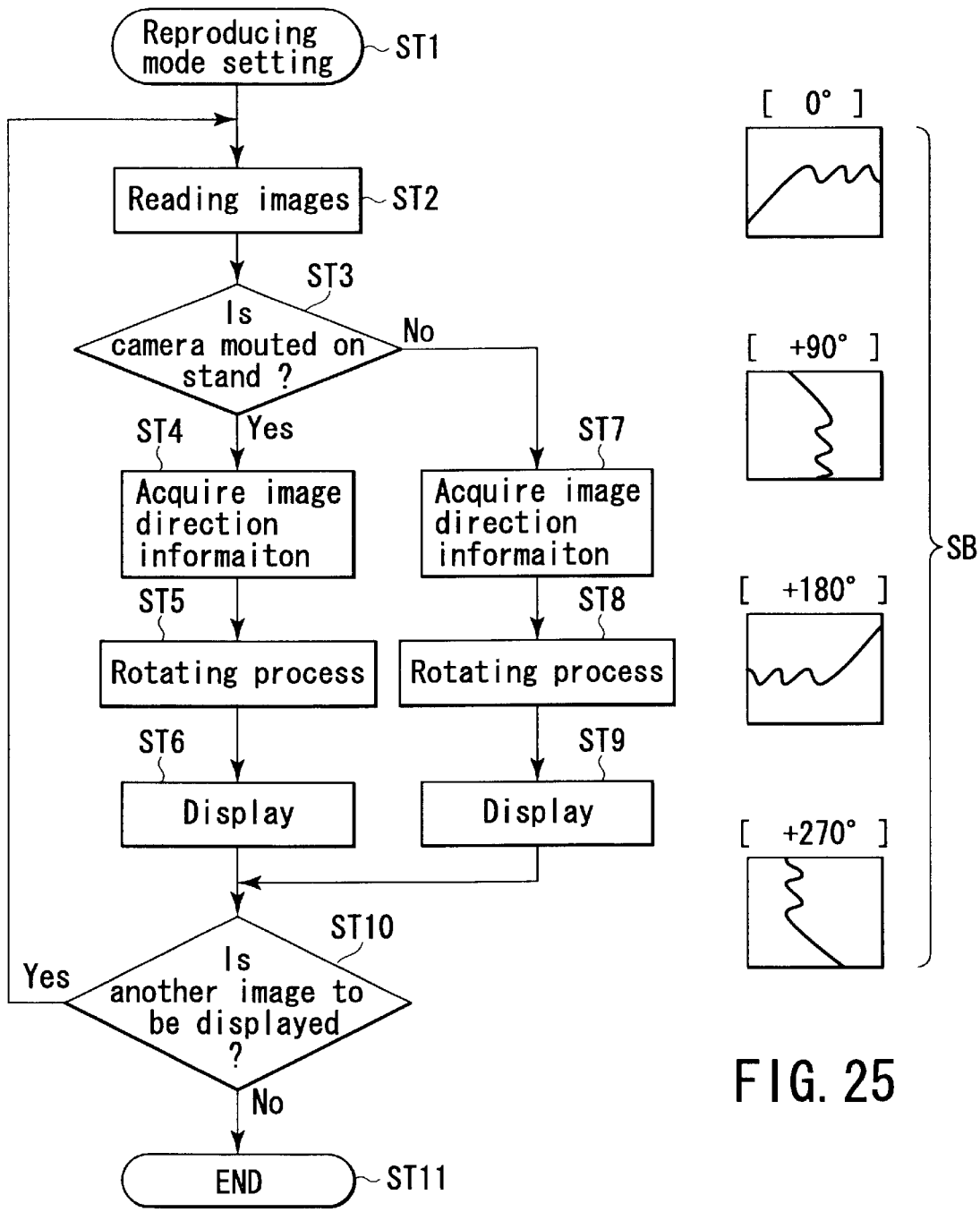
FIG. 24 is a flowchart to help explain the operation of displaying an image in the electronic camera according to the sixth embodiment of the present invention.
FIG. 25 shows an example of image direction information attached to image data used in the image displaying operation shown in FIG. 24.

Hereinafter, the image displaying operation of the electronic camera 110 in the sixth embodiment configured as described above will be explained by reference to a flowchart shown in FIG. 24.

Step ST1: The camera 110 is set in the reproducing mode to perform the operation of displaying the images recorded in the electronic camera 110.

Step ST2: Specific image data whose frames are specified is read from the image recording medium 153 and undergoes an expansion process at the image processing unit 152 and the resulting data is stored in the temporary storage circuit 151.

Step ST3: It is determined whether stand mounting information SA is present or absent. Stand mounting information SA indicates whether the electronic camera 110 is mounted on the stand 130, in other words, whether the connector 121 and the connector 131 are coupled with each other. If it is determined that stand mounting information SA is present, control proceeds to step ST4. If it is determined that stand mounting information SA is absent, control goes to step ST7.

Step ST4: Information SB representing the direction of an image is acquired. Information SB is attached to the image data stored in the image recording medium 153. For example, as shown in FIG. 25, the following four types are used as image mounting information SB: [0°] (upright state), [+90°] (a 90° turn to the right), [+180°] (a 180° turn to the right), and [+270] (a 270° turn to the right).

Step ST5: On the basis of the stand mounting information SA (present) and the image direction information SB, the CPU 54 gives the following display direction change instruction SC to either the LCD driver 155 or the video driver 156, thereby carrying out the process of rotating images.

(11) When SA is "present" and SB is [0°]: the CPU gives the LCD driver 155 an instruction to make a 270° turn to the right, and the video driver 156 an instruction to make a 0° turn to the right.

(12) When SA is "present" and SB is [+90°]: the CPU gives the LCD driver 155 an instruction to make a 180° turn to the right, and the video driver 156 an instruction to make a 270° turn to the right.

(13) When SA is "present" and SB is [+180°]: the CPU gives the LCD driver 155 an instruction to make a 90° turn to the right, and the video driver 156 an instruction to make a 180° turn to the right.

(14) When SA is "present" and SB is [+270°]: the CPU gives the LCD driver 155 an instruction to make a 0° turn to the right, and the video driver 156 an instruction to make a 90° turn to the right.

Step ST6: As a result of the operation of each of the drivers 155, 156, an upright image is displayed on the LCD 122 and the external display unit. That is, when the camera body 111 is mounted on the stand 130, the direction of the displayed image is changed on the basis of the information SB on the direction of the image so that a representation may be suitable for a position (a vertical position) different from the normal-use position, or the normal-use position (a horizontal position).

Figure 26:
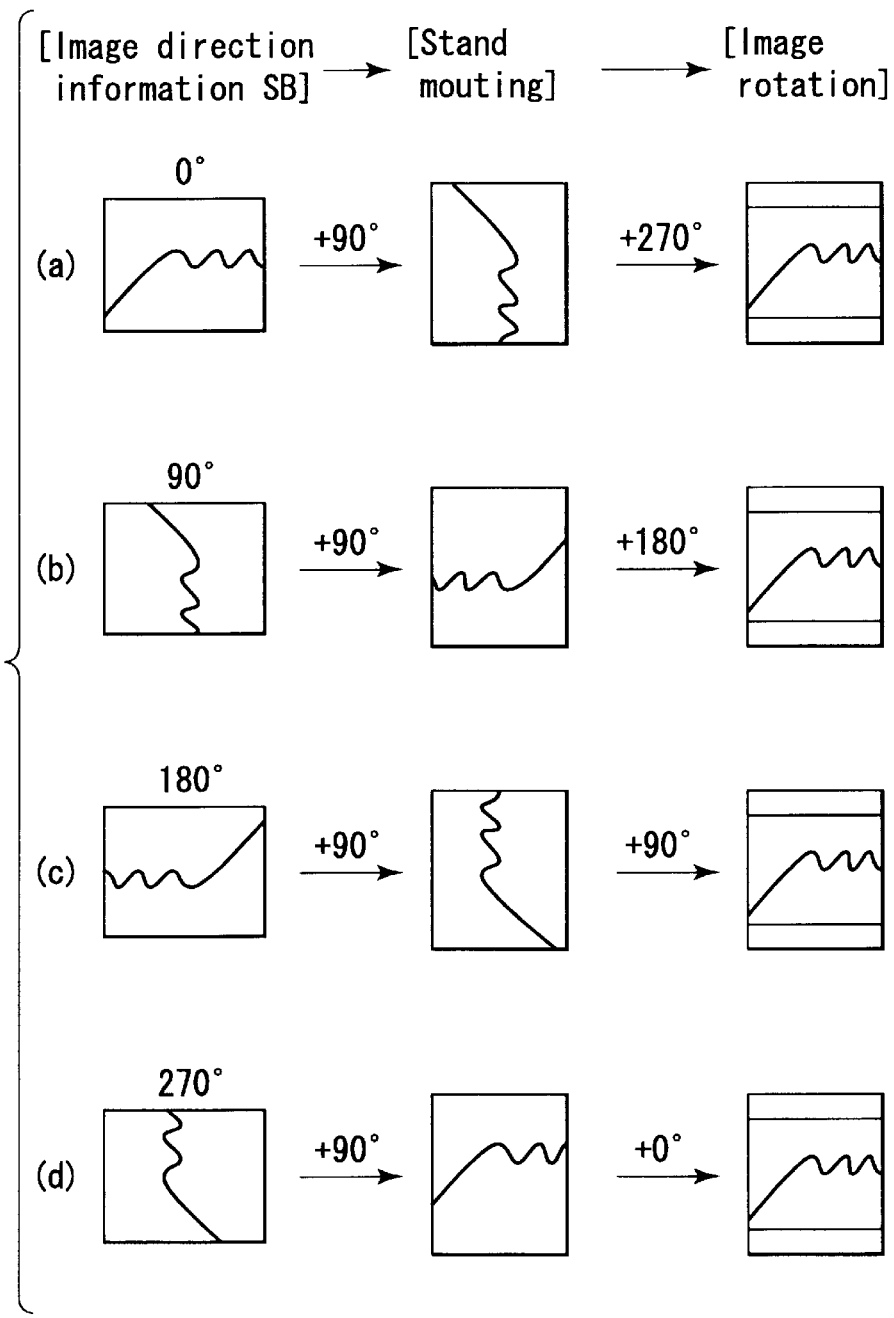
FIG. 26 shows an example of "the change of the direction" of the image displayed on the LCD in the electronic camera related to the sixth embodiment of the present invention.

In FIG. 26, (a) to (d) show an example of the change of the direction of the image displayed on the LCD 122. As shown in the figure, according to the contents of the image direction information SB, the direction of the displayed image is changed suitably when the camera is mounted on the stand and after the image rotating process is completed. Explanation of FIG. 24 will be resumed.

Step ST7: When it is determined that the stand mounting information SA is "absent" in step ST3, the information SB representing the direction of the image attached to the image data stored in the image recording medium 153 is acquired as in step ST4.

Step ST8: On the basis of the stand mounting information SA "absent" and the image direction information SB, the CPU 154 gives the LCD driver 155 or video driver 156 the following display direction change instructions SC, thereby performing the process of rotating the image:

(21) When SA is "absent" and SB is [0°]: the CPU gives the LCD driver 155 an instruction to make a 0° turn to the right, and the video driver 156 an instruction to make a 0° turn to the right.

(22) When SA is "absent" and SB is [+90°]: the CPU gives the LCD driver 155 an instruction to make a 270° turn to the right, and the video driver 156 an instruction to make a 270° turn to the right.

(23) When SA is "absent" and SB is [+180°]: the CPU gives the LCD driver 155 an instruction to make a 180° turn to the right, and the video driver 156 an instruction to make a 180° turn to the right.

(24) When SA is "absent" and SB is [+270°]: the CPU gives the LCD driver 155 an instruction to make a 90° turn to the right, and the video driver 156 an instruction to make a 90° turn to the right.

Step ST9: As a result of the operation of each of the drivers 155, 156, an upright image is displayed on the LCD 122 and the external display unit. That is, when the camera body 111 is not mounted on the stand 130, the direction of the displayed image is changed on the basis of the information SB on the direction of the image so that a representation may be suitable for the normally used position (a horizontal position).

Step ST10: It is determined whether to display another image. To display another image, control returns to step ST2. If another image is not displayed, control proceeds to step ST11.

Step ST11: The series of image displaying operations in the image-reproducing mode is completed.

When the clock data outputted from the clock section 157 incorporated in the electronic camera 110 is displayed together with the displayed image on the clock display section 122T or the like of the LCD 122, the direction of the clock representation is changed and controlled in the same manner as changing the direction of the image. The changing control in this case is performed by clock display changing means included in the image direction changing means. Because the changing means is the same as the image direction changing means, its explanation is omitted.

The electronic camera 110 described in the sixth embodiment includes the following modifications.

In a case where the image direction information SB attached to the image, for example, when the camera body 111 is mounted on the stand 130 on the basis of only the stand mounting information SA, the direction of images is changed uniformly (in the case of display on the LCD 122, the images are given a +270° turn, and in the case of an external display unit, the images are given a 0° turn).

In a case where the displayed image does not stand upright only by making the uniform change as when pictures are taken with the camera held vertically, for example, an operation button provided on the stand enables the image to be adjusted so that it may stand upright.

There is provided manual operation means which enables the displayed image to be turned at intervals of 90° to the right or the left each time a push button is operated.

A configuration obtained by suitably combining the configuration of each of the first to fifth embodiments. For example, one combination may be such that, when the electronic camera is mounted in the second direction and the reproduction mode is selected and set, the direction of the image is changed.

(Characteristics of the Sixth Embodiment)

[1] The electronic camera 110 described in the embodiment is mounted on a chargeable camera stand 130 in a position different from the position in which the camera is being used, and is characterized by comprising a camera body 111, an LCD 122 which is provided on the camera body 111 and displays an image based on image data, sensing means (stand mount sensing circuit 160) for sensing that the camera body 111 is mounted on the stand 130, and, image direction changing means (CPU 154, LCD driver 155) for changing the direction of the image displayed on the LCD 122 when the sensing means 160 senses that the camera body 111 is mounted on the stand 130.

In the electronic camera 110, when the camera body 111 is mounted on the stand 130, the direction of the displayed image on the display means 122 can be changed to an upright position. Thus, the displayed image is very easy to see, regardless of the fact that the camera body 111 is mounted on the stand 130 in a position different from the position when the camera is being used.

[2] The electronic camera 110 described in the embodiment and item [1] is characterized in that the image direction changing means (CPU 54, LCD driver 55) further includes means for changing the direction of the displayed image on the basis of information about the direction of the image corresponding to image data (e.g., image direction information SB attached to the image data stored in the flash memory 53 or the like).

In the electronic camera 110, even when photographing is done with the camera body 111 being held in various positions, the direction of the displayed image on the LCD 122 is changed automatically to a suitable direction according to the position of the camera body 111 during photography at the time when the camera body 111 is mounted on the stand 130. This makes it easy to view the displayed image.

[3] The electronic camera 110 described in the embodiment and item [1] or [2] is characterized in that the LCD 122 includes clock display means 122T for displaying a clock (e.g., clock data from a clock section 57), and, the image direction changing means (CPU 54, LCD driver 55) includes means for changing the direction of a clock representation on the clock display means 122T, when the sensing means 160 senses that the camera body 111 is mounted on the stand 130.

In the electronic camera 110, when the camera body 111 is mounted on the stand 130, the clock display can be made upright, which makes it easy to view the clock.

[4] The electronic camera 110 described in the embodiment and item [1] or [2] is characterized in that the image direction changing means (CPU 54, LCD driver 55) includes means for changing the direction of the displayed image so as to obtain a representation suitable for the normally used position (or horizontally long position) on the basis of information SB about the direction of the image, when the camera body 111 is not mounted on the stand 130.

In the electronic camera 110, when the camera body 111 is not mounted on the camera stand 130, the representation has the direction of the displayed image suitable for the normally used position (or horizontally long position). Thus, the displayed image is easy to view.

[5] The electronic camera 110 described in the embodiment and item [4] is characterized in that the camera body 111 includes image data output means (video driver 156, video output terminal VID) for outputting display image data to an external display unit (not shown), and, the image direction changing means (CPU 154, LCD driver 155, video driver 156) includes means which, when the sensing means 160 senses that the camera body 11 is mounted on the stand 130, not only changes the direction of the displayed image so as to give a representation similar to a representation suitable for the normally used position (or horizontally long position), on the basis of information SB about the direction of the image in the case of the display image data outputted from said output means (video driver 156, video output terminal VID), but also changes the direction of the displayed image so as to give a representation suitable for the stand mounting position (or vertically long position), on the basis of information SB about the direction of the image in the case of the image data displayed on the LCD 122.

In the electronic camera 110, the displayed image is always easy to view, even when the position of the camera body 111 is the normally used position (horizontally long position) or the stand mounting position (or vertically long position), or even when the display image data is outputted to an external display unit, with the camera being mounted on the stand 130, and the external display unit displays the image data.

(Seventh Embodiment)

Figure 27A:
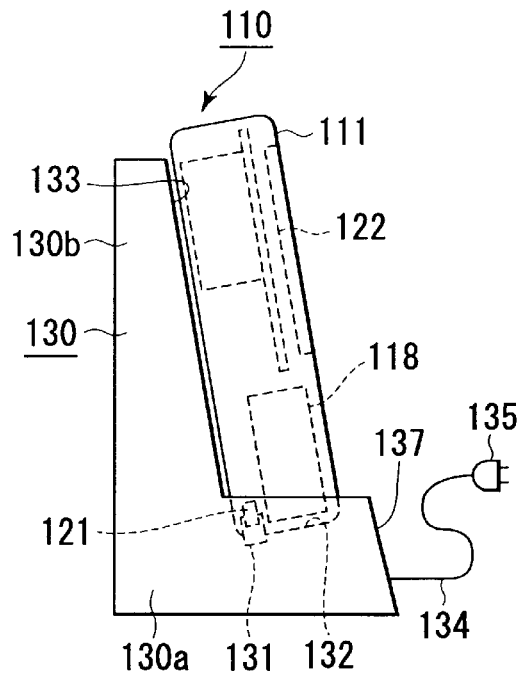
FIG. 27A and FIG. 27B show a schematic configuration of an electronic camera system according to a seventh embodiment of the present invention, where
Figure 27B:
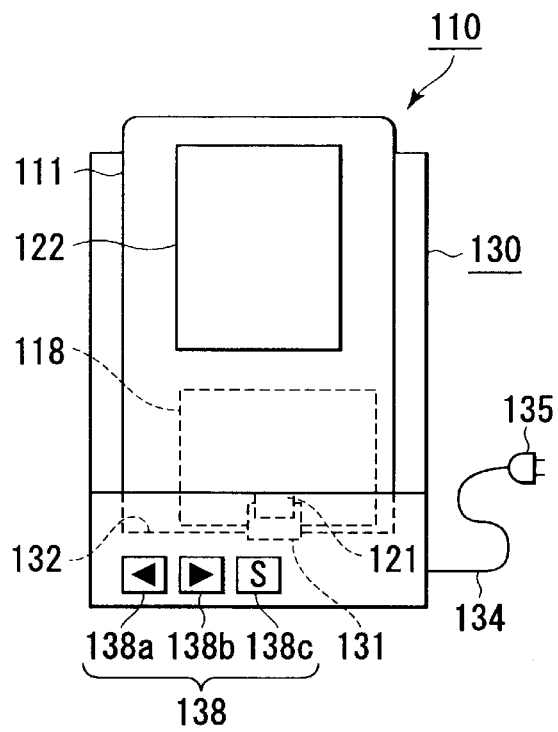

FIG. 27A and FIG. 27B show a schematic configuration of an electronic camera system according to a seventh embodiment of the present invention. FIG. 27A is a side view showing a state where an electronic camera is mounted on a stand 130 in such a manner that the back of the camera faces the front of the stand. FIG. 27B is its front view. In the seventh embodiment, the same component parts as those in the sixth embodiment (FIG. 20A to 26) are indicated by the same reference numerals and a detailed explanation of them are omitted.

As shown in FIG. 27A and FIG. 27B, the electronic camera 110 is mounted in a position different from the position in use, that is, in a vertical position, in such a manner that the left side face viewed from the front of the camera body 111 is inserted in a camera mounting concave section 132 of the stand 130. In such a mounting state, the connector 121 mounted on the left side face of the camera body 111 (located in the lower half of the figure because the camera body 111 is in the vertical position) is coupled with a connector 131 provided on the base of the camera mounting concave section 132 on the stand 130 side.

In a part of the exterior section of the stand 130, for example, on the front 137 of a base section 130a, there is provided an operation section 138 for manually changing the brightness setting value set by brightness changing means explained later. That is, there are provided a brightness decrease button 138a, a brightness increase button 138b, a setting button 138c, and others.

Figure 28A:
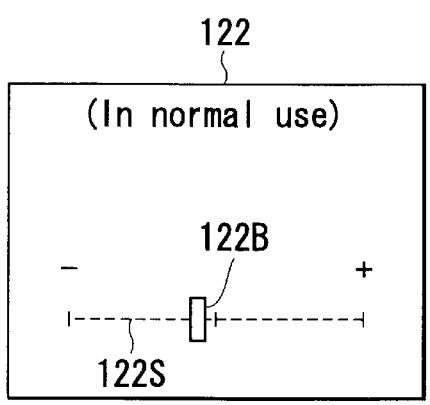
FIG. 28A and FIG. 28B show LCD display screens of the electronic camera according to the seventh embodiment, where
Figure 28B:
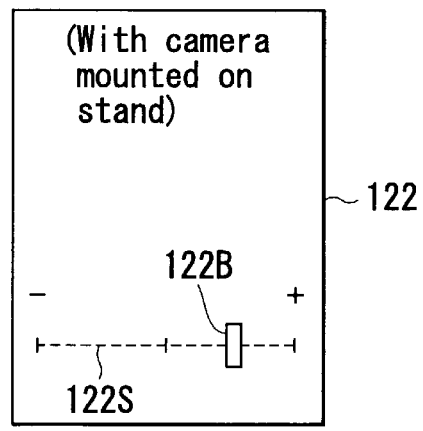

FIG. 28A shows a display screen on the LCD 122 when the electronic camera 110 is in normal use. FIG. 28B shows a display screen on the LCD 122 when the electronic camera 110 is mounted on the stand.

As shown in FIG. 28A, a brightness index 122B indicating the brightness of a display screen is almost in the middle of a scale 122S. In contrast, as shown in FIG. 28B, when the camera is mounted on the stand, the brightness index 122B moves to a position corresponding to a preset specific brightness setting value, that is, the vicinity of the right end of the scale 122S (e.g., [+3]). As a result of the movement of the index 122B, it is possible to confirm that the brightness of the LCD 122 with the camera mounted on the stand has been changed to the setting value.

The user can change and adjust the setting value of brightness arbitrarily by use of the operation section 138 according to the position of the electronic camera 111 mounted on the stand 130 or the angle at which the user views the LCD 122. In addition, an input specify section 181 of the camera body 111, explained later, makes it possible not only to make brightness adjustment in normal use but also to set the brightness setting value with the camera mounted on the stand.

Figure 29:
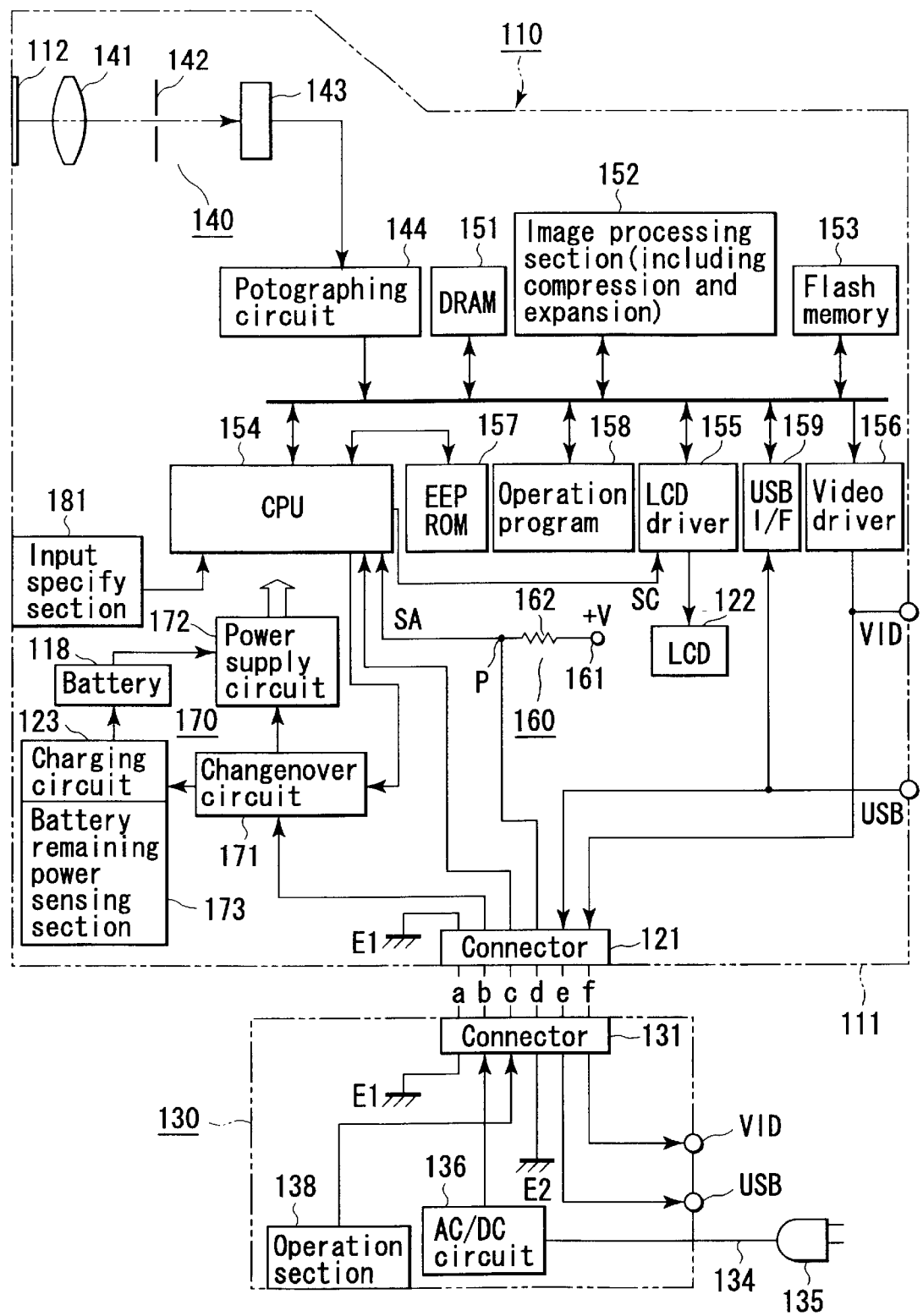
FIG. 29 is a block diagram showing a configuration of the control system of the electronic camera system according to the seventh embodiment of the present invention.

FIG. 29 is a block diagram showing a configuration of the control system of an electronic camera system including the electronic camera 110 with a brightness changing function and the stand 130. In FIG. 29, the same component parts as those in FIG. 23 are indicated by the same reference numerals and a detailed explanation of them is omitted.

First, the stand 130 will be explained. The stand 130 comprises not only an AC/DC converter 136, a video output terminal (jack) VID, a serial bus connection terminal (jack) USB acting as a signal communication terminal, and others, but also the operation section 183 including the brightness decrease button 138a, brightness increase button 138b, and setting button 138c. The operation section 138 is connected to the CPU 54 on the electronic camera side via the connector terminal c of the connector 131 on the stand side and the corresponding terminal c of the connector 121 on the electronic camera side.

Next, the electronic camera 110 will be explained. When the display image data is supplied via the LCD driver 155 to the LCD 122, which displays the data, the brightness of the displayed image is changed suitably by the brightness changing means according to the position of the electronic camera 110. Then, as described later, when it is sensed that the camera body 111 is mounted on the stand 130, control means composed of the CPU 154 and LCD driver 155 controls the brightness changing means. As a result, the direction of the field angle at the LCD 122 is changed to a setting value (direction) suitable for the electronic camera 110 mounted on the stand.

In FIG. 29, reference numeral 257 indicates an EEPROM for storing the initial setting information about the electronic camera 10 and reference numeral 281 is an input specify section having various setting switches, including a switch that responds to the release button 115 and a switch that responds to a brightness adjust button (not shown).

Hereinafter, the brightness changing control operation of the electronic camera 110 in the seventh embodiment configured as described above will be explained by reference to FIG. 30A, FIG. 30B, and others.

The electronic camera 110 is set in the reproducing mode to display the image recorded in the electronic camera 110. Then, specific image data whose frames are specified is read from the image recording medium 153 and undergoes an expansion process at the image processing unit 152. The resulting data is stored in the temporary storage circuit 151.

Figure 30A:
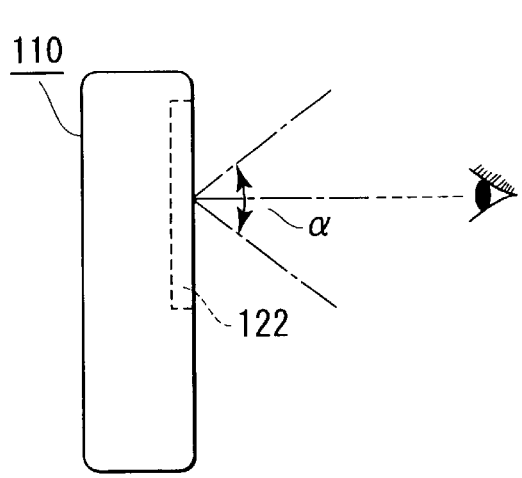
FIG. 30A and FIG. 30B are drawings to help explain the operation of the electronic camera according to the seventh embodiment of the present invention, where

When the electronic camera 110 is not mounted on the stand 130 and the camera body 11 is in the normal position, the connectors 121 and 131 are not connected with each other. At a result, the potential control terminal P of the stand mounting sensing circuit 160 is kept at a high potential +V. Thus, the stand mounting sensing circuit 160 informs the CPU 154 of stand mounting information SA "absent." Consequently, the CPU 154 informs the LCD driver 155 of brightness changing instruction SC "absent." Therefore, the image based on the reproduce image data stored in the temporary storage circuit 151 is displayed on the LCD display section 22 at a standard brightness (of a suitably set value), for example, at [−1] (see FIG. 28A). Thus, as shown in FIG. 30A, the displayed image can be seen well in the range of a field angle of α.

When the electronic camera 110 is mounted on the stand 130 and held at an angle of θ, with an inclination of about 10° to the horizontal plane, the connectors 121 and 131 are connected with each other. Thus, the potential control terminal P of the stand mounting sensing circuit 160 is forced to drop to the ground potential. Accordingly, the stand mounting sensing circuit 160 informs the CPU 154 of stand mounting information SA "present." Therefore, the CPU 154 informs the LCD driver 155 of brightness changing instruction SC "present." As a result, the brightness is changed so that the direction of the field angle at the LCD 222 may be changed to a setting value (direction) corresponding to the position in which the camera body 111 is mounted on the stand 130.

Figure 30B:
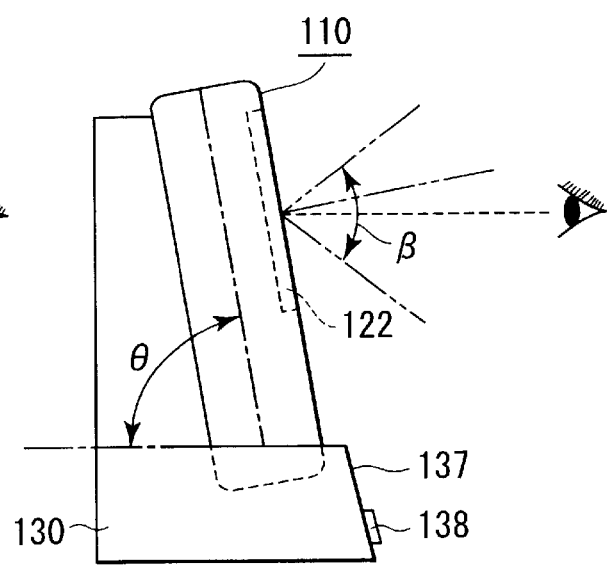

Therefore, the image based on the reproducing image data stored in the temporary storage circuit 151 is displayed on the LCD 122 at the brightness changed and set as described above, for example, at [+3] (see FIG. 28B). Thus, as shown in FIG. 30B, the image can be seen well in the range of a field angle of β (equal to α) at the setting value (direction) changed according to the position in which the camera body 11 is mounted on the stand 30 (with an inclination of, for example, about 10° to a horizontal plane).

The setting value of the direction of the field angle can be adjusted and set by manually operating the operating section 138. Specifically, to make the brightness a little lower than the setting value, the brightness decrease button 138a has only to be pressed a desired number of times. To make the brightness a little higher than the setting value, the brightness increase button 138b has only to be pressed a desired number of times. Then, pressing the setting button 138c determines the adjusted value.

In the seventh embodiment, while in the setting of brightness, the value for normal use and the value for use with the camera mounted on the stand have been set separately, the latter value may be obtained by adding a specific correction value to the setting value for normal use. This makes it possible to automatically set and change the setting value for use with the camera mounted on the stand, just by carrying out the setting and changing operations for normal use.

The electronic camera 110 and stand 130 shown in the seventh embodiment includes the following modifications. One modification is such that the camera body 111 is mounted on the stand 130 in a horizontally long position. Another modification is such that mechanical means, for example, a mechanism for changing the direction of the field angle by rotating the LCD 22 itself is used as field angle changing means, in place of electrical means, such as brightness changing means.

Furthermore, the configuration of the seventh embodiment may be combined suitably with the configurations of the first to fifth embodiments. For instance, one combination may be such that, when the electronic camera is mounted in the second direction and the reproducing mode or the like is selected and set, the brightness is changed. In addition, the configuration of the seventh embodiment may be combined with that of the sixth embodiment to mount the electronic camera on the camera stand, thereby changing both of the direction of the image and the brightness.

(Characteristics of the seventh embodiment)

[1] The electronic camera 110 described in the embodiment is configured so as to be capable of being mounted on a chargeable camera stand 130 and is characterized by comprising a camera body 111, an LCD 22 (display means) which is provided on the camera body 111 and displays an image based on image data, field angle changing means (LCD driver 55, LCD display section 22) for changing the direction of field angle at the LCD 122, sensing means (stand mount sensing circuit 160) for sensing that the camera body 111 is mounted on the stand 130, and, control means (CPU 154, LCD driver 155) which, when the sensing means 160 senses that the camera body 111 is mounted on the stand 130, controls the field angle changing means to change the direction of field angle to a setting value corresponding to the position in which the camera body 111 is mounted on the stand 130.

In the electronic camera 110, when the camera body 111 is mounted on the stand 130, the direction of field angle at the LCD 122 is changed automatically to a setting value corresponding to the position in which the camera body 111 is mounted on the stand 130. Therefore, even when the camera body 111 is mounted on the stand 130, inclining at a specific angle to the latter, the displayed image on the LCD 122 is easy to view.

[2] The electronic camera 110 described in the embodiment and item [1] is characterized in that the field angle changing means (LCD driver 155, LCd 122) is brightness changing means for changing the brightness of the LCD 122.

In the electronic camera 110, it is possible to change the brightness and control the field angle just by, for example, providing electrical means for controlling the voltage applied to liquid-crystal molecules, which simplifies the configuration of the control system.

[3] The electronic camera 110 described in the embodiment and item [1] or [2] is characterized in that the camera body 111 includes an operation section (input specify section 181) which enables the setting value for the direction of the field angle to be changed manually.

In the electronic camera 110, the user can change and adjust the setting value to the optimum state according to the position in which the camera body 111 is mounted on the stand 130 or the angle at which the user views the LCD 122. Thus, the setting value can be adjusted to the optimum value at any time.

[4] The camera stand 130 described in the embodiment is the charging stand 130 provided so as to enable the electronic camera 110 described in item [1] or [2] to be mounted on the stand and is characterized in that an operation section 138 which enables the setting value for the direction of field angle to be changed manually is added to the exterior 137, with the camera body 111 being mounted on the stand 130.

In the stand 130, with the camera body 111 being mounted on the stand 130, the user can adjust the setting value for the field angle at the LCD 122 arbitrarily on the stand 130 side, which makes the stand easier to use and excellent in operability.

(Eighth Embodiment)

Figure 31A:
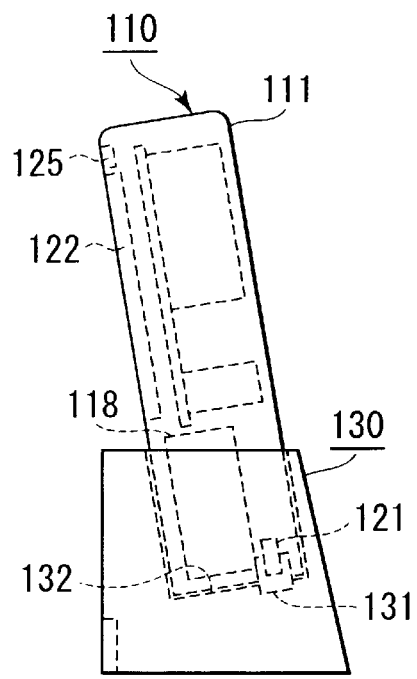
FIG. 31A and FIG. 31B show a schematic configuration of an electronic camera system according to an eighth embodiment of the present invention, where
Figure 31B:
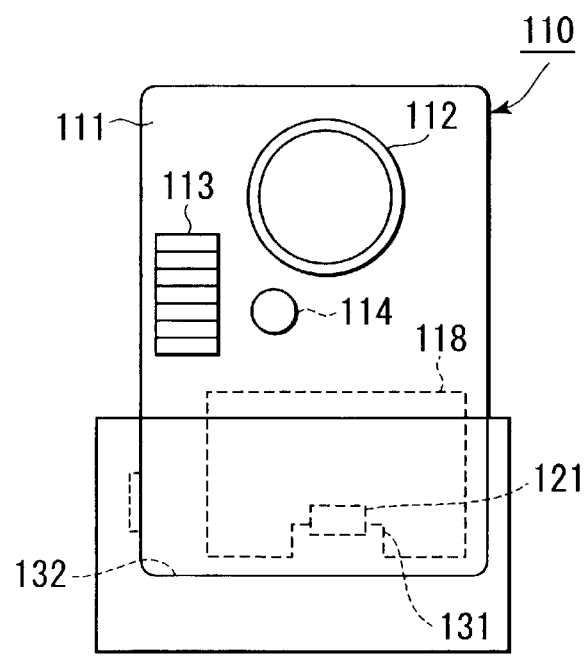
Figure 32:
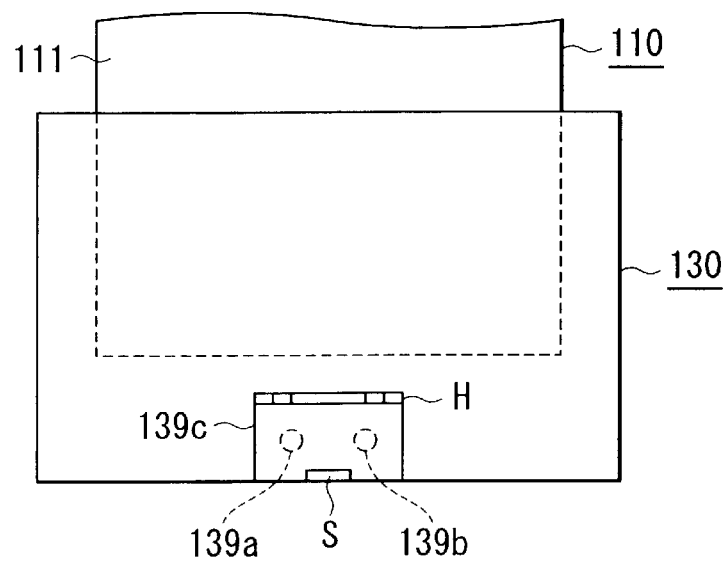
FIG. 32 is a back view, with a portion broken away, of the electronic camera system according to the eighth embodiment of the present invention.

FIG. 31A and FIG. 31B show a configuration of an electronic camera system according to an eighth embodiment of the present invention. FIG. 31A is a side view showing a state where an electronic camera is mounted on a stand 130 in such a manner that the front of the camera faces the front of the stand. FIG. 31B is its front view. FIG. 32 is a back view, with a portion broken away, of the electronic camera system. In the eighth embodiment, the same parts as those in the sixth embodiment are indicated by the same reference numerals and an detailed explanation of them is omitted.

As shown in FIG. 31A and FIG. 31B, the electronic camera 110 is mounted in a position different from the position in use, that is, in a vertical position, in such a manner that the left side face, viewed from the front of the camera body 111, is inserted in a camera mounting concave section 132 of the stand 130. In such a mounting state, the connector 121 mounted on the left side face of the camera body 111 (located in the lower half of the figure because the camera body 111 is in the vertical position) is coupled with a connector 131 provided on the base of the camera mounting concave section 132 on the stand 130 side. On a part of the back of the camera, there is provided a photographing mode select mode button 125 used for selecting and setting a normal photographing mode or a specific photographing mode for automatic photography as the photographing mode of the electronic camera 110.

The camera stand 130 is integrally formed into a truncated-pyramid-like shape made of, for example, hard resin. On the top, the camera mounting concave section 132 is provided. In a relatively inconspicuous place of the stand 130, for example, in the lower part of the back, power connection jacks 139a, 139b are provided. The power connection jacks 139a, 139b are designed to be connectable to a power supply outlet (not shown) via a cable (not shown). The power connection jacks 139a, 139b, when not in use, cannot be seen directly from the outside, with a lid 139c (where S indicates a control and H indicates a hinge) closed.

Figure 33:
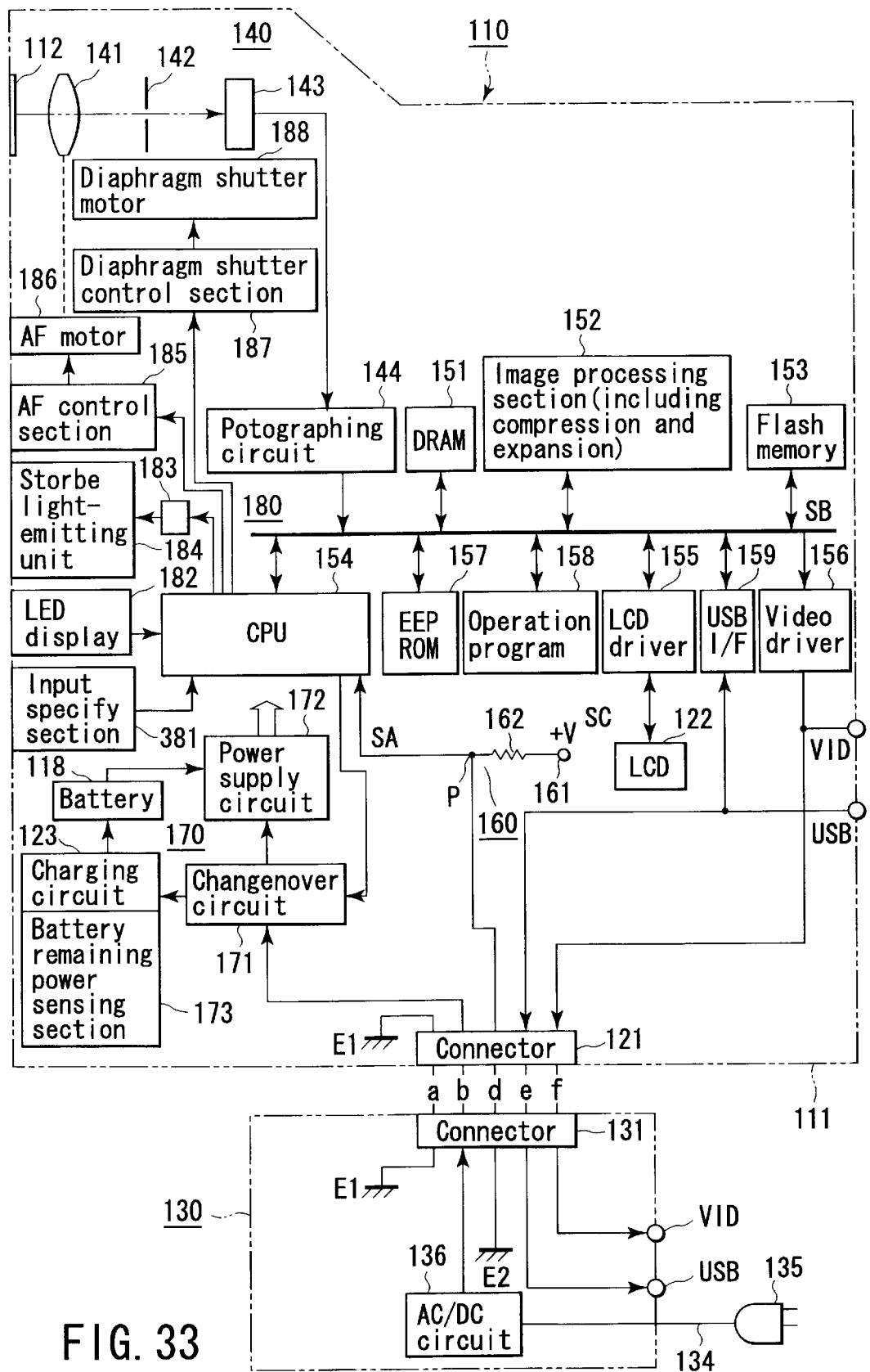
FIG. 33 is a block diagram showing a configuration of the control system of the electronic camera system according to the eighth embodiment of the present invention.

FIG. 33 is a block diagram showing a configuration of the control system of an electronic camera system including the electronic camera 110 with a specific-photographing-mode-based (or monitor photographing-mode-based) monitor function and the stand 130. In FIG. 33, the same parts as those in FIG. 29 are indicated by the same reference numerals and an detailed explanation of them is omitted.

The configuration of the stand 130 is the same as that of FIG. 23, so its explanation is omitted. Hereinafter, the electronic camera 110 will be explained.

A camera control section 180 in the electronic camera 110 comprises an input specify section 381, an LED (light-emitting diode) 182, a strobe control section 183, a strobe light-emitting unit 184, an AF (autofocus) control section 185, an AF (autofocus) motor 186, a diaphragm shutter control section 187, and a diaphragm shutter motor 188.

The input specify section 381, which responds to the mode button 125, includes a mode select switch for selecting and setting the photographing mode of the electronic camera 110, a release switch that responds to the release button 115, and other various switches.

The CPU 154 includes photographing mode select means which, when receiving a mode select switch signal from the input specify section 381, selects the normal photographing mode or the specific photographing mode for automatic photography from the photographing modes of the electronic camera 110 according to the mode select switch signal and sets the selected mode. The CPU 154 further includes monitor photographing means for photographing under photographing conditions that no other people are allowed to notice photographing operations when the specific photographing mode is selected. The monitor photographing means is means for photographing while inhibiting at least one of the following operations: light emission by the strobe light-emitting unit 184, display by the LED display unit 182 and LCD 122, focusing by the AF motor 186 and the moving of the lens for zooming by a zoom motor (not shown), the driving of the diaphragm shutter by the diaphragm shutter motor 188, and sound reproduction and calling.

Figure 34:
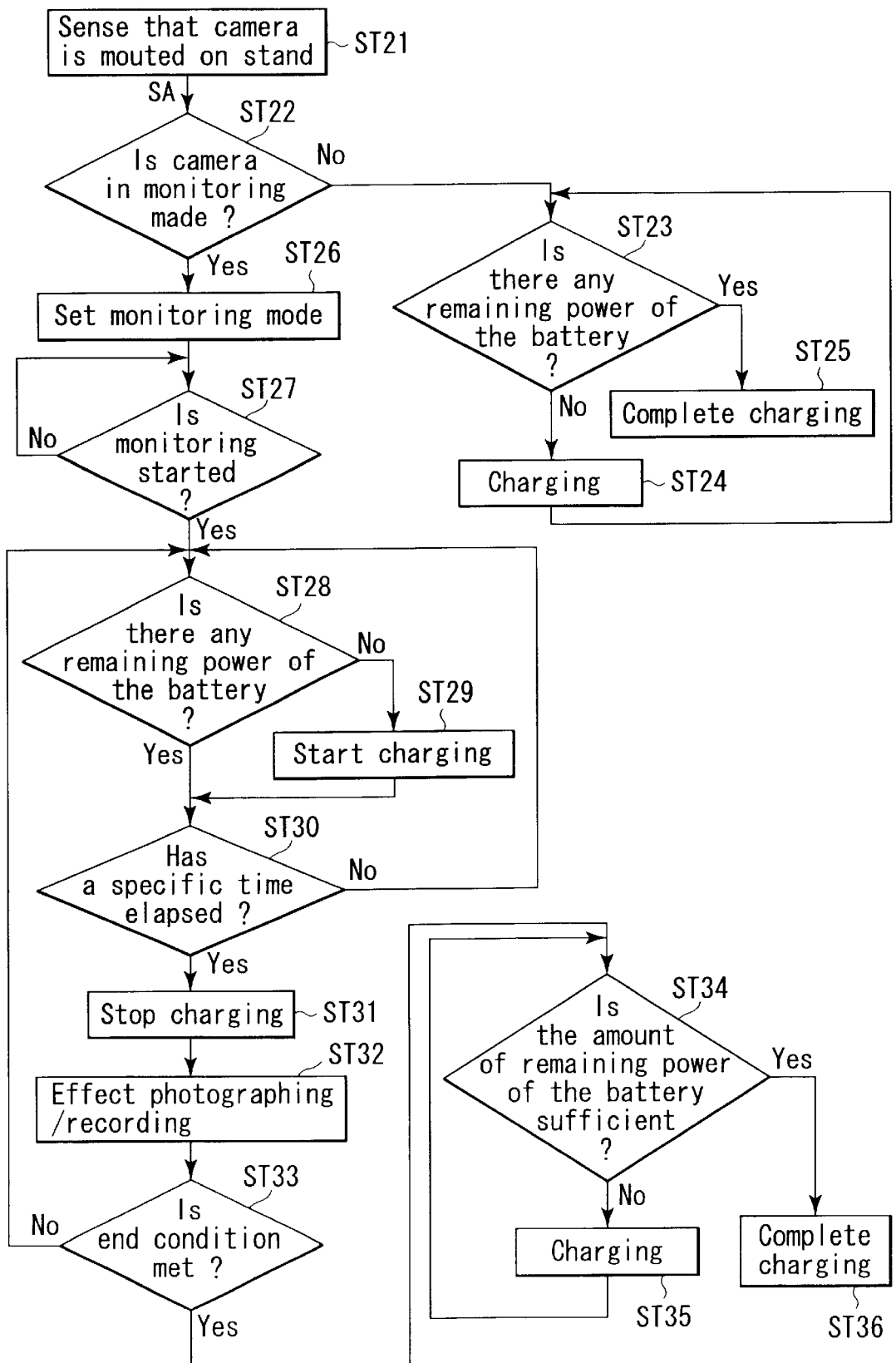
FIG. 34 is a flowchart to help explain the basic operation of the control system of the electronic camera system related to the eighth embodiment of the present invention.

Hereinafter, the basic operation of the electronic camera system in the eighth embodiment configured described above will be explained by reference to a flowchart shown in FIG. 34.

Step ST21: When it is sensed that the electronic camera 110 is mounted on the stand, stand mounting information SA is obtained.

Step ST22: It is determined whether the photographing mode of the electronic camera 110 as a result of the operation of the mode button 125 is the monitoring mode. If it is not the monitoring mode, control goes to step ST23. If it is the monitoring mode, control proceeds to step ST26.

Step ST23: If the photographing mode is not the monitoring mode, the amount of remaining power of the battery is checked. If the amount of remaining power of the battery is insufficient, control proceeds to step ST24. If the amount of remaining power of the battery is sufficient, control goes to step ST25.

Step ST24: Charging is done and control returns to step ST23.

Step ST25: The charging is completed.

Step ST26: If it has been determined that the photographing mode is the monitoring mode in step ST22, the CPU 154 sets the monitoring mode. Specifically, AE and AF operations are carried out, thereby setting the amount of diaphragm opening, shutter speed, and focusing suitably. Thereafter, all of the following operations are inhibited: for example, light emission by the strobe light-emitting unit 184, display by the LED display section 182 and LCD 122, focusing by the AF motor 186, the lens movement for zooming by the zoom motor (not shown), the driving of the diaphragm shutter by the diaphragm shutter motor 188, and sound reproduction and calling.

Step S27: It is determined whether the monitoring photography is started at a result of the release button 15 being pressed. If the release button 115 has not been pressed, control remains there until the button is pressed.

Step S28: When monitoring photography is started, the amount of remaining power of the battery is checked. If the amount of remaining power of the battery is insufficient, control goes to step ST29. If the amount of remaining power of the battery is sufficient, control proceeds to step ST30.

Step ST29: Charging is started and control goes to step ST30.

Step ST30: It is checked whether a specific time (e.g., 10 minutes) previously set by a timer has elapsed. Control returns to step ST28 until the specific time (e.g., 10 minutes) has elapsed. Hereinafter, this operation is repeated. When the specific time (e.g., 10 minutes) has elapsed, a photograph instruction is given, which allows control to proceed to step ST31.

Step ST31: For example, when the switching of the changeover circuit 71 stops the charging circuit 23 from charging the battery because of a photographing operation, control proceeds to step ST32.

Step ST32: Photographing is done in the monitoring mode. The photographed image data is subjected to a compressing process. The resulting data is recorded in the image recording medium 153 composed of a flash memory. Then, control proceeds to step ST33.

Step ST33: The condition for ending the photography in the monitoring mode is checked. For example, it is checked whether a preset total monitoring time (e.g., 24 hours) has elapsed. If the end condition is not met, control returns to step ST28. Thereafter, photographing is done in the monitoring mode at intervals of, for example, 10 minutes, while charging the battery, until the end condition is met. If the end condition is met, control proceeds to step ST34.

Step ST34: The amount of remaining power of the battery is checked. If the amount of remaining power of the battery is insufficient, control goes to step ST35. If the amount of remaining power of the battery is sufficient, control goes to step ST36.

Step ST35: Charging is effected and control returns to step ST34.

Step ST36: Charging is completed.

In the eighth embodiment, while operating the mode button 125 causes the normal photographing mode or the specific photographing mode for automatic photography to be selected from the photographing modes of the electronic camera 110 and the selected mode to be set, the camera body 111 may be configured to function automatically as a monitoring camera, when the camera body is mounted on the camera stand 130. That is, monitoring function automatic setting means may be provided so that, when the stand mounting sensing circuit 160 senses that the camera body 111 is mounted on the stand 130, the CPU 154 sets the photographing mode of the camera body 111 to the specific photographing mode, thereby carrying out photography under the conditions that no one else is allowed to notice the photographing operations.

(Ninth Embodiment)

Figure 35:
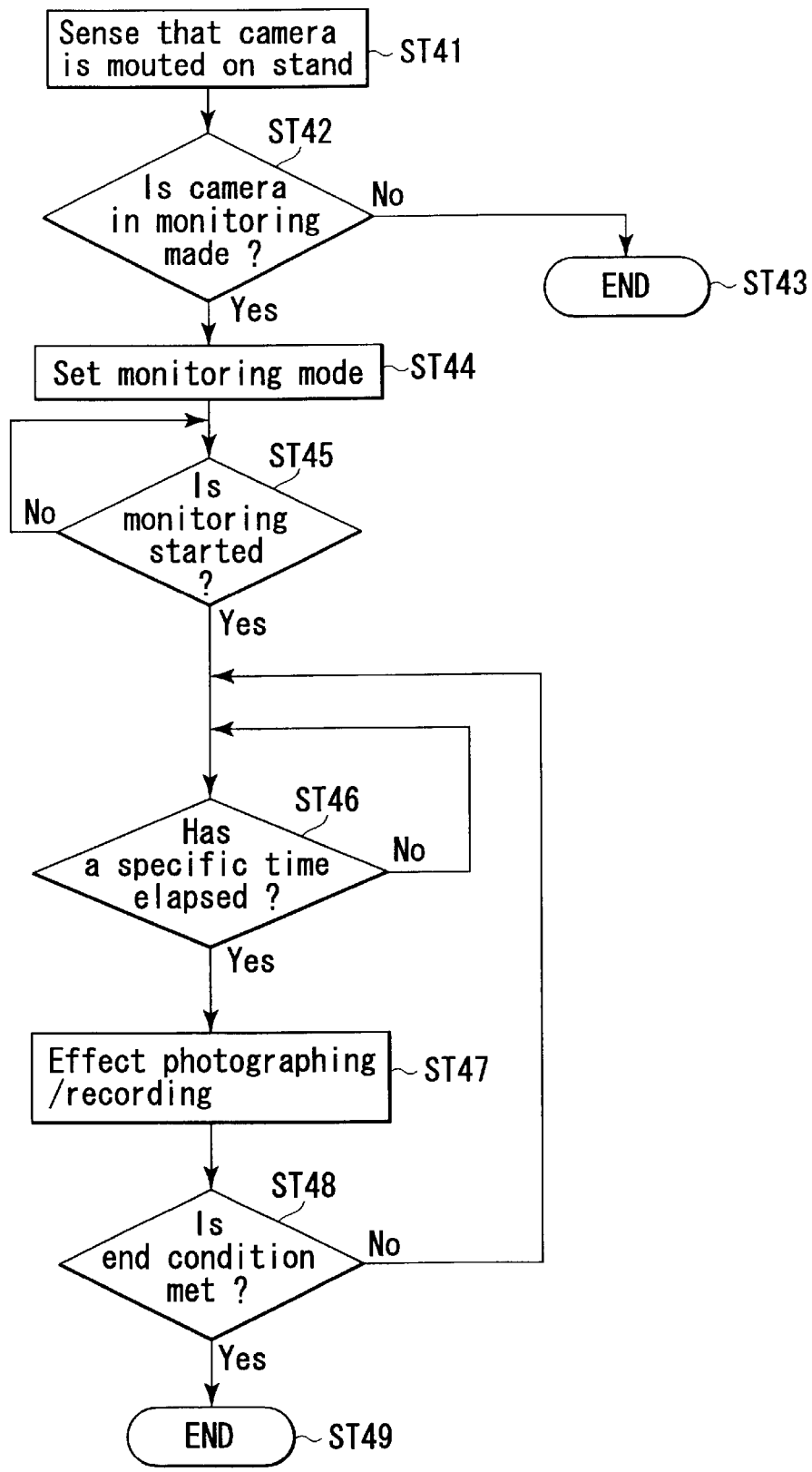
FIG. 35 is a flowchart to help explain the basic operation of the electronic camera system according to a ninth embodiment of the present invention.

FIG. 35 is a flowchart to help explain the basic operation of an electronic camera system according to a ninth embodiment of the present invention. The ninth embodiment differs from the eighth embodiment in that a primary battery (not shown) is used in place of the secondary battery 18. Hereinafter, the operation will be explained by reference to the flowchart of FIG. 9.

Step ST41: When it is sensed that the electronic camera 110 is mounted on the stand 130, stand mounting information SA is obtained.

Step ST42: It is determined whether the photographing mode of the electronic camera 110 as a result of the operation of the mode button 125 is the monitoring mode. If it is not the monitoring mode, control proceeds to step ST43. If it is the monitoring mode, control goes to step ST44.

Step ST43: If the photographing mode is not the monitoring mode, the operation is completed.

Step ST44: If it has been determined in step ST42 that the photographing mode is the monitoring mode, the CPU 154 sets the monitoring mode. Specifically, AE and AF operations are carried out, thereby setting the amount of diaphragm opening, shutter speed, and focusing suitably. Thereafter, all of the following operations are inhibited: for example, light emission by the strobe light-emitting unit 184, display by the LED display section 182 and LCD 122, focusing by the AF motor 186, the lens movement for zooming by the zoom motor (not shown), the driving of the diaphragm shutter by the diaphragm shutter motor 188, and sound reproduction and calling.

Step S45: It is determined whether the monitoring photography is started as a result of the release button 15 being pressed. If the release button 115 has not been pressed, control remains there until the button is pressed.

Step S46: A timer checks whether a specific time (e.g., 10 minutes) has elapsed. Control remains there until the specific time (e.g., 10 minutes) has elapsed. When the specific time (e.g., 10 minutes) has elapsed, control proceeds step ST47.

Step ST47: Photographing is done in the monitoring mode. The photographed image data is subjected to a compressing process. The resulting data is recorded on the image recording medium 153 composed of a flash memory. Then, control proceeds to step ST48.

Step ST48: The condition for ending the photography in the monitoring mode is checked. For example, it is checked whether a preset total monitoring time (e.g., 10 hours) has elapsed. If the end condition is not met, control returns to step ST46. Thereafter, photographing is done in the monitoring mode at intervals of, for example, 10 minutes, until the end condition is met. If the end condition is met, control proceeds to step ST49.

Step ST49: The series of operations is completed.

The configurations of the eighth and ninth embodiments may be combined suitably with the configurations of the first to fifth embodiments. For instance, one combination may be such that, when the electronic camera is mounted in the first direction and the photographing mode is selected and set, the monitoring mode may be selected and set as the specific photographing mode for automatic photography according to the state of the mode button 125.

(Characteristics of the Eighth and Ninth Embodiments)

[1] The electronic camera system described in the embodiments comprises an electronic camera 110 and a camera stand 130 on which the electronic camera 110 is mounted detachably, and is characterized in that the camera stand 130 includes power supplying means (e.g., AC/DC converter 136) for supplying power to the electronic camera 110 mounted on the camera stand 130, and the electronic camera 110 includes a camera body 111, photographing mode select means (e.g., mode button 125, CPU 154) for selecting a normal photographing mode or a specific photographing mode for automatic photography from the photographing modes of the camera body 111 and setting the selected mode, and camera control means (e.g., CPU 154, camera control section 180) for controlling the camera body 111 by the photographing mode select means according to the selected photographing mode.

In the electronic camera system, with the electronic camera 110 mounted on the camera stand 130, the normal photographing mode or specific photographing mode for automatic photography can be selectively set as the photographing mode of the camera body 111, which enables the electronic camera 110 to achieve a monitoring function. Since the camera stand 130 supplies power to the electronic camera 110, there is no need to worry about the battery consumption.

[2] The electronic camera system described in the embodiments and item [1] is characterized in that the camera control means (e.g., CPU 154, camera control section 180) includes means for photographing under photographing conditions that no other people are allowed to notice photographing operations, when the specific photographing mode (monitor photographing mode) is selected.

[3] The electronic camera system described in the embodiments and item [2] is characterized in that the means for photographing under photographing conditions that no other people are allowed to notice photographing operations is means for photographing while inhibiting at least one of strobe light emission, display by display means (e.g., LED display section 182, LCD 122), lens movements by focusing means (e.g., AF motor 86) and zooming means (not shown), driving operations by diaphragm and shutter means (e.g., diaphragm shutter motor 188), and sound reproduction and calling.

In the electronic camera system, the photographing operation by the electronic camera 110 is carried out unnoticed. Consequently, for example, it is possible to take pictures without letting the subject know.

[4] The electronic camera system described in the embodiments and item [1], [2], or [3] is characterized in that the electronic camera 110 includes charging means (e.g., the charging circuit 123) for charging a built-in secondary battery 118 with power supplied from the camera stand 130.

In the electronic camera system, since the electronic camera 110 has the charging means (e.g., the charging circuit 123), it is not necessary to prepare a charger separately.

[5] The electronic camera system described in the embodiments and item [4] is characterized in that the camera control means (e.g., CPU 154, camera control section 180) performs control so as to suspend the charging by the charging means (e.g., charging circuit 123) and execute photography, when photographing in the specific photographing mode is specified while the charging means (e.g., charging circuit 123) is charging the built-in secondary battery 118.

In the electronic camera system, even when the amount of power supplied from the camera stand 130 is small, photographing can be done in the specific photographing mode without any trouble.

[6] The electronic camera system described in the embodiments and item [4] is characterized in that the camera control means (e.g., CPU 154, camera control section 180) performs control so as not only to suspend the charging by the charging means (e.g., charging circuit 123) and execute photography, when photographing in the specific photographing mode is specified while the charging means (e.g., charging circuit 123) is charging the built-in secondary battery 118, but also to resume the charging, when the photographing is completed.

In the electronic camera system, because the charging is resumed immediately after the photographing in the specific photographing mode is completed, the electronic camera 110 mounted on the camera stand 130 can be used immediately at any time.

[7] The electronic camera system described in the embodiments and item [5] or [6] is characterized in that the electronic camera 110 includes battery remaining-power sensing means 173, and the camera control means (e.g., CPU 54, camera control section 180) effects charging again, when the battery remaining-power sensing means 173 senses a decrease in the amount of remaining power due to photographing, after the photographing operation is completed.

In the electronic camera system, the electronic camera 110 always fully charged is prepared. This makes the electronic camera 110 always ready to use.

[8] The electronic camera system described in the embodiments and any one of item [1] to item [7] is characterized in that the electronic camera 110 includes mount sensing means (e.g., stand mount sensing circuit 160) for sensing that the camera body 111 is mounted on the camera stand 130.

[9] The electronic camera described in the embodiments is an electronic camera 110 which is mounted on a camera stand 130 and receives power from power supplying means (e.g., AC/DC converter 136) provided in the camera stand 130, and is characterized by comprising a camera body 111, charging means (e.g., charging circuit 123) for charging a secondary battery 118 built in the camera body 111 with power supplied from the camera stand 130, photographing mode select means (e.g., mode button 125, CPU 154) for selecting a normal photographing mode or a specific photographing mode for automatic photography from the photographing modes of the camera body 111 and setting the selected mode, and camera control means (e.g., CPU 154, camera control section 180) for controlling the camera body 111 according to the photographing mode selected by the photographing mode select means.

[10] The electronic camera described in the embodiments and item [9] is characterized in that the camera control means (e.g., CPU 154, camera control section 180) includes means for photographing under photographing conditions that no other people are allowed to notice photographing operations, when the specific mode (monitor photographing mode) is selected.

[11] The electronic camera described in the embodiments and item [10] is characterized in that the means for photographing under photographing conditions that no other people are allowed to notice photographing operations is means for photographing while inhibiting at least one of strobe light emission, display by display means (e.g., LED display section 182, LCD 122), lens movements by focusing means or the like (e.g., AF motor 86) and zooming means (not shown), driving operations by diaphragm and shutter means (e.g., diaphragm shutter motor 188), and sound reproduction and calling.

In the electronic camera 110, the photographing operation by the electronic camera 110 is carried out unnoticed. Consequently, for example, it is possible to take pictures without letting the subject know.

[12] The electronic camera described in the embodiments is characterized by comprising a camera body 111, photographing mode select means (e.g., mode button 125, CPU 154) for selecting a normal photographing mode or a specific photographing mode for automatic photography from the photographing modes of the camera body 111 and setting the selected mode, and camera control means (e.g., CPU 154, camera control section 180) for photographing under photographing conditions that no other people are allowed to notice photographing operations, when the photographing mode select means selects and sets the specific photographing mode (monitor photographing mode).

[13] The electronic camera described in the embodiments is an electronic camera system comprising an electronic camera 110 and a camera stand 130 on which the electronic camera 110 is mounted detachably and is characterized in that the electronic camera 110 includes a camera body 111, mount sensing means (e.g., stand mount sensing circuit 150) for sensing that the camera body 111 is mounted on the camera stand 130, and monitoring function automatic setting means for setting the photographing mode of the camera body 111 to a specific photographing mode when the mounting sensing means senses that the camera body 111 is mounted on the camera stand 130, and carrying out photography under conditions that no one else is allowed to notice photographing operations.

(Tenth Embodiment)

FIG. 36A and FIG. 36B show a schematic configuration of an electronic camera system according to a tenth embodiment of the present invention. FIG. 36A is a side view showing a state where a camera is mounted on a stand 130 in such a manner that the back of the camera faces to the front of the stand. FIG. 36B is its front view. In the tenth embodiment, the same parts as those in the sixth embodiment (FIG. 20A to FIG. 26) are indicated by the same reference numerals and an detailed explanation of them is omitted.

As shown in FIG. 36A and FIG. 36B, the electronic camera 110 is mounted in a position different from the position in use, that is, in a vertical position, in such a manner that the left side face viewed from the front of the camera body 111 is inserted in a camera mounting concave section 132 of the stand 130. In such a mounting state, a connector 121 mounted on the left side face of the camera body 111 (located in the lower half of the figure because the camera body 111 is in the vertically long position) is coupled with a connector 131 provided on the base of the camera mounting concave section 132 on the stand 130 side.

FIG. 37 is an enlarged sectional view, with a portion broken away, of a primary part of FIG. 36A. As shown in FIG. 37, light projecting means 130L for projecting light onto the photographing system 140 (including photographing lens 141, photographing element 143) of the electronic camera 110 mounted on the stand 130 is provided in the camera stand 130. The light projecting means 130L is composed of a light source 137, a reflecting plate 138, and a milk-white plate 139. In the light projecting means, light emitted from the light source 137 is reflected diffusely by the reflecting plate 138. The diffusely reflected light is caused to pass through the milk-white plate 139, thereby producing uniform light, which is projected stably onto the photographing system 140. Moreover, in the electronic camera 110, there is provided defective pixel sensing means 190 for sensing defective pixels of the photographing element 143. The defective pixel sensing means 190, which includes a temperature sensor 191, explained later, and a defective pixel sensing and correcting section 192, is capable of sensing defective pixels accurately and correcting them.

Figure 38:
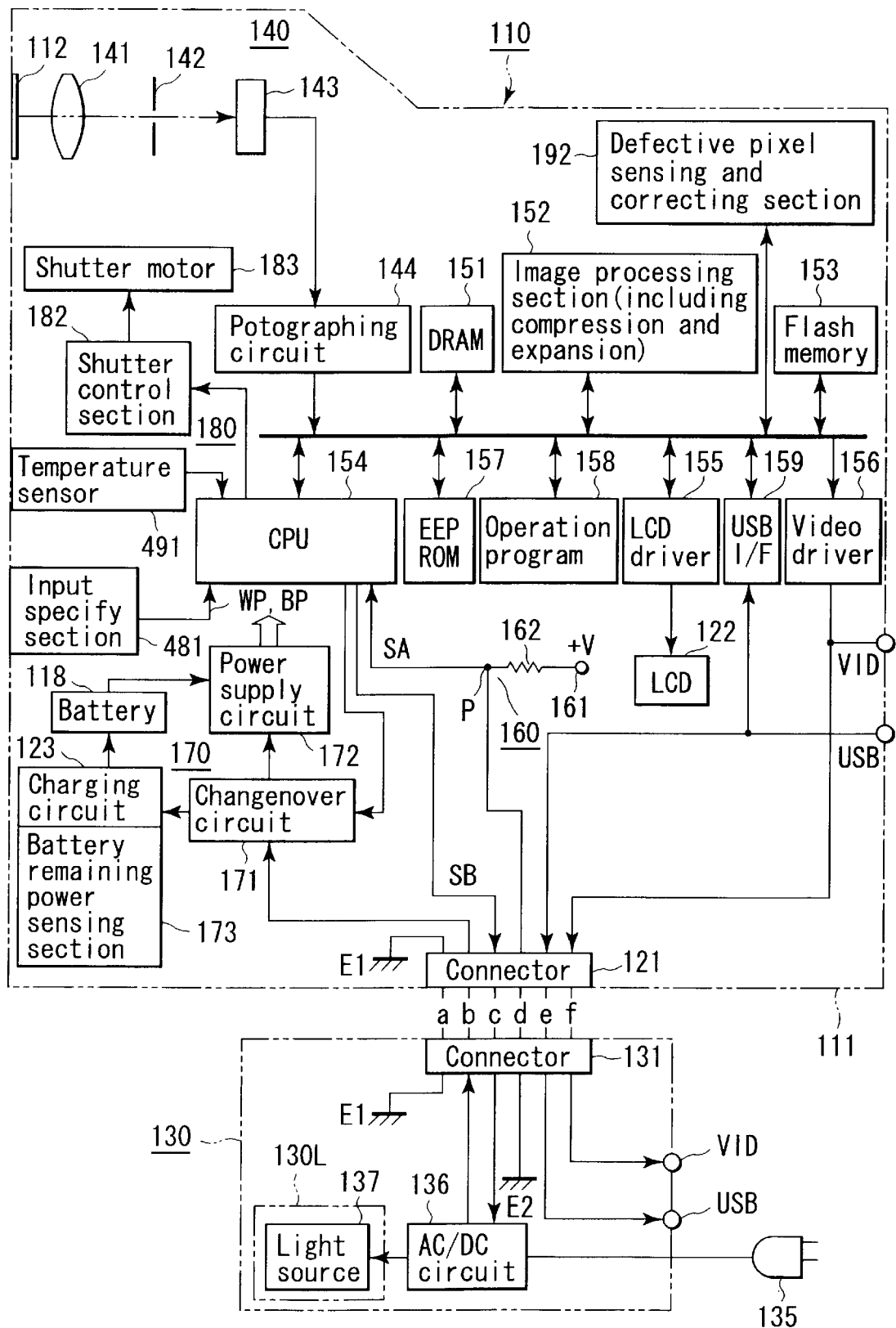
FIG. 38 is a block diagram showing a configuration of the control system of the electronic camera system according to the tenth embodiment of the present invention.

FIG. 38 is a block diagram showing a configuration of the control system of an electronic camera system including an electronic camera 110 with a defective pixel sensing and correcting function, and a camera stand 130.

First, the camera stand 130 will be explained. The stand 130 further includes the light source 137, one of the components of the light projecting means 130L.

Next, the electronic camera 110 will be explained. Reference numeral 157 indicates an EEPROM, composed of a flash memory or the like, for storing the addresses of sensed defective pixels.

An input specify section 481 in the camera control section 180 includes a release switch that responds to the release button 115, a switch that responds to the defective pixel sense instruction button 128, and various other switches.

A temperature sensor 191 serving as temperature measuring means is connected to the CPU 154. A defective pixel sensing and correcting section 192 is connected to the data bus 150. The temperature sensor 191, defective pixel sensing and correcting section 192, and EEPROM 157 that stores the addresses of the defective pixels, and defective pixel sense instruction button 128, together with the CPU 154, constitute the defective pixel sensing means 190 of the present invention. The defective pixel sensing means 190 senses defective pixels according to the temperature measured by the temperature sensor 191 and continuously monitors for defective pixels accurately, while compensating the sensed output level of temperature-dependent defective pixels for temperature.

In the tenth embodiment, the addresses of the sensed defective pixels are stored in the EEPROM 157. During photography, the data output from the defective pixels in the stored addresses is subjected to an interpolation process using the output data on the good pixels around the defective ones. The image data subjected to the interpolation process is subjected to a compression process. Then, the resulting data is stored in the image recording medium 153.

Figure 39:
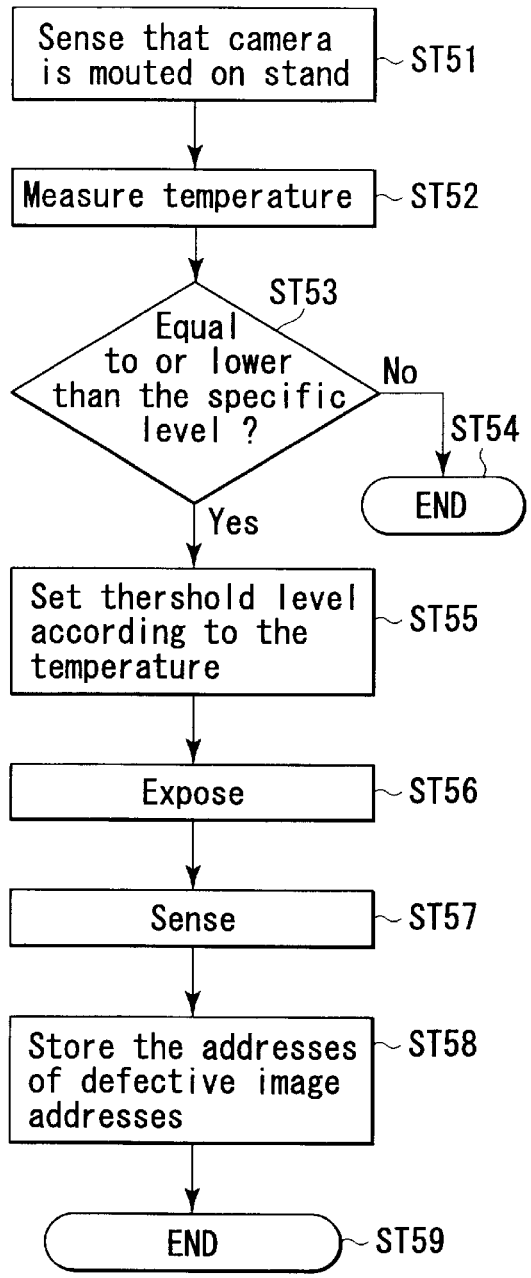
FIG. 39 is a flowchart to help explain the operation of sensing white defects in the electronic camera system according to the tenth embodiment of the present invention.
Figure 40:
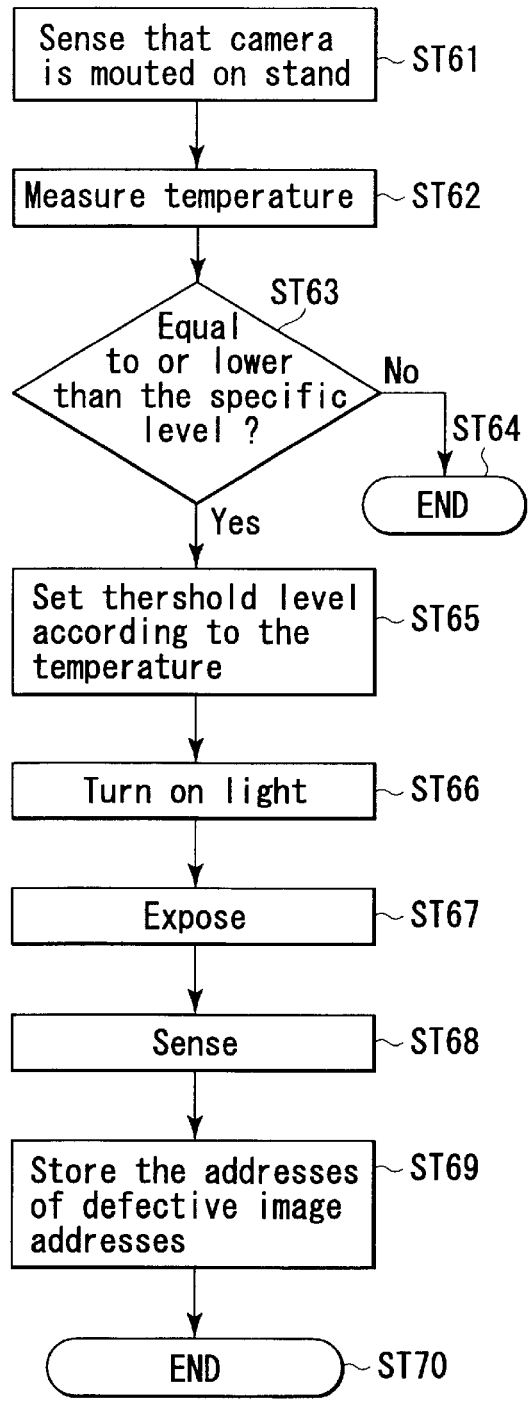
FIG. 40 is a flowchart to help explain the operation of sensing black defects in the electronic camera system according to the tenth embodiment of the present invention.

Hereinafter, a white defective sensing operation and a black defective sensing operation in the electronic camera system of the tenth embodiment configured as described above will be explained by reference to flowcharts in FIG. 39 and FIG. 40. First, a white defective sensing operation will be explained by reference to the flowchart of FIG. 39.

Step ST51: When the stand mount sensing circuit 160 senses that the electronic camera 110 is mounted on the stand 130, stand mounting information SA is obtained.

Step S52: The temperature around the photographing element 143 is measured on the basis of the signal from the temperature sensor 191, provided that the stand mounting information SA has been obtained.

Step ST53: It is determined whether the measured temperature is equal to or lower than a specific level.

Step ST54: If the result of the determination has shown that the measured temperature has exceeded the specific level, for example, 30° C., the sensing of defective pixels is not done and the sensing operation is stopped.

Step ST55: If the result of the determination has shown that the measured temperature is equal to or lower than the specific level, for example, 30° C., a defect decision threshold value corresponding to the measured temperature level (range) is set. For example, when the measured temperature is 25 to 30° C., the defect decision threshold value is set to +50 dB with respect to the average output level of good pixels. Similarly, when the measured temperature is 20 to 25° C., the defect decision threshold value is set to +40 dB with respect to the average output level of good pixels.

Step ST56: The photographing element 143 is exposed for a specific length of time (several seconds), with the shutter 142 closed.

Step ST57: The pixels whose output levels have exceeded the defect decision threshold value set according to the measured temperature level (range) are sensed as defective pixels.

Step ST58: The addresses of the sensed defective pixels are stored in the EEPROM 157.

Step ST59: The series of defect sensing operations is completed.

Next, a black defect sensing operation will be explained by reference to the flowchart of FIG. 40.

Step ST61: When the stand mounting sensing circuit 160 senses that the electronic camera 110 is mounted on the stand 130, stand mounting information SA is obtained.

Step S62: The temperature around the photographing element 143 is measured on the basis of the signal from the temperature sensor 191, provided that the stand mounting information SA has been obtained.

Step ST63: It is determined whether the measured temperature is equal to or lower than a specific level.

Step ST64: If the result of the determination has shown that the measured temperature has exceeded the specific level, for example, 35° C., the sensing of defective pixels is not done and the sensing operation is stopped.

Step ST65: If the result of the determination has shown that the measured temperature is equal to or lower than the specific level, for example, 35° C., a defect decision threshold value corresponding to the measured temperature level (range) is set. For example, when the measured temperature is 25 to 30° C., the defect decision threshold value is set to −20 dB with respect to the average output level of good pixels. Similarly, when the measured temperature is 20 to 25° C., the defect decision threshold value is set to −30 dB with respect to the average output level of good pixels.

Step ST66: The CPU 154 supplies an optical control signal SB on the basis of a black defect sensing instruction BP via the connectors 121, 131 to the AC/DC converter 136 in the stand 130. As a result, the AC/DC converter 136 supplies light-up power SP to the light source 137 of the light projecting means 130L. Thus, the light projecting means 130L projects uniform light stably to the photographing system 40 of the camera body 111.

Step ST67: The photographing element 143 is exposed for a specific length of time (an instant), with the shutter 142 open.

Step ST68: The pixels (less bright pixels) whose output levels have dropped below the defect decision threshold value set according to the measured temperature level (range) are sensed as black defective pixels.

Step ST69: The addresses of the sensed defective pixels are stored in the EEPROM 157.

Step ST70: The series of defect sensing operations is completed.

Figure 41:
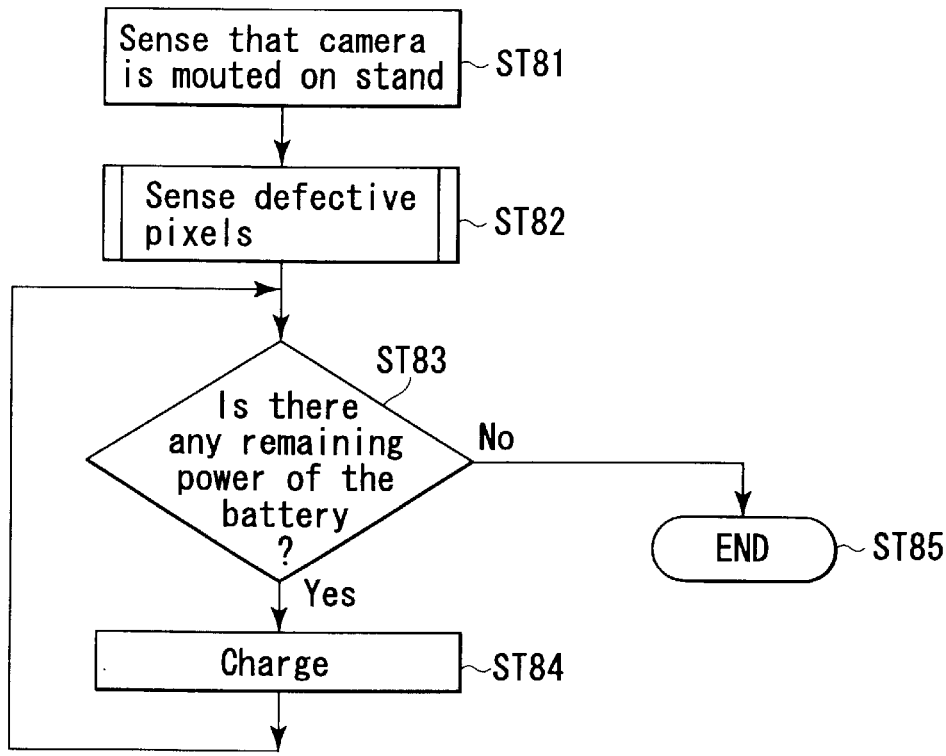
FIG. 41 is a flowchart to help explain the control operation, when charging is effected after defective-pixel sensing means carries out the defective-pixel sensing operation in the electronic camera system according to the tenth embodiment of the present invention.
Figure 42:
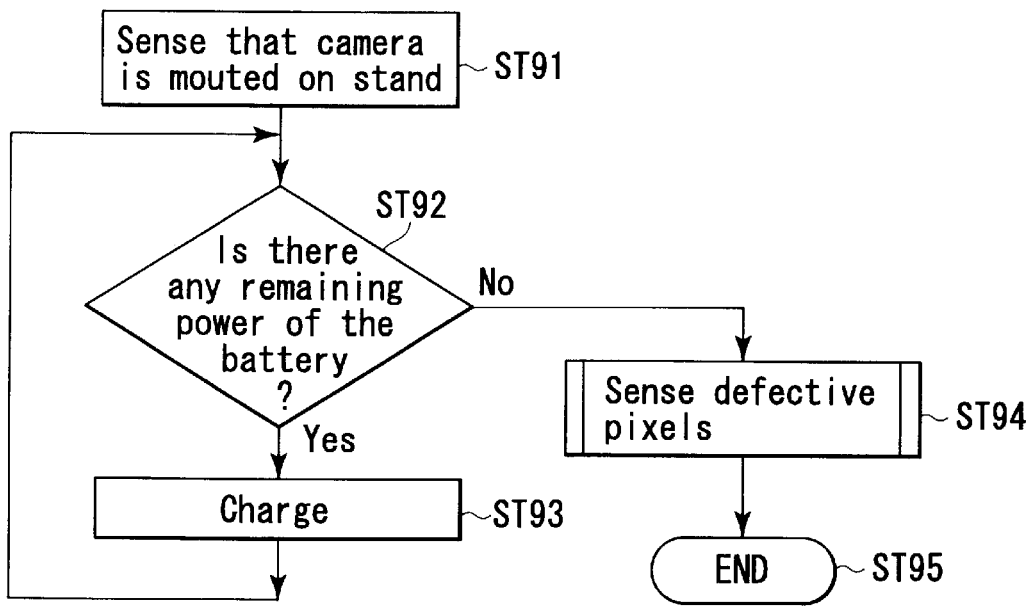
FIG. 42 is a flowchart to help explain the control operation, when the defective-pixel sensing means senses a defective pixel after the battery is charged in the electronic camera system according to the tenth embodiment of the present invention.

Next, the sensing of defective pixels by the defective pixel sensing means 190 and the timing control of the charging of the built-in secondary battery 118 by the charging means (e.g., charging circuit 123) will be explained by reference to flowcharts in FIG. 41 and FIG. 42, respectively. First, control operations when charging is done after the defective pixel sensing operation will be explained by reference to the flowchart of FIG. 41.

Step ST81: When the stand mount sensing circuit 160 senses that the electronic camera 110 is mounted on the stand 130, stand mounting information SA is obtained.

Step ST82: Defective pixels are sensed by the defective pixel sensing means 190, provided that the stand mounting information SA has been obtained.

Step ST83: It is determined whether the amount of remaining power of the battery is equal to or larger than a specific amount.

Step ST84: If it has been determined that the amount of remaining power of the battery is smaller than the specific value, the charging circuit 123 charges the battery and control returns to step ST83.

Step ST85: When the amount of remaining power of the battery is equal or larger than the specific value in step ST83, the series of control operations is completed.

Because control is performed as described above, the sensing of defective pixels by the defective pixel sensing means 190 is not affected by a temperature rise due to charging. Therefore, even if temperature compensation is not particularly made using temperature measuring means (including CPU 154, temperature sensor 191), the sensing accuracy can be maintained at a specific level. Naturally, temperature compensation using temperature measuring means may be made at the same time.

Next, control operations when defective pixels are sensed by the defective pixel sensing means 190 after the charging will be explained by reference to the flowchart of FIG. 42.

Step ST91: When the stand mount sensing circuit 160 senses that the electronic camera 110 is mounted on the stand 130, stand mounting information SA is obtained.

Step ST92: It is determined whether the amount of remaining power of the battery is equal or larger than a specific value, provided that the stand mounting information SA has been obtained.

Step ST93: If it has been determined that the amount of remaining power is smaller than the specific amount, the charging circuit 123 charges the battery and control returns to step ST92.

Step ST94: If it has been determined that the amount of remaining power of the battery is equal or larger than the specific value, the defective pixel sensing means 190 senses defective pixels.

Step ST95: The series of control operations is completed.

Since control is performed as described above, the charging means (e.g., charging circuit 123) charges the battery sufficiently and then the defective pixel sensing means 190 senses defective pixels. Therefore, there is almost no possibility that the built-in secondary battery 118 will be exhausted during the sensing operation. Consequently, there is no possibility that the operation of sensing defective pixels will not be interrupted due to the exhaustion of the battery. In this case, however, it is necessary to make temperature compensation using temperature measuring means.

The configuration of the tenth embodiment may be combined suitably with the configurations of the first to fifth embodiments. For instance, the tenth embodiment may be configured so that the defective pixel sensing mode may be selected and set when the electronic camera is mounted in the second direction. Furthermore, the configuration of the tenth embodiment may be combined with the configurations of the sixth to ninth embodiments.

(Characteristics of the Tenth Embodiment)

[1] The electronic camera 110 described in the embodiment is an electronic camera 110 which is mounted on a camera stand 130 and receives power from power supply means (e.g., AC/DC converter 136) provided on the camera stand 130 and is characterized by comprising a camera body 111, camera examination means (e.g., CPU 154, EEPROM 157, defective pixel sensing and correcting section 192) provided on the camera body 111, mount sensing means (e.g., stand mount sensing circuit 160) for sensing that the camera body 111 is mounted on the camera stand 130, and activation control means (e.g., CPU 154, stand mount sensing circuit 160) for activating the camera examination means (e.g., CPU 154, EEPROM 157, defective pixel sensing and correcting section 192) with specific timing, when the mount sensing means (e.g., 160) senses that the camera body 111 is mounted on the camera stand 130.

In the electronic camera 110, since the electronic camera 110 is examined automatically under the conditions where the unused state of the camera is determined, the so-called dead time is used effectively, which therefore does not disturb the use of the camera. In addition, examination can be made in good time, the examination accuracy is improved.

[2] The electronic camera 110 described in the embodiment and item [1] is characterized in that the camera examination means (including CPU 154, EEPROM 157, defective pixel sensing and correcting section 192) is defective pixel sensing means 190 for sensing defective pixels in a photographing element 143.

In the electronic camera 110, defective pixels are sensed automatically under conditions where the electronic camera 110 is not being used.

[3] The electronic camera 110 described in the embodiment and item [2] is characterized in that the camera body 111 further includes temperature measuring means (e.g., CPU 154, temperature sensor 191) and the defective pixel sensing means 190 senses defective pixels according to the temperature measured by the temperature measuring means (e.g., CPU 154, temperature sensor 191).

In the electronic camera 110, the sense output level of defective pixels depending on the temperature is subjected to temperature compensation, which prevents defective pixels from being sensed erroneously.

[4] The electronic camera 110 described in the embodiment and item [2] or [3] is characterized in that the camera body 111 further includes charging means (e.g., charging circuit 123) for charging a built-in secondary battery 118 with power supplied from the camera stand 130, and the activation control means includes means for starting the charging means (e.g., charging circuit) charging the secondary battery after the defective pixel sensing means 190 senses a defective pixel.

In the electronic camera 110, since the sensing of defective pixels by the defective pixel sensing means 190 is not affected by a temperature rise due to charging, the sensing accuracy can be maintained at a specific level, even if temperature compensation is not particularly made using the temperature measuring means (e.g., CPU 154, temperature sensor 191).

[5] The electronic camera described in the embodiment and item [3] is characterized in that the camera body 111 further includes charging means (e.g., charging circuit 123) for charging a built-in secondary battery 118 with power supplied from the camera stand 130, and the activation control means (e.g., CPU 154, stand mounting sensing circuit 160) includes means for activating the defective pixel sensing means 190 after the charging means (e.g., charging circuit 123) has finished charging the second battery.

In the electronic camera 110, there is no possibility that the operation of sensing defective pixels will be interrupted due to the exhaustion of the built-in secondary battery 118.

[6] The camera described in the embodiment is an electronic camera system composed of an electronic camera 110 and a camera stand 130 on which the electronic camera 110 is mounted detachably and is characterized in that the camera stand 130 includes light projecting means 130L (light source 137, reflecting plate 138, milk-white plate 139) for projecting light onto the photographing system of the mounted electronic camera 110, and the electronic camera 110 includes defective pixel sensing means 190 on which the light projecting means 130L projects light and which is capable of sensing black defective pixels in the photographing element 143.

In the electronic camera system, black defects can be sensed accurately, since the light projecting means 130L provided on the camera stand 130 projects uniform light stably onto the photographing system 140 of the electronic camera 110 mounted on the camera stand 130.

[7] The electronic camera system described in the embodiment and item [6] is characterized in that the camera stand 130 includes power supplying means (e.g., AC/DC converter 136) for supplying power to the mounted electronic camera 110 and the electronic camera 110 includes charging means (e.g., charging circuit 123) for charging a built-in secondary battery 118 with power supplied from the camera stand 130.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera system comprising:
   an electronic camera, and
   a camera stand which includes a power supplying section for supplying power to said electronic camera, when said electronic camera is mounted on said camera stand,
   wherein said electronic camera has an exterior shape capable of being mounted on said camera stand,
   wherein said camera stand has an exterior shape which enables said electronic camera to be mounted thereon in one of a first direction in which a front of the camera faces a front of the camera stand and a second direction in which a back of the camera faces a front of the camera stand, and
   wherein said electronic camera can be mounted on said camera stand either in the first direction in which the front of the camera faces the front of the camera stand or in the second direction in which the back of the camera faces the front of the camera stand, and includes:
   a plurality of operation modes,
   a direction sensing section which senses whether said electronic camera is mounted on said camera stand in said first direction or said second direction, and
   a control section which selects a specific operation mode from said plurality of operation modes according to the mounting direction of the electronic camera sensed by said direction sensing section.

2. The electronic camera system according to claim 1 wherein the power supplying section of said camera stand supplies power to the electronic camera when said electronic camera is mounted in either one of the first direction and said second direction.

3. The electronic camera system according to claim 1 wherein said control section selects and sets a photographing mode when the mounting direction of said electronic camera sensed by said direction sensing section is said first direction.

4. The electronic camera system according to claim 3, wherein said control section inhibits setting of a reproducing mode when the mounting direction sensed by said direction sensing section is said first direction.

5. The electronic camera system according to claim 4 wherein said control section further changes the photographing mode to an external communication mode in which communication is made with an external unit according to an instruction when the mounting direction sensed by said direction sensing section is said first direction.

6. The electronic camera system according to claim 3 wherein said electronic camera includes:
   a photographing mode setting section which, when said direction sensing section senses said first direction, enables a specific photographing mode for automatic photography that is different from a normal photographing mode to be set as said photographing mode, and
   a camera control section which, when the photographing mode setting section sets the specific photographing mode for automatic photography, controls the electric camera body to photograph under photographing conditions such that photographing operations are imperceptible.

7. The electronic camera system according to claim 1 wherein said control section selects and sets a photographing mode when the mounting direction sensed by said direction sensing section is said first direction and a lens cover for said electronic camera is open.

8. The electronic camera system according to claim 1 wherein said control section selects and sets a reproducing mode when the mounting direction sensed by said direction sensing section is said second direction.

9. The electronic camera system according to claim 8, wherein said control section inhibits setting the photographing mode when the mounting direction sensed by said direction sensing section is said second direction.

10. The electronic camera system according to claim 9, wherein said control section further changes the reproducing mode to one of an external communication mode and a print mode according to an instruction when the mounting direction sensed by said direction sensing section is said second direction.

11. The electronic camera system according to claim 8, wherein said electronic camera is mountable on said camera stand in a position different from a position in which said electronic camera is mounted in normal use, and said electronic camera includes:
   a display section which is mounted on the back of said camera and displays an image based on image data, and
   an image direction changing section which changes a direction of the image displayed on said display section, when said direction sensing section senses said second direction and the reproducing mode is set.

12. The electronic camera system according to claim 1 wherein said electronic camera includes:
   a liquid-crystal display section which is mounted on the back of said camera, and which displays an image based on image data,
   a field angle changing section which changes a direction of a field angle at the liquid-crystal display section, and
   a control section which, when said direction sensing section senses said second direction, controls said field angle changing section to set said direction of the field angle to a setting value corresponding to the position in which said electronic camera body is mounted on said camera stand.

13. The electronic camera system according to claim 1 wherein said electronic camera includes a defective pixel sensing section which senses defective pixels in a photographing element, and
   wherein said control section sets said operation mode to a defective pixel sensing mode in which said defective pixel sensing section senses defective pixels with specific timing, when said direction sensing section senses that said electronic camera is said second direction.

14. An electronic camera system comprising:
   an electronic camera, and
   a camera stand which includes a power supplying section for supplying power to said electronic camera when said electronic camera is mounted on said camera stand,
   wherein said electronic camera has an exterior shape capable of being mounted on said camera stand in one of a first direction in which a front of the camera faces a front of said camera stand and a second direction in which a back of the camera faces the front of said camera stand,
   wherein said camera stand has an exterior shape which enables said electronic camera to be mounted in either one of the first direction in which the front of the camera faces the front of said camera stand and a second direction in which the back of the camera faces the front of said camera stand,
   wherein said electronic camera includes a power receiving section corresponding to said power supplying section on an exterior of said electronic camera or in a vicinity of said exterior of said electronic camera,
   wherein said power supplying section is provided in a position that faces the power receiving section of said electronic camera mounted in said first direction and that faces the power receiving section of said electronic camera mounted in said second direction,
   wherein the power supplying section of said camera stand supplies power to the electronic camera, when said electronic camera is mounted in either one of said first direction and said second direction,
   wherein each of said electronic camera and said camera stand further includes a data transmitting and receiving section which transmits and receives data,
   wherein data transmission and reception is performed by emitting and receiving an optical signal,
   wherein the data transmission and reception section of said camera stand includes:
      a first optical conducting section which corresponds to said first direction,
      a second optical conducting section which corresponds to said second direction, and
      a light coupling section which couples one of a light-receiving element and a light-emitting element to said first optical conducting section and said second optical conducting section.

15. An electronic camera system comprising:
   an electronic camera which is mountable on a camera stand and which receives power from a power supplying section provided on the camera stand when said camera is mounted on the camera stand,
   wherein an exterior shape of said electronic camera enables it to be mounted on said camera stand in one of a first direction in which a front of the camera faces a front of said camera stand and in a second direction in which a back of the camera faces the front of said camera stand,
   wherein said electronic camera comprises:
      a plurality of operation modes,
      a direction sensing section which senses whether said electronic camera is mounted on said camera stand in said first direction or said second direction, and
      a control section which selects a specific operation mode from said plurality of operation modes according to the mounting direction sensed by said direction sensing section.

16. A camera stand which is capable of mounting an electronic camera thereon, said camera stand comprising:
   a power supplying section for supplying power to the mounted electronic camera, and
   an exterior shape which enables said electronic camera to be mounted thereon in one of a first direction in which a front of the camera faces a front of the camera stand and in a second direction in which a back of the camera faces the front of the camera stand, wherein said electronic camera selects a specific operation mode from a plurality of operation modes according to a mounting direction and sets the selected mode, and wherein said power supplying section supplies power to the electronic camera, when said electronic camera is mounted in either one of the first direction in which the front of the camera faces the front of the camera stand and the second direction in which the back of the camera faces the front of the camera stand.

17. A system comprising an apparatus with a specific function and a stand with a power supplying section which supplies power to said apparatus when said apparatus is mounted on said stand, wherein said apparatus has an exterior shape capable of being mounted on said stand, wherein said stand has an exterior shape which enables said apparatus to be mounted thereon in one of a first direction in which a front of said apparatus faces a front of said stand and a second direction in which a back of said apparatus faces the front of said stand, wherein said apparatus is capable of being mounted on said stand either in the first direction or in the second direction, and said apparatus includes:

a plurality of operation modes, a direction sensing section which senses whether said apparatus is mounted on said stand in said first direction or said second direction, and a control section which selects a specific operation mode from said plurality of operation modes according to the mounting direction sensed by the direction sensing section.

18. An electronic camera system comprising an electronic camera and a camera stand on which said electronic camera is detachably mounted, wherein said electronic camera includes:

a camera body, a mount sensing section which senses that the camera body is mounted on said camera stand, and a control section which operates a specific function of said electronic camera when the mount sensing section senses that said camera body is mounted on said camera stand, and wherein said camera stand includes a power supplying section which supplies power to said electronic camera when said electronic camera is mounted on said camera stand, wherein said electronic camera is mounted on said camera stand in a position different from a position in which the electronic camera is mounted in normal use, and wherein said electronic camera includes a display section which displays an image based on image data, and an image direction changing section which changes a direction of the image displayed on said display section, and said control section controls said image direction changing section, when said mount sensing section senses that said camera body is mounted on said camera stand.

19. The electronic camera system according to claim 18 wherein said image direction changing section further changes the direction of said displayed image based on information about the direction of the image corresponding to the image data.

20. The electronic camera system according to claim 19 wherein said image direction changing section, when said camera body is not mounted on said stand, changes the direction of said displayed image based on said information about the direction of said image to provide a representation suitable for a normally used position.

21. The electronic camera system according to claim 20 wherein said camera body includes an image data output section which outputs display image data to an external display unit, and, wherein when said sensing section senses that said camera body is mounted on said stand, said image direction changing section changes the direction of the displayed image to provide a same representation as that suitable for said normally used position, based on information about said direction of said image in a case of the display image data outputted from said output section, and changes the direction of the displayed image to provide a representation suitable for a position when the camera body is mounted, based on information about said direction of said image in a case of the image data displayed on said display section.

22. The electronic camera system according to claim 18 wherein said display section includes a clock display section which displays a clock, and wherein said image direction changing section changes a direction of a clock representation displayed on said display section, when said sensing section senses that said camera body is mounted on said stand.

23. An electronic camera system comprising an electronic camera and a camera stand on which said electronic camera is detachably mounted, wherein said electronic camera includes:

a camera body, a mount sensing section which senses that said camera body is mounted on said camera stand, and a control section which operates a specific function of said electronic camera when said mount sensing section senses that said camera body is mounted on said camera stand, and wherein said camera stand includes a power supplying section which supplies power to said electronic camera when said electronic camera is mounted on said camera stand, wherein said electronic camera includes a liquid-crystal display section which displays an image based on image data and a field angle changing section which changes a direction of field angle at the liquid-crystal section and, when said mount sensing section senses that said camera body is mounted on said camera stand, said control section controls said field angle changing section to change said direction of said field angle to a setting value corresponding to a position in which the camera body is mounted on said camera stand.

24. The electronic camera system according to claim 23 wherein said field angle changing section is a brightness changing section which changes brightness of said liquid-crystal display section.

25. The electronic camera system according to claim 23 wherein said camera body includes an operation section which enables the setting value of said direction of field angle to be varied manually.

26. The electronic camera system according to claim 23 wherein with said camera body mounted on said stand, an operation section which enables the setting value of said direction of field angle to be varied manually is provided on a stand exterior section.

27. An electronic camera system comprising an electronic camera and a camera stand on which said electronic camera is detachably mounted, wherein said electronic camera includes:
a camera body,
a mount sensing section which senses that the camera body is mounted on said camera stand, and
a control section which operates a specific function of said electronic camera when the mount sensing section senses that said camera body is mounted on said camera stand, and
wherein said camera stand includes a power supplying section which supplies power to said electronic camera when said electronic camera is mounted on said camera stand,
wherein said electronic camera includes a photographing mode select section which selects one of a normal photographing mode and a specific photographing mode for automatic photography as a photographing mode, and
said control section performs control so that said photographing mode select section can select the specific photographing mode for automatic photography, when said mount sensing section senses that said camera body is mounted on said camera stand.

28. The electronic camera system according to claim 27 wherein said camera control section photographs under photographing conditions such that photographing operations are imperceptible, when said specific photographing mode is selected.

29. The electronic camera system according to claim 28 wherein said photographing conditions such that photographing operations are imperceptible comprise photographing while inhibiting at least one of strobe light emission, display by a display section, lens movements by a focusing section and a zooming section, driving operations by a diaphragm and shutter section, and sound reproduction and calling.

30. The electronic camera system according to claim 27 wherein said electronic camera includes a charging section which charges a built-in secondary battery with the power supplied from said camera stand.

31. The electronic camera system according to claim 30 wherein said camera control section performs control to interrupt the charging by said charging section and execute photography and, after completion of the photography, resume the charging, when a photograph instruction is given in said specific photographing mode during the charging of the built-in secondary battery by said charging section.

32. The electronic camera system according to claim 30 wherein said camera control section performs control to interrupt the charging by said charging section and execute photography, when a photograph instruction is given in said specific photographing mode during said charging of the built-in secondary battery by said charging section.

33. The electronic camera system according to claim 32 wherein said electronic camera includes a battery remaining power sensing section, and said camera control section recharges the battery, when the battery remaining power sensing section senses a decrease in an amount of battery remaining power as a result of photographing after the photographing operation is completed.

34. An electronic camera system comprising an electronic camera and a camera stand on which said electronic camera is detachably mounted,
wherein said electronic camera includes:
a camera body,
a mount sensing section which senses that said camera body is mounted on said camera stand, and
a control section which operates a specific function of said electronic camera when said mount sensing section senses that said camera body is mounted on said camera stand, and
wherein said camera stand includes a power supplying section which supplies power to said electronic camera when said electronic camera is mounted on said camera stand,
wherein said electronic camera includes a photographing mode setting section which sets a specific photographing mode for automatic photography as a photographing mode, and
wherein said control section performs control to said photographing mode setting section to set the specific photographing mode for automatic photography when said mount sensing section senses that said camera body is mounted on said camera stand.

35. An electronic camera system comprising an electronic camera and a camera stand on which said electronic camera is detachably mounted,
wherein said electronic camera includes:
a camera body,
a mount sensing section which senses that said camera body is mounted on said camera stand, and
a control section which operates a specific function of said electronic camera when said mount sensing section senses that said camera body is mounted on said camera stand, and
wherein said camera stand includes a power supplying section which supplies power to said electronic camera when said electronic camera is mounted on said camera stand,
wherein said electronic camera includes a camera examination section which examines the camera,
wherein said control section activates said camera examination section with specific timing, when said mount sensing section senses that said camera body is mounted on said camera stand, and
wherein said camera examination section comprises a defective pixel sensing means which senses defective pixels in a photographing element.

36. The electronic camera system according to claim 35 wherein said camera body further includes a temperature measuring section, and said defective pixel sensing section senses defective pixels according to a temperature measured by the temperature measuring section.

37. The electronic camera system according to claim 35 wherein said camera body further includes a charging section which charges a built-in secondary battery with the power supplied from said camera stand, and
wherein said activation control section starts the charging by said charging section after said defective pixel sensing section senses a defective pixel.

38. The electronic camera system according to claim 35 wherein said camera body further includes a charging section which charges a built-in secondary battery with the power supplied from said camera stand, and
wherein said activation control section activates said defective pixel sensing section, after the charging by said charging section is completed.

39. The electronic camera system according to claim 35 wherein said camera stand includes a light projecting section which projects light onto a photographing system of said mounted electronic camera, and
wherein said defective pixel sensing section of the electronic camera senses black defective pixels in the photographing element from an output of the photographing element on which light is projected by said light projecting section.

40. The electronic camera system according to claim 35 wherein said defective pixel sensing section of the electronic camera senses white defective pixels in the photographing element from the photographing element with a shutter of the camera closed.

41. An electronic camera which is mountable on a camera stand and receives power from a power supplying section provided on said camera stand when said electronic camera is mounted on said camera stand, said electronic camera comprising:
a camera body,
a mount sensing section which senses that the camera body is mounted on said camera stand, and
a control section which activates a specific function of the electronic camera, when the mount sensing section senses that said camera body is mounted on said camera stand,
wherein said electronic camera is mounted in a position different from a position in which said electronic camera is mounted in normal use and includes a display section which displays an image based on image data and an image direction changing section which changes a direction of the image displayed on said display section, and
wherein said control section controls said image direction changing section, when said mount sensing section senses that said camera body is mounted on said camera stand.

42. The electronic camera according to claim 41 wherein said image direction changing section further changes the direction of said displayed image based on information about the direction of the image corresponding to said image data.

43. An electronic camera which is mountable on a camera stand and receives power from a power supplying section provided on said camera stand when said electronic camera is mounted on said camera stand, the electronic camera comprising:
a camera body,
a mount sensing section which senses that the camera body is mounted on said camera stand, and
a control section which activates a specific function of the electronic camera, when the mount sensing section senses that said camera body is mounted on said camera stand,
a liquid-crystal display section which displays an image based on image data, and
a field angle changing section which changes a direction of field angle at the liquid-crystal display section,
wherein said control section, when said mount sensing section senses that said camera body is mounted on said camera stand, controls said field angle changing section to change said direction of the field angle to a setting value corresponding to a position in which the camera body is mounted on said camera stand.

44. The electronic camera according to claim 43 wherein said field angle changing section comprises a brightness changing section which changes a brightness of said liquid-crystal display section.

45. An electronic camera which is mountable on a camera stand and receives power from a power supplying section provided on said camera stand when said electronic camera is mounted on said camera stand, the electronic camera comprising:
a camera body,
a mount sensing section which senses that the camera body is mounted on said camera stand, and
a control section which activates a specific function of the electronic camera, when the mount sensing section senses that said camera body is mounted on said camera stand,
a photographing mode select section which selects one of a normal photographing mode and a specific photographing mode for automatic photography as a photographing mode,
wherein said control section, when said mount sensing section senses that said camera body is mounted on said camera stand, performs control to enable said photographing mode select section to select the specific photographing mode for automatic photography.

46. The electronic camera according to claim 45 wherein said camera control section photographs under photographing conditions such that photographing operations are imperceptible, when said specific photographing mode is selected.

47. The electronic camera system according to claim 46 wherein said photographing conditions such that photographing operations are imperceptible comprise photographing while inhibiting at least one of strobe light emission, display by a display section, lens movements by a focusing section and a zooming section, driving operations by a diaphragm and shutter section, and sound reproduction and calling.

48. An electronic camera, which is mountable on a camera stand and receives power from a power supplying section provided on said camera stand when said electronic camera is mounted on said camera stand, the electronic camera comprising:
a camera body,
a mount sensing section which senses that the camera body is mounted on said camera stand, and
a control section which activates a specific function of the electronic camera, when the mount sensing section senses that said camera body is mounted on said camera stand,
a camera examination section which examines said electronic camera,
wherein said control section activates said camera examination section with specific timing, when said mount sensing section senses that said camera body is mounted on said camera stand, and
wherein said camera examination section comprises a defective pixel sensing means which senses defective pixels in a photographing element.

49. The electronic camera system according to claim 48 wherein said camera body further includes a temperature measuring section, and said defective pixel sensing section senses defective pixels according to a temperature measured by the temperature measuring section.

50. An electronic camera system comprising:
an electronic camera, and
a camera stand which includes a power supplying section for supplying power to said electronic camera when said electronic camera is mounted on said camera stand,
wherein said electronic camera has an exterior shape capable of being mounted on said camera stand, and
wherein said camera stand has an exterior shape which enables said electronic camera to be mounted thereon in one of a first direction in which a front of the camera faces a front of the camera stand and a second direction in which a back of the camera faces the front of the camera stand, wherein a direction sensing section is provided to detect whether said mounted electronic camera faces said first direction or said second direction, and wherein said direction sensing section uses a part of two pairs of electric contact groups each arranged in a ring shape on the electronic camera and the camera stand to utilize conductivity or non-conductivity corresponding to the direction the electronic camera.

* * * * *